Aug. 22, 1961 W. SHOCKLEY 2,997,604
SEMICONDUCTIVE DEVICE AND METHOD OF OPERATING SAME
Filed Jan. 14, 1959 13 Sheets-Sheet 1
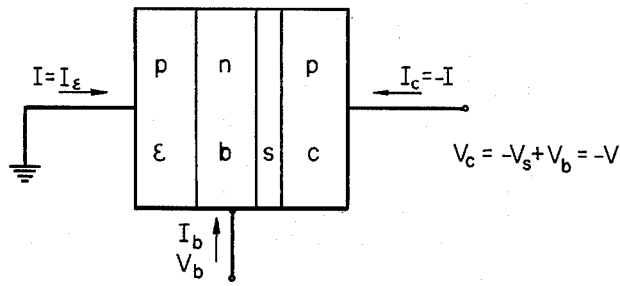
FIG. 1.1
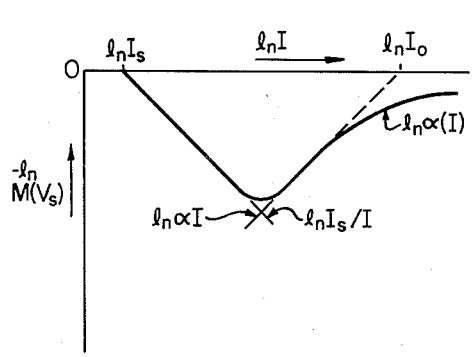
FIG. 1.2
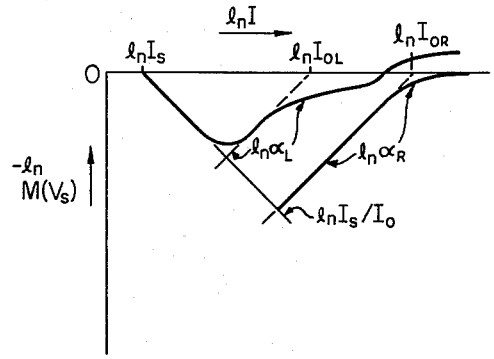
FIG. 1.4
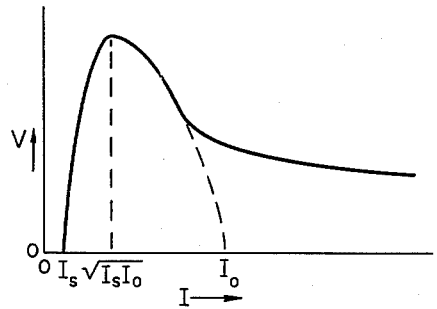
FIG. 1.3
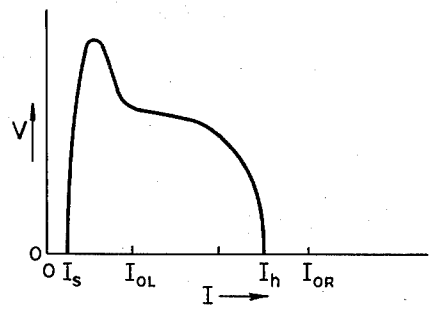
FIG. 1.5
WILLIAM SHOCKLEY
*INVENTOR.*
BY
*Flehr and Swain*
ATTORNEYS

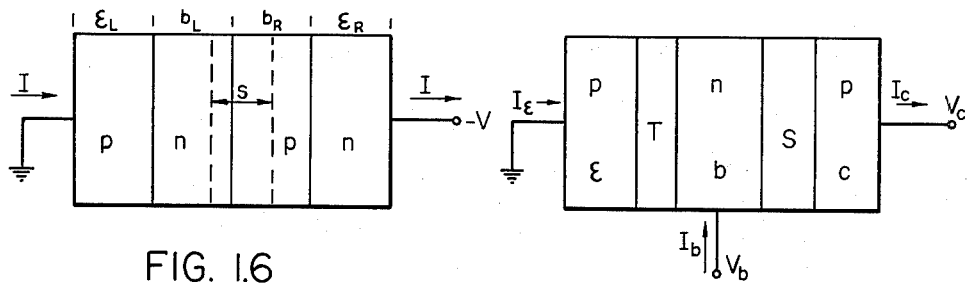
FIG. 1.6
FIG. 2.1
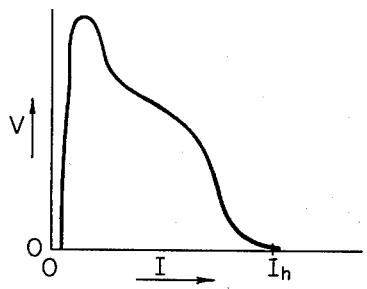
FIG. 1.7
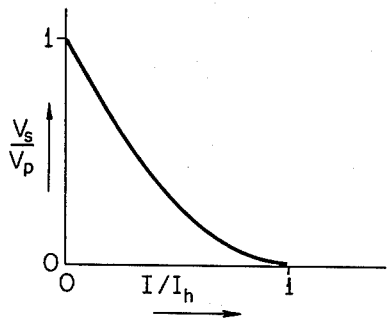
FIG. 1.8
WILLIAM SHOCKLEY
*INVENTOR.*
BY
*Flehr and Swain*
ATTORNEYS Aug. 22, 1961  W. SHOCKLEY  2,997,604
SEMICONDUCTIVE DEVICE AND METHOD OF OPERATING SAME
Filed Jan. 14, 1959  13 Sheets-Sheet 3
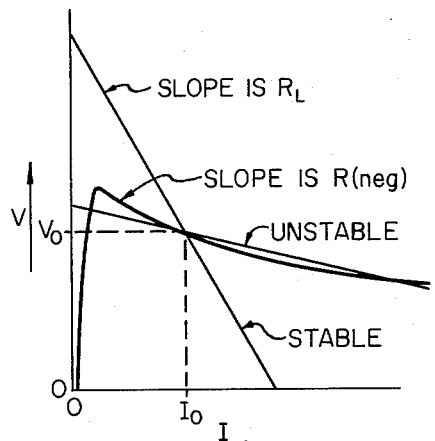
FIG. 3.1
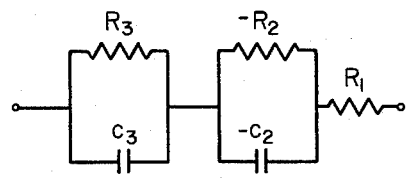
FIG. 3.2
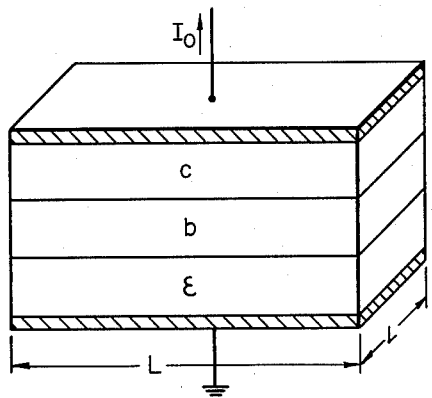
FIG. 3.3
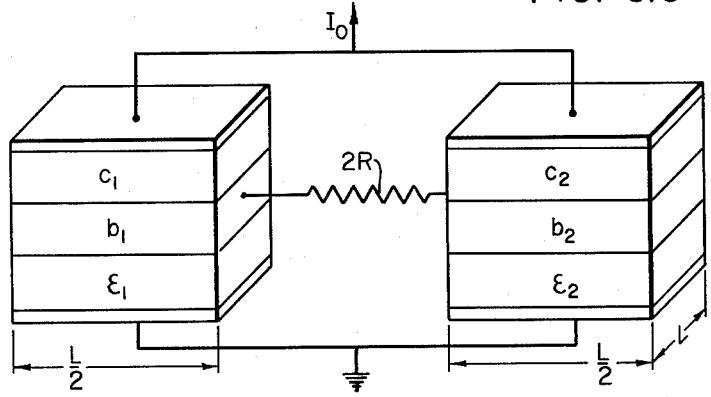
FIG. 3.4
WILLIAM SHOCKLEY
INVENTOR.
BY
*Flehr and Swain*
ATTORNEYS

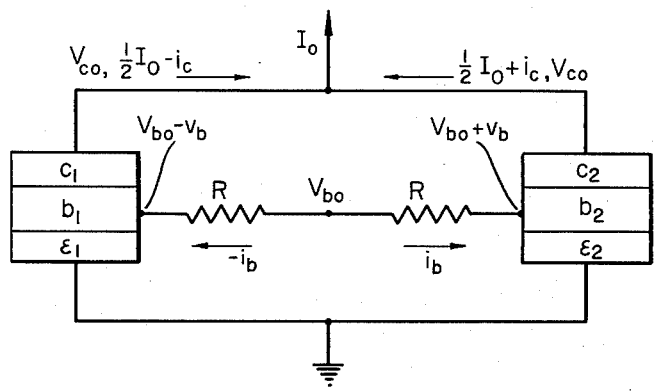
FIG. 3.5
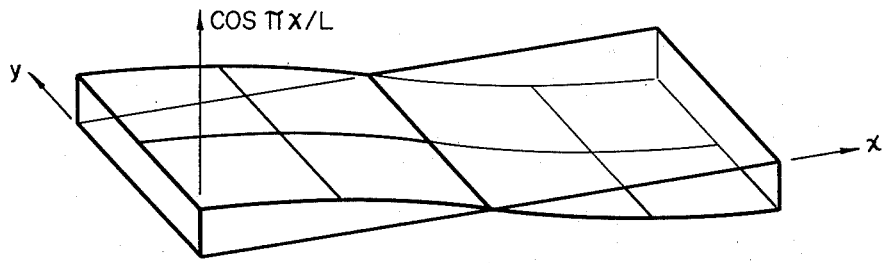
FIG. 3.6
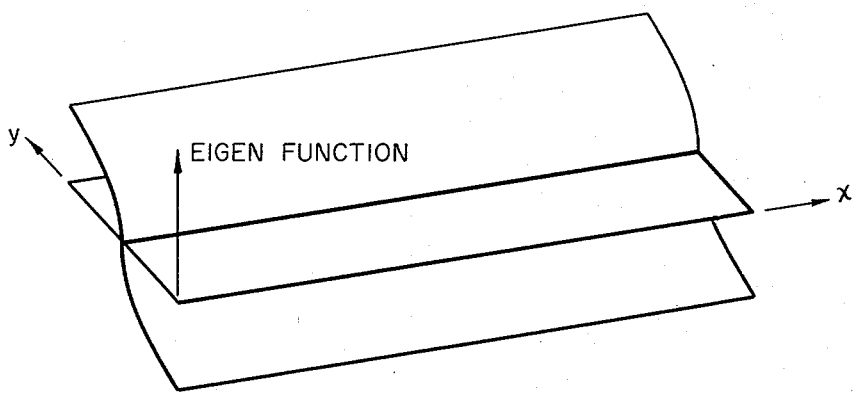
FIG. 3.7
WILLIAM SHOCKLEY
INVENTOR.

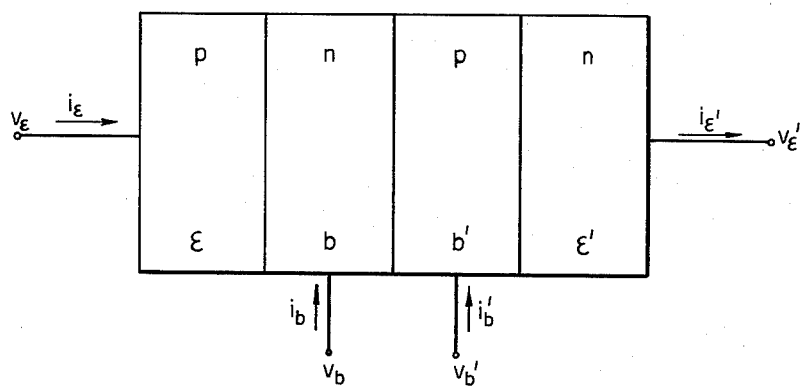
FIG. 5.1
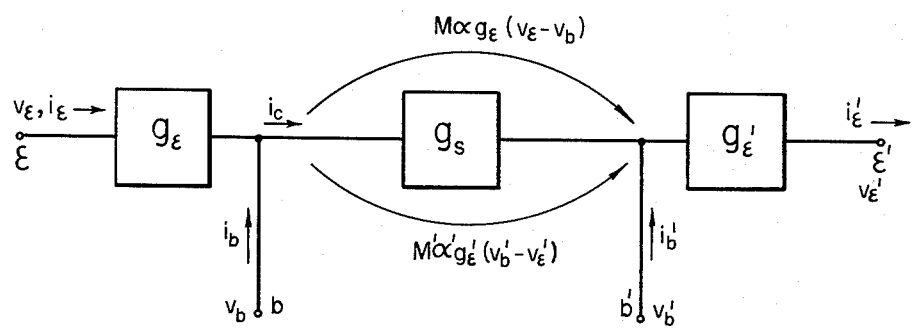
FIG. 5.2
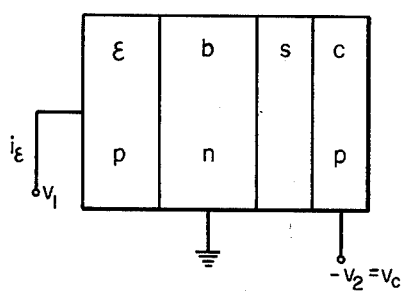
FIG. 6.1

Aug. 22, 1961   W. SHOCKLEY   2,997,604
SEMICONDUCTIVE DEVICE AND METHOD OF OPERATING SAME
Filed Jan. 14, 1959   13 Sheets-Sheet 6
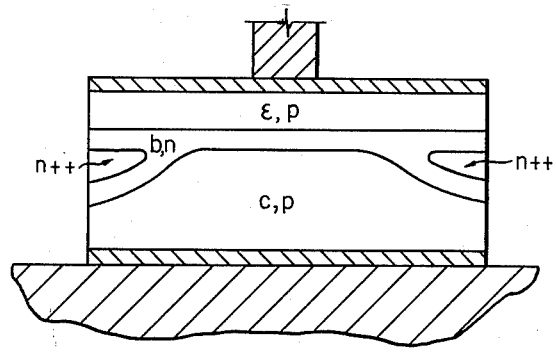
FIG. 7.1
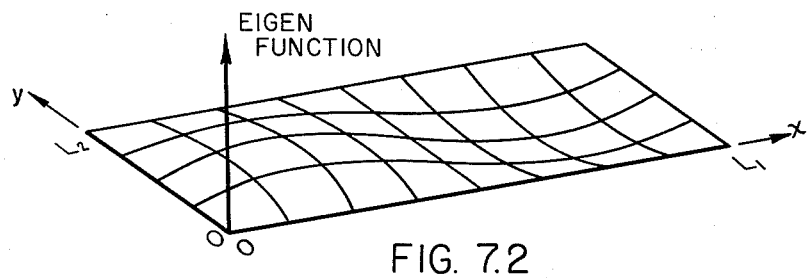
FIG. 7.2
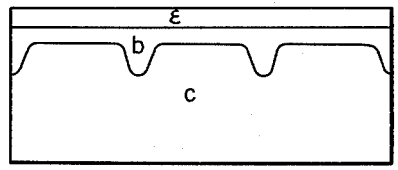
FIG. 7.3
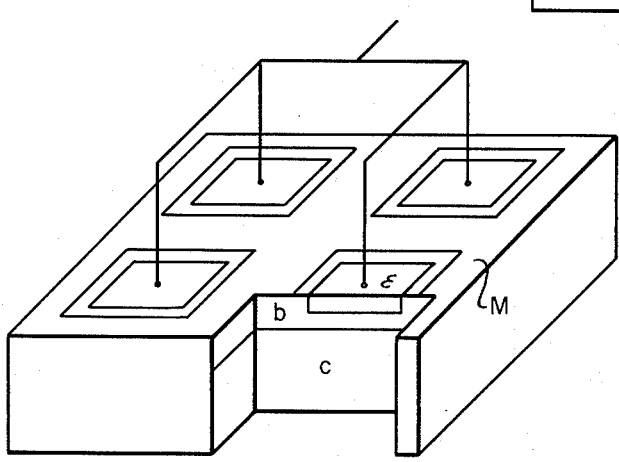
FIG. 7.4
WILLIAM SHOCKLEY
*INVENTOR.*
BY
*Flehr and Swain*
ATTORNEYS

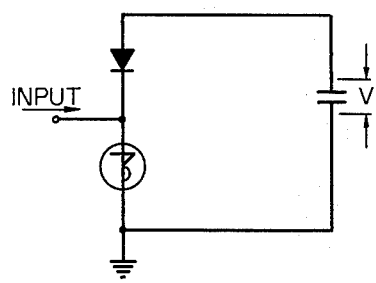
FIG. 8.1
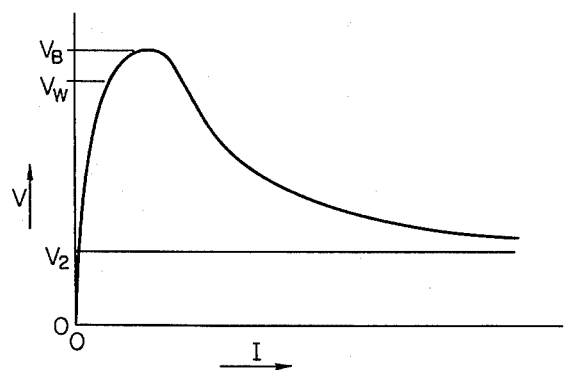
FIG. 8.2
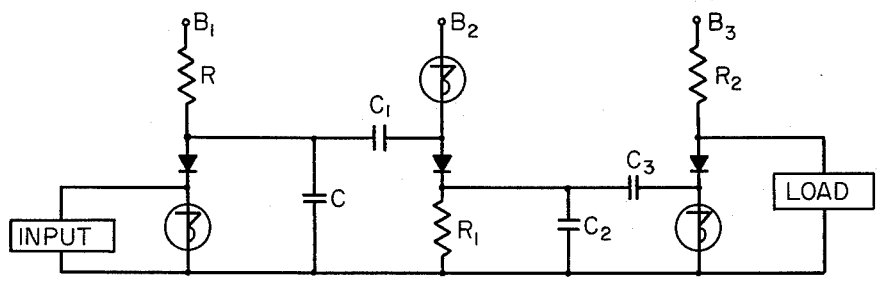
FIG. 8.3
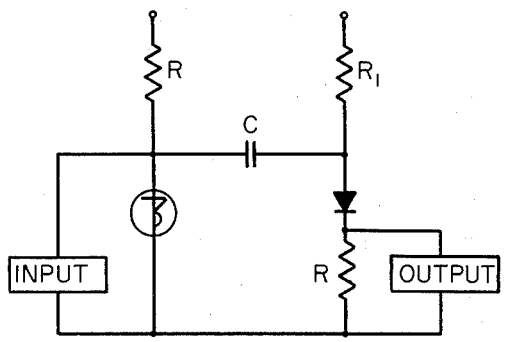
FIG. 8.4

Aug. 22, 1961 W. SHOCKLEY 2,997,604
SEMICONDUCTIVE DEVICE AND METHOD OF OPERATING SAME
Filed Jan. 14, 1959 13 Sheets-Sheet 8
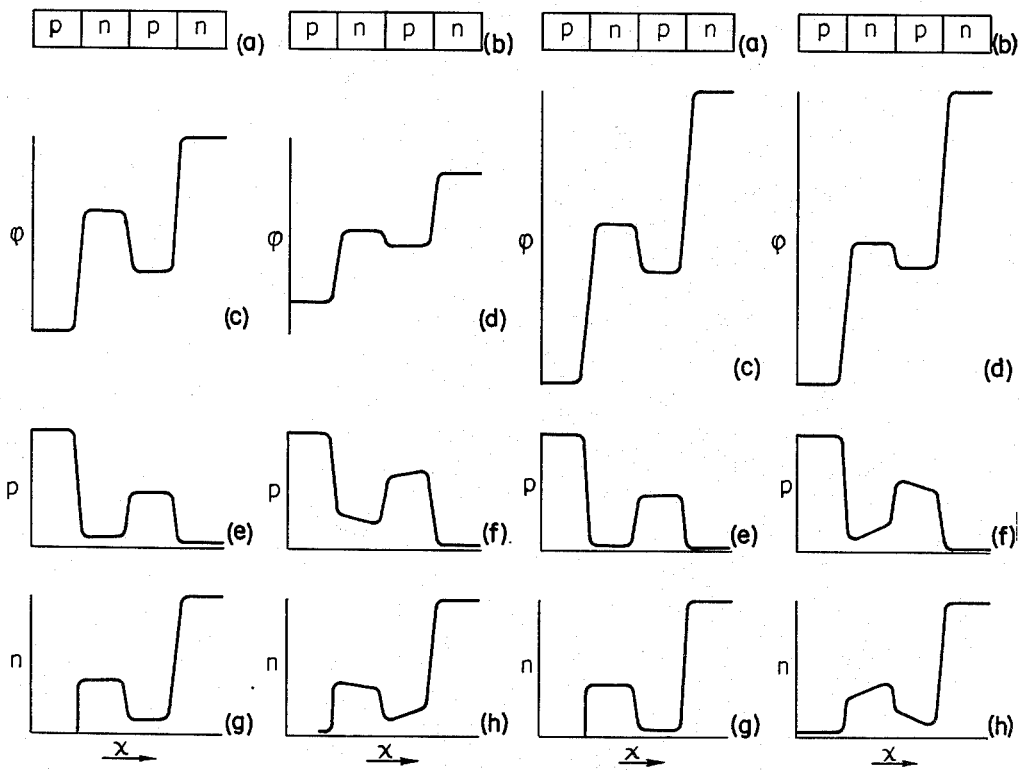
FIG. 9.1  FIG. 9.2
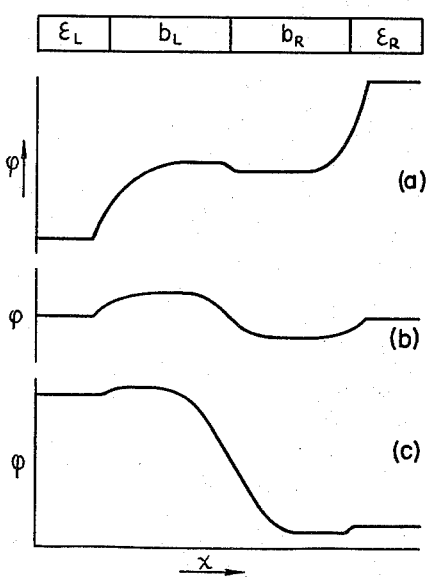
FIG. 9.3
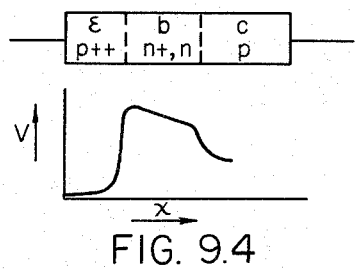
FIG. 9.4
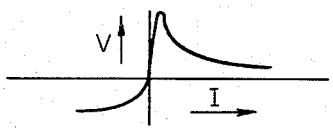
FIG. 9.5
WILLIAM SHOCKLEY
INVENTOR.
BY
Flehr and Swain
ATTORNEYS

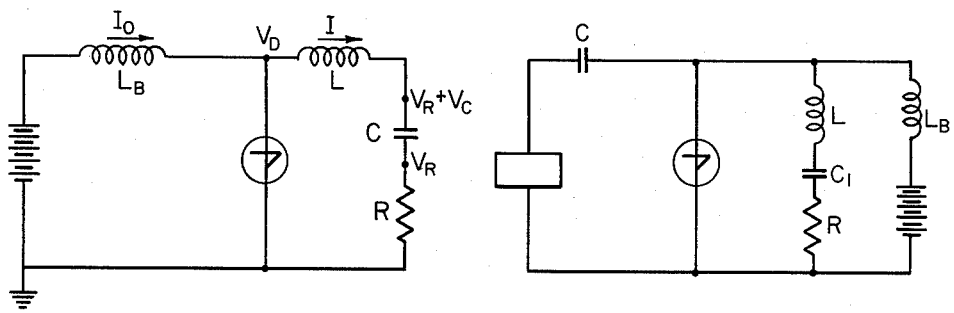
FIG. 10.1
FIG. 10.3
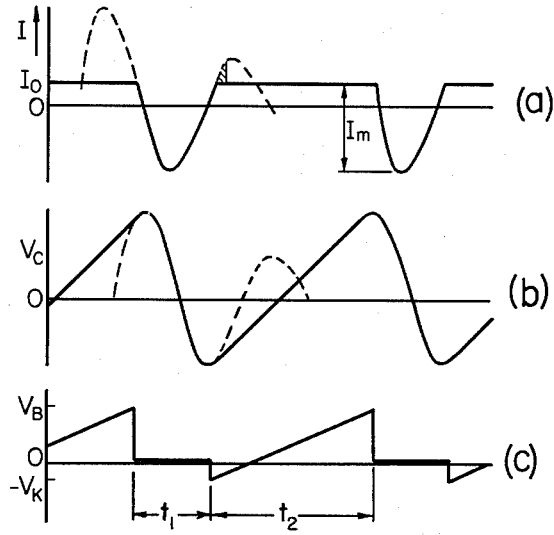
FIG. 10.2

Aug. 22, 1961 W. SHOCKLEY 2,997,604
SEMICONDUCTIVE DEVICE AND METHOD OF OPERATING SAME
Filed Jan. 14, 1959 13 Sheets-Sheet 10
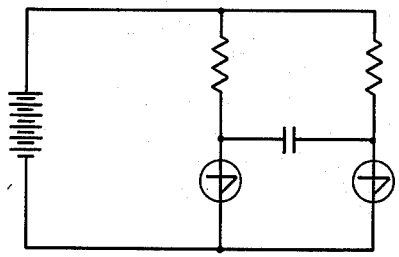
FIG. 10.5
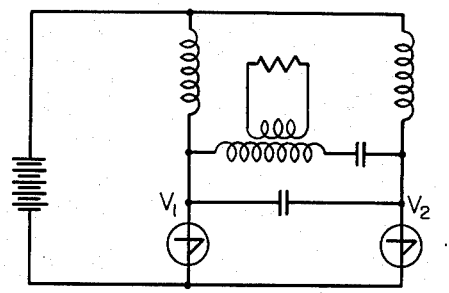
FIG. 10.4
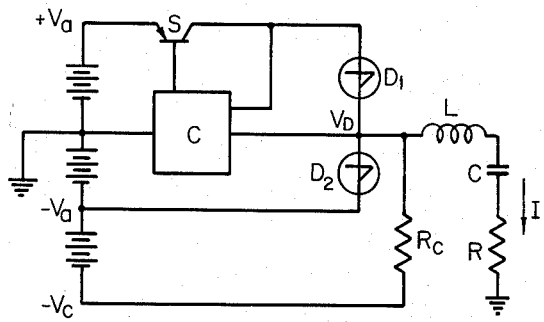
FIG. 10.6
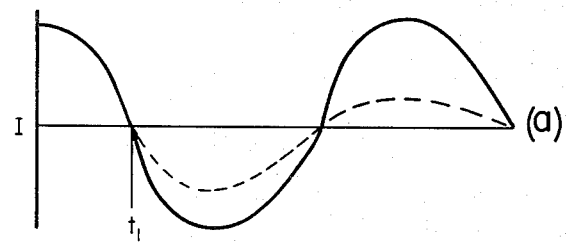
(a)
(b)
FIG. 10.7
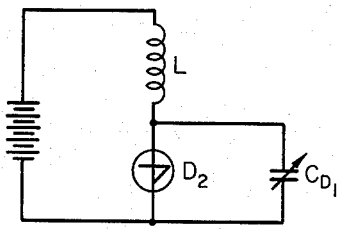
FIG. 10.8
WILLIAM SHOCKLEY
INVENTOR.
BY
Flehr and Swain
ATTORNEYS

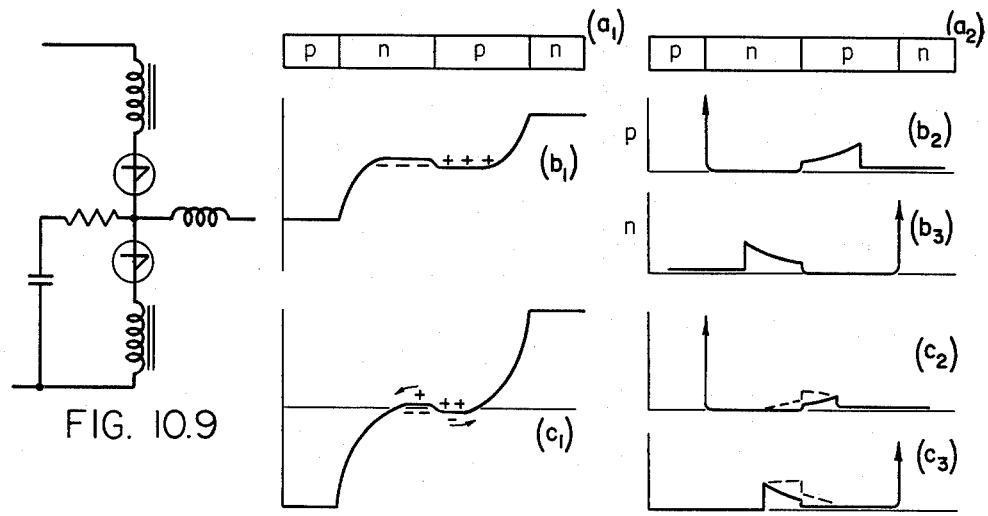
FIG. 10.9
FIG. 10.10
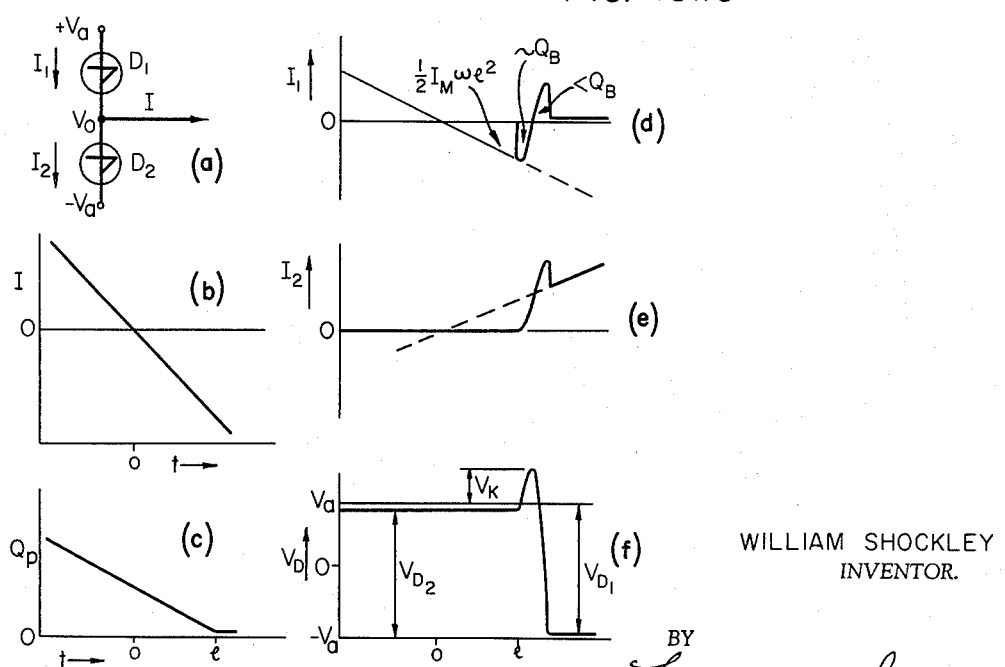
FIG. 10.11
WILLIAM SHOCKLEY
INVENTOR.
BY
Flehr and Swain
ATTORNEYS

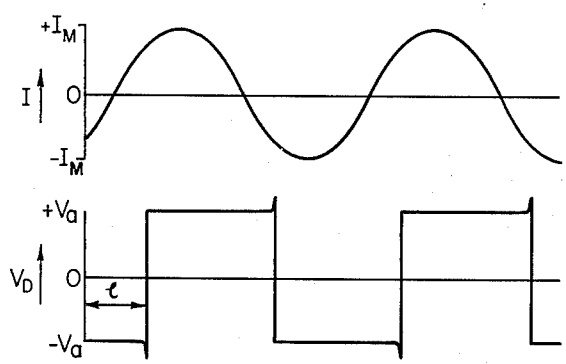
FIG. 10.12
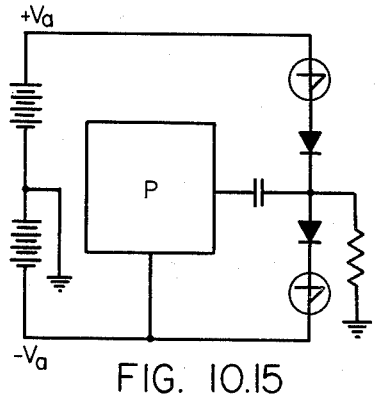
FIG. 10.15
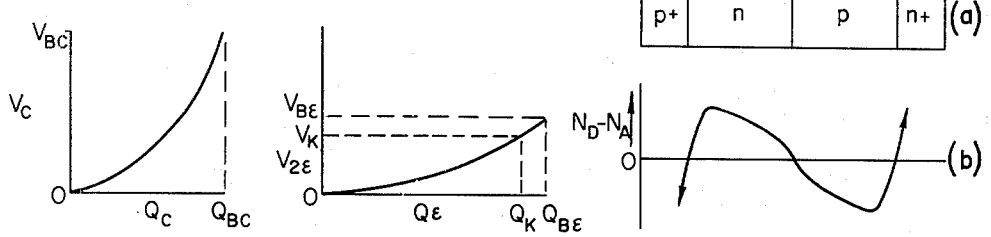
FIG. 10.13
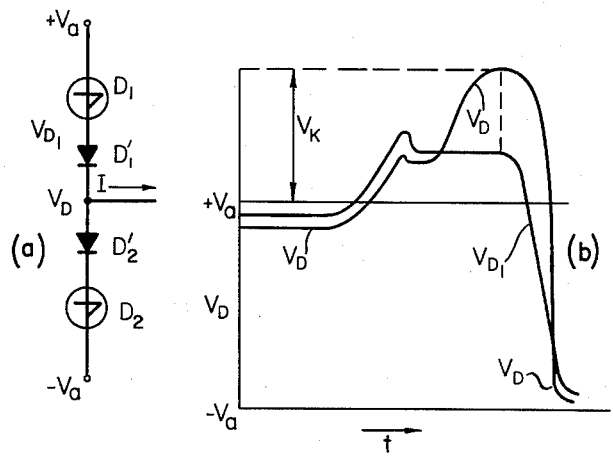
FIG. 10.14
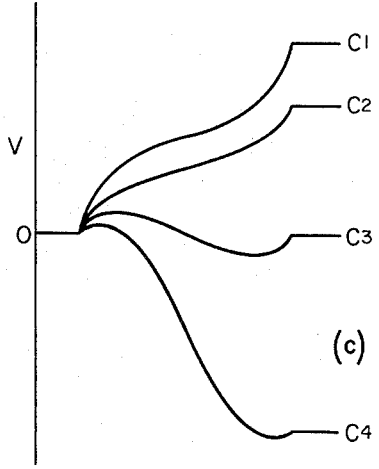
FIG. 10.16

Aug. 22, 1961 W. SHOCKLEY 2,997,604
SEMICONDUCTIVE DEVICE AND METHOD OF OPERATING SAME
Filed Jan. 14, 1959 13 Sheets-Sheet 13
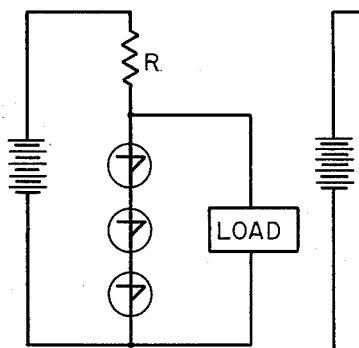
FIG. 11.1
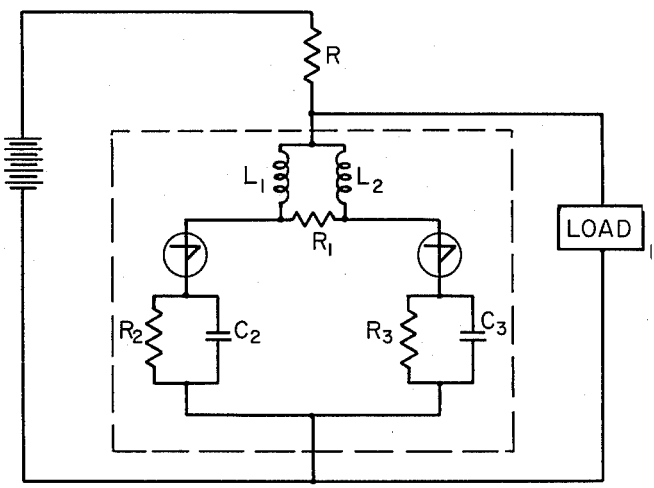
FIG. 11.2
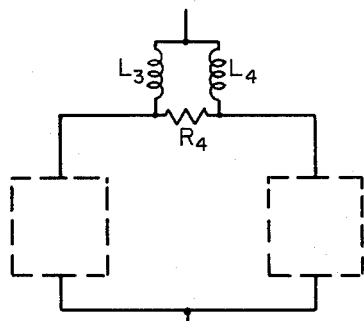
FIG. 11.3
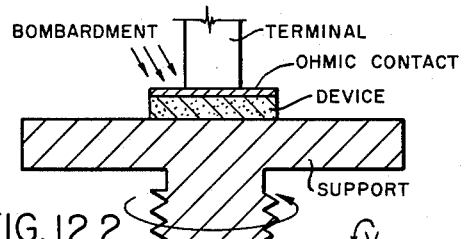
FIG. 12.2
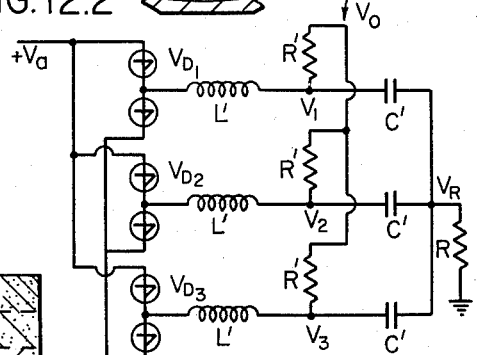
FIG. 11.4
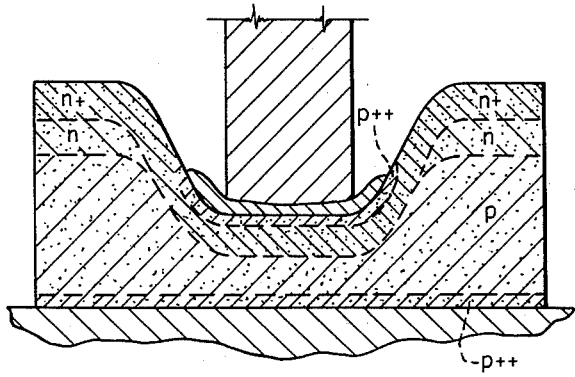
FIG. 12.1
WILLIAM SHOCKLEY
INVENTOR.
BY
*Flehr and Swain*
ATTORNEYS

United States Patent Office 2,997,604
Patented Aug. 22, 1961

2,997,604
SEMICONDUCTIVE DEVICE AND METHOD
OF OPERATING SAME
William Shockley, 23466 Corta Via, Los Altos, Calif.
Filed Jan. 14, 1959, Ser. No. 786,818
33 Claims. (Cl. 307—88.5)

This invention relates generally to a semiconductive device and method of operating the same and more particularly to a two-terminal negative-resistance semiconductive device.

In principle, it is possible to make compositional structures in semiconductive crystals on a scale much smaller than is possible in vacuum tubes. However, presently available techniques are limited and it may be many years before the techniques are perfected to the extent that the required compositional structures for operating at very high frequencies can be made. The difficulty of making small structures increases with the number of electrodes which make up the structure.

Another inherent limitation in semiconductive devices presently in use is that they have limited frequency power characteristics. That is, as the devices are designed for higher frequencies of operation, the power handling capabilities are reduced. When the power handling capabilities are increased, the upper frequency limits are generally decreased.

Two terminal negative resistance devices may be used in conjunction with nonreciprocal elements to produce stable high gain amplifiers. Devices of this type may also be used in parametric amplifiers. Furthermore, suitable devices of this type may be employed in circuits which generate sharp pulses or which sharpen existing pulses. Other important uses of negative resistance semiconductive devices have been stressed in the literature and will not be enumerated.

It is a general object of the present invention to provide a semiconductive device exhibiting negative resistance and methods of operating the same.

It is another object of the present invention to provide a semiconductive device and method of operating the same for operation at relatively high power-frequency limits.

It is another object of the present invention to provide a semiconductive device and method of operating the same for operation at relatively high frequencies.

It is another object of the present invention to provide a semiconductive device and method of operating the same for operation at relatively high powers.

It is still another object of the present invention to provide a semiconductive device having maximum lateral area for stable operation.

It is still another object of the present invention to provide a semiconductive device and method of operating the same by impulsive charging.

It is still another object of the present invention to provide a method for operating semiconductor junction devices up to frequencies close to the limits set by the diffusion time through the base layers. A further important object is to maximize the power level at which this can be accomplished.

It is a further object of the present invention to provide a semiconductive device and method of operating the same in which the internal instabilities are minimized.

It is still a further object of the present invention to provide a semiconductive device which includes first and second surface layers of semiconductive material and an interior base region forming a junction with each of said layers, said base region including at least one layer and means for charging said base region substantially uniformly over its entire area in a time which is comparable to the diffusion time of majority carriers through the layer and if desired including means for removing majority carriers substantially uniformly from said base region.

It is another object of the present invention to provide a semiconductive device including a base region which is uniformly charged in a time comparable to the diffusion time of minority carriers through the region and which includes recombination centers in a transition region contiguous to the base region.

It is still another object of the present invention to provide a semiconductive device and method of operating the same so that negative resistance results from space-charge narrowing of the base layer.

It is still another object of the invention to provide a four-layer semiconductive device from which substantially all of the carriers can be removed from the middle two layers by application of bias.

It is still another object of the invention to provide a semiconductive device and methods of operating it whereby A.-C. power generation does not depend upon variation of alpha with current density.

It is still a further object of the present invention to provide a novel method of operating four-layer semiconductive devices.

It is still a further object to use jointly two-layer diodes and transistor diodes with comparable carrier lifetimes in improved circuits.

It is another object of the present invention to provide a semiconductive device and method of operating the same which includes a base region which can generate current pulses having a duration of the order of the transit of carriers through its base region.

It is still another object to provide novel circuits which incorporate semiconductive devices in accordance with the invention.

These and other objects of the invention will become more clearly apparent from the following description when taken in conjunction with the accompanying drawings.

Referring to the drawings:

FIGURE 1.1 shows a three-layer semiconductive device and the current and voltage conventions used in discussing its operation.

FIGURE 1.2 shows a graphical method of obtaining an approximate solution for the voltage-current relationship in a three-layer semiconductive device.

FIGURE 1.3 shows the voltage-current characteristics corresponding to the three-layer device of FIGURE 1.2.

FIGURE 1.4 shows a graphical method of obtaining the approximate solution for voltage-current relationship in a four-layer semiconductive device.

FIGURE 1.5 shows the voltage-current characteristics corresponding to the four-layer device of FIGURE 1.4.

FIGURE 1.6 shows a four-layer semiconductive device in accordance with the invention with space-charge narrowing of the base layer.

FIGURE 1.7 shows the voltage-current relationship for the four-layer device of FIGURE 1.6.

FIGURE 1.8 shows the voltage-current characteristics for a symmetric hook collector four-layer semiconductive device.

FIGURE 2.1 shows the current and voltage conventions used in analyzing the impedance of a three-layer device.

FIGURE 3.1 shows the load line solution for operation of devices in accordance with the invention.

FIGURE 3.2 shows the equivalent circuit for a three-layer device operating at relatively low frequencies.

FIGURE 3.3 shows a three-layer diode of cross-sectional dimensions L—L.

FIGURE 3.4 shows a pair of diodes having a combined cross-sectional area equal to the single device shown in FIGURE 3.3.

FIGURE 3.5 shows the effects of disturbance when there is an equal distribution of current in the device.

FIGURE 3.6 shows the lowest eigen-function for a rectangle with the long edge along the x-axis.

FIGURE 3.7 shows a higher order eigen-function for a rectangular boundary.

FIGURE 5.1 shows the current and voltage conventions for determining the impedance of a four-layer device.

FIGURE 5.2 shows the current and voltage conventions for a four-layer device.

FIGURE 6.1 shows space-charge widening in a three-layer device.

FIGURE 7.1 shows a semiconductive device in accordance with the invention with a guard ring.

FIGURE 7.2 shows the lowest relevant eigen-function for the device of FIGURE 7.1.

FIGURE 7.3 shows a three-layer device including a rib structure.

FIGURE 7.4 shows a three-layer device having an interdigitated structure.

FIGURE 8.1 shows a three-layer device in accordance with the invention connected in an amplifier circuit.

FIGURE 8.2 shows the voltage-current relationships prevailing in FIGURE 8.1.

FIGURE 8.3 shows a pulse amplifying circuit including three-layer semiconductive devices in accordance with the invention.

FIGURE 8.4 shows a sharp pulse generator employing three-layer semiconductive devices in accordance with the invention.

FIGURES 9.1a–h show devices and the electric fields and carrier density in a four-layer diode.

FIGURES 9.2e–u show the electric field and carrier density in a four-layer device at the steady state condition and after minority carrier extraction.

FIGURES 9.3a–c show the electric field and carrier density in a four-layer device in a condition of majority carrier extraction.

FIGURE 9.4 shows an unsymmetrical three-layer diode.

FIGURE 9.5 shows the current voltage characteristics for the diode of FIGURE 9.4.

FIGURE 10.1 shows an oscillator circuit employing a four-layer device in accordance with the present invention.

FIGURE 10.2 shows the voltage-current waveforms at various points in the circuit in FIGURE 10.1 during operation.

FIGURE 10.3 shows a driven oscillator incorporating a four-layer device.

FIGURE 10.4 shows a push-pull oscillator employing four-layer devices.

FIGURE 10.5 shows a high power bistable circuit incorporating four-layer devices.

FIGURE 10.6 shows another oscillator circuit which employ negative resistance devices operated in accordance with the invention.

FIGURE 10.7 shows the voltage and current waveform at various points in the circuit of FIGURE 10.6.

FIGURE 10.8 shows an approximation of the circuit of FIGURE 10.6 as one device is being turned on.

FIGURE 10.9 shows a circuit including negative resistance devices and saturable reactors.

FIGURE 10.10 depicts the role of majority carrier extraction in the oscillator of FIGURE 10.6.

FIGURE 10.11 shows how switching transistors depend on diode majorities.

FIGURE 10.12 shows the effect of lifetime on the switching cycle.

FIGURE 10.13 shows the relationship of emitter and collector junction charges.

FIGURE 10.14 shows the use of two-layer diodes to control majority carrier extraction.

FIGURE 10.15 shows the circuit for a push-pull amplifier.

FIGURE 10.16 shows a double punch-through device in accordance with the invention.

FIGURE 11.1 shows a plurality of four-layer devices serially connected.

FIGURE 11.2 shows an arrangement for operating devices in parallel.

FIGURE 11.3 schematically illustrates parallel connection of a plurality of circuits of the type shown in FIGURE 11.2.

FIGURE 11.4 shows a plurality of circuits of the type shown in FIGURE 10.6 connected for parallel operation.

FIGURE 12.1 shows a suitable means for constructing a three-layer device in accordance with the invention.

FIGURE 12.2 shows a device in accordance with the present invention being subjected to particle bombardment.

In general, novel semiconductive junction devices and methods of operating the same are described. Methods of operation and structures are disclosed for maximumizing the power level at which the high frequency operation can be achieved. In general, this can be achieved by uniform charging of the base layer. Broadly speaking, this may be accomplished by impulsive charging of the base layer so that internal stabilities do not occur or by limiting the size of the device and/or introducing the edge effect characteristics.

The important features of the present invention have not been realized in the past. In Patent No. 2,855,524, a four-layer transistor diode is described suitable for operation as a transistor switch. For this purpose, uniform charging at high frequency is not important and quite adequate switches can be made in which avalanche multiplication occurs chiefly at the surface. Such devices switch at sufficiently rapid rates for their purpose, and when turned on, usually stay on long enough to have uniform conductance over their entire base layer. There is no mention in the patent nor in any of the literature relating to four-layer diodes of producing a structure in which a substantially uniform charging of the base layer is effected.

In order to facilitate the understanding of the invention, a description of the various mechanisms which enter into the operation of junction semiconductive devices in accordance with the invention are described. Since many aspects of the design are novel and cannot be appreciated by reference to published material, an extensive theoretical development is presented as a basis for the theory, design and operation of junction devices in accordance with the present invention. The description is related particularly to three- and four-layer two-terminal devices and is divided into twelve sections each having one or more subsections.

In general, the symbols employed have been defined as they are used and the symbols are consistent within each of the sections. For descriptive and mathematical simplicity, certain symbols are designated "R" for right, and "L" for left. Other designations are $b$ for base, $e$ for emitter, and $c$ for collector, with $s$ referring to space-charge regions.

A brief summary of the contents of the sections follows:

Section 1 describes the manner in which negative differential resistance may arise in semiconductive devices. It is shown that negative resistance may arise by increasing multiplication in the collector space-charge region with increasing voltage, while at the same time $\alpha$ of the emitter-base combination increases with increasing current. Adjustment of the majority carrier current to control the shape of the voltage-current characteristics to provide a wide variety of characteristics for the two-terminal device is analyzed. It is shown that the negative differential resistance devices may be formed in which avalanche multiplication plays no significant role. This is achieved by having at least one of the base layers sufficiently doped and narrow that space-charge regions of the collector junction penetrates the layer to a significant degree. As the penetration increases due to increased voltage, increased current flows. There is a hook-collector action as the device exhibits negative resistance even though one of the emitter-base regions does not exhibit the characteristics of increasing $\alpha$ with increasing current.

The relationship between A.-C. and D.-C. parameters and the dependence of the various parameters on frequencies is analyzed in Section 2. The criterion for constructing devices for high frequency operation is derived. The upper frequency limit at which devices will exhibit negative differential resistance is defined. It is shown that the frequency response can be increased by having strong attenuation of injected carriers in the base layer.

The lateral stability problem for a three-layer device is discussed in Section 3. It is shown that it is possible to construct a device which has internal instability even though it is fed from a high resistance external source. The total current may not change but in one portion of the device, the change in collector current may be positive while in another it may be negative. The A.-C. voltage changes from one position of the device to another and excessive currents may be drawn at limited areas within the device. Thus, the device does not have lateral stability and may tend to burn out in spots due to this instability. The dimensions and conductance of the base layer for stable operation at small A.-C. signals is derived and defined.

Section 4 compares the response and operation of the device in accordance with the invention and a conventional transistor. It is shown that a device in accordance with the present invention has substantially constant impedance, independent of frequency, towards the upper frequency limit. It is shown that devices in accordance with the invention are simpler to manufacture and more inexpensive.

A discussion of the operation and stability, and complex impedance of a four-layer device is contained in Section 5. The problems are much the same as those discussed in Section 3; however, the analytical solutions are considerably more complex. It is reasoned that the conductance in mhos per square is of the order of twice the total device current in amps for a device operating stably at room temperature.

Section 6 discusses space-charge widening in three- and four-layer devices in accordance with the invention.

Section 7 shows that the lateral cross-sectional area of a device in accordance with the invention may be increased by employing a conductive ring surrounding the working area. Examples of rib and web structures and interdigitated structures are given, together with quantitative limits as to size.

In Section 8 there is described impulsive operation of devices in accordance with the invention. It is shown that the current multiplication results and that the area limitation previously described is not applicable. With impulsive charging and sufficiently high build-up, there is no time for instability to occur. It is shown that the build-up should be relatively high in comparison to the characteristic build-up time of a three-layer structure. There is described a pulse generating circuit incorporating impulsive charging. It is shown that the more rapid processes can be carried out with limited area and punch-through and avalanche multiplication occurring at the same voltage.

Section 9 discusses the novel concept of carrier extraction from a base layer by application of reverse bias. It is shown that the device is relatively insensitive to the $dV/dt$ effect. It is also shown that a four-layer device may be operated at much higher frequencies when reverse voltage majority carrier extraction is employed.

In Section 10 some oscillator and amplifier circuits are shown which incorporate devices and methods in accordance with the invention. An extensive treatment of the theory of majority carrier extraction is presented here and modes of operation are described which have high power output and do not depend upon dependence of alpha on current.

Section 11 has reference to operating a plurality of devices in series and parallel operation in a stable manner for higher power operation.

Section 12 discusses means of forming three- and four-layer devices.

Section 13 presents illustrative design calculations.

For convenience of reference a table of contents for the sections and subsections follows. The numbers before the decimal of the figures show the section in which it is introduced.

SECTION 1.—HOW NEGATIVE RESISTANCE MAY ARISE IN TRANSISTOR DIODES

1A. A Discussion of a Negative Resistance Three-Layer Device
1B. Approximate Treatment of the Current Voltage Characteristic of a Four-Layer Diode
1C. A Transistor Diode with Negative Resistance Not Using Avalanche but Instead Using Space-Charge Narrowing of a Base Layer
1D. Symmetrical Hook collector Transistor Diode
1E. Other Forms of Negative Resistance Characteristic SECTION 2.—The COMPLEX IMPEDANCE OF A THREE-LAYER TRANSISTOR DIODE 2A. Introduction
2B. Notation and Functional Dependance of the Quantities Involved
2C. Notation for the Frequency Dependence
2D. The Collector Admittance
2E. Frequency Dependence of Alpha and the Admittance for a Uniform Base Layer
2F. The Relationship of the D.-C. Alpha and the Zero Frequency A.-C. Alpha
2G. The Impedance for Unit Area Measured at the Collector with the Base Floating SECTION 3.—LATERAL STABILITY AND SIZE LIMITATION FOR A THREE-LAYER TRANSISTOR DIODE 3A. Introduction
3B. The Diode Stability Problem
3C. The Base Impedance in a Transistor Structure
3D. Simplified Model for Lateral Stability Problem
3E. The Lateral Stability Problem

SECTION 4.—COMPARISON BETWEEN TRANSISTOR DIODE AND CONVENTIONAL TRANSISTOR

SECTION 5.—COMPLEX IMPEDANCE AND LATERAL STABILITY IN A FOUR-LAYER TRANSISTOR DIODE

5A. Introduction
5B. Diode Impedance
5C. Case of Both Emitters Grounded
5D. Transients for $g$ Near Stability Limit
5E. Form of Disturbance for Slow Solution
5F. The Lateral Stability Condition

SECTION 6.—SPACE-CHARGE WIDENING IN THE FOUR-LAYER DIODE

6A. The Space-Charge Widening Effects in a Three-Layer Transistor
6B. Evaluation of the Space-Charge Widening Terms
6C. Evaluation of the Impedance
6D. Comments on Lateral Stability

SECTION 7.—OTHER COMMENTS ON LATERAL STABILITY PROBLEM

SECTION 8.—IMPULSIVE BASE CHARGING AND POWER GAIN

SECTION 9.—CARRIER EXTRACTION

SECTION 10.—SOME OSCILLATOR CIRCUIT PRINCIPLES

10A. Some Simple Oscillator Circuits
10B. A High Performance Push-Pull Oscillator Circuit
10C. The $dV/dt$ Effect
10D. Minority Carrier Extraction in the High Performance Circuit
10E. Majority Carrier Extraction
10F. The Switching Cycle
10G. Tolerances and Design Limits
10H. Conclusions

SECTION 11.—SERIES AND PARALLEL OPERATION

SECTION 12.—SOME MEANS OF PRODUCING STRUCTURES AND ADDITIONAL GENERAL COMMENTS

SECTION 13.—ILLUSTRATIVE DESIGN CALCULATIONS

A detailed description of the invention follows.

SECTION 1.—HOW NEGATIVE RESISTANCE MAY ARISE IN TRANSISTOR DIODES

*1A.—A discussion of a negative resistance three-layer device*

Some of the principles upon which negative resistance transistor diodes operate may be understood in terms of the behavior of a three-layer transistor diode. When such a diode is properly made in silicon, it exhibits a negative resistance portion of the current-voltage characteristic. The negative resistance arises from the fact thta avalanche multiplication in the collector space-charge region increases with increasing voltage while, at the same time, the alpha of the emitter-base combination increases with increasing current. This leads to behavior in which voltage decreases as current increases over certain ranges of current and leads to a negative differential resistance.

FIGURE 1.1 represents schematically a three-layer structure for use in a description of the mechanisms of operation. In keeping with customary transistor notation, the current into the emitter is denoted by $I_e$ and the current into the base and collectors is similarly represented by $I_b$ and $I_c$. The current $I_b$ is introduced for purposes of exposition; in two-terminal devices this current is zero. For the p-n-p device represented in FIG. 1.1, the convention for algebraic sign corresponds to positive signs for the operating condition so that positive current flow I is from emitter to collector in the diagram and positive applied voltage V produces a negative voltage in respect to ground upon the collector body.

In order to derive the current-voltage relation for this device, we consider a condition in which the voltage across the space-charge layer at the collector junction is $V_s$ and the current in the emitter lead is zero. Under these conditions, a current will flow between base and collector which is denoted by $I_c(V_s)$. To a high degree of accuracy, this current is independent of the voltage across emitter junction. Furthermore, space charge due to currents in the collector region is small enough so that effects of the space charge upon multiplication in the space-charge region are usually negligible. On the basis of these assumptions, the total current across the space-charge junction may be regarded as the sum of two terms: first, the current which would flow if the emitter current were zero and, second, that which is due to minority carriers injected by the emitter which diffuse through the base layer and arrive at the collector junction and are multiplied in crossing the space-charge layer.

When the device is operated as a two-terminal device, the emitter current and the collector current are equal in magnitude and the base current is zero. The total current crossing the space-charge region is equal to the total current I flowing through the device. In accordance with the assumption of additivity, the relationship $$I = M(V_s)\alpha(I)I + I_c(V_s) \qquad (1)$$

follows at once. In this equation the total current crossing the space-charge layer is considered as being due to the term $I_c(V_s)$ discussed above plus the multiplied injected current which reaches the space-charge region. The multiplication factor is denoted by $M(V_s)$. For purposes of exposition the voltage $V_s$ will be used in the equations although, for all practical purposes, it is equal to the applied voltage across the device since, in general, the voltage across the space-charge junction is so large in comparison to the voltage across the emitter junction that the latter can be neglected in comparison.

In general, the current $I_c(V_s)$ is small compared to the currents when the device is in the operating or negative resistance condition. This leads directly to conclusions regarding the current-voltage relationship by relatively simple means. Solving Equation 1 for the current I gives $$I = I_c(V_s)/[1 - M(V_s)\alpha(I)] \qquad (2)$$

so that if I is very much larger than $I_c(V_s)$, then it is evident that the denominator in Equation 2 must be very small compared to unity. For this to be true, the relationship $$M(V_s)\alpha(I) \doteq 1 \qquad (3)$$

must hold.

As is well known for silicon devices, the alpha of emitter-base structures rises with increasing base current. See, for example, C. T. Sah, R. N. Noyce, and W. Shockley, "Carrier Generation and Recombination in p-n Junctions and p-n Junction Charcteristics," Proc. IRE, vol. 45, No. 9, pp. 1228–1243, September 1957; J. L. Moll, M. Tanenbaum, J. M. Goldey, and N. Holonyak, "P-n-p-n Transistor Switches," Proc. IRE, vol. 44, pp. 1174–1182, September 1956; and, W. Shockley and J. F. Gibbons, "Introduction to the 4-Layer Diode," Semiconductor Products, vol. 1, pp. 9–13, January-February 1958. This is believed to be due to different dependence upon voltage of the recombination current in the transistion region of the junction and the current injected into the base layer proper. We shall return to this point in a subsequent section. Thus, in Equation 3 $\alpha(I)$ is an increasing function of current over a portion of the current range. On the other, $M(V_s)$ is an increasing function of voltage for all voltages up to the breakdown voltage, at which M approaches infinity. Thus, for any given value of I, there will be a value of M which satisfies Equation 3, and corresponding to this value M there will be a voltage lying between zero and the breakdown voltage. In the region where $\alpha$ of I is increasing with I, it follows that M and consequently $V_s$ must be decreasing functions of current. A characteristic in which the voltage decreases with current gives rise to a negative differential resistance, and in this condition the diode may be used to produce A.-C. power when properly connected to a circuit and supplied with suitable D.-C. bias.

In order to design two-terminal transistor diodes, it is necessary to have methods for calculating their characteristics quantitatively and controlling the fabrication processes by means of a quantitative theory. A semi-quantitative theory adequate for most purposes may be developed using certain simplifying assumptions. These can be modified, if necessary, to produce a more exact theory. Only the simple theory is treated here, however, since it suffices to illustrate the main principles involved, and an exact theory is far more cumbersome and the physical effects are obscured by the analytical details.

The simplifying assumption which permits a relatively simple treatment of the current voltage characteristics consists of assuming that the current $I_c(V_s)$ consists of a saturated current which is substantially independent of voltage and which is then multiplied by the same multiplication factor as the current injected through the base layer. This is not exactly true since, first, the width of the space-charge region varies with reverse voltage and this increases the generation in the space-charge region and, second, carriers generated in the space-charge region are multiplied by a factor which depends upon the point of their origin in the space-charge region. Neither of these effects varies rapidly with voltage, however, compared to the variation of the multiplication factor M itself. For this reason, the principal effects are properly represented by assuming that $$I_c(V_s)/M(V_s) \doteq I_s \quad (4)$$

where the quantity $I_s$ is regarded as a constant generated current. Using assumption (4) and dividing Equation 1 by I and by M leads to $$1/M(V_s) = \alpha(I) + I_s/I \quad (5)$$

It is seen that Equation 5 has terms dependent only upon $V_s$ on the left side of the equality sign, and terms dependent only upon I on the right side. Consequently, if the right side of Equation 5 is studied as a function of current, then for each value of current, the value of the multiplication factor can be found and consequently so can $V_s$.

In FIG. 1.2, we represent a plot on logarithmic axes of the righthand side of Equation 5. On such a plot, the term $I_s/I$ appears as a line at 45° with a negative slope. The line for log $\alpha(I)$ is represented as a line at 45° with positive slope. This corresponds to the assumption that over a certain range $\alpha(I)$ is represented by $$\alpha(I) = I/I_o \text{ for } I < I_o \quad (6)$$

For larger values of I than $I_o$, $\alpha$ is substantially constant. Also, for values of I so small that the voltage across the emitter junction is substantially less than thermal voltage, $v_0 = kT/q$, $\alpha(I)$ is substantially constant. This portion of the curve is not represented on FIG. 2.

The sum of the two terms on the right side of FIG. 2 is represented as a heavy line. It is seen that this heavy line has a minimum value at approximately the geometric mean of $I_o$ and $I_s$. This minimum value corresponds to the maximum value of M and consequently, maximum voltage $V_s$. For values of I larger or smaller than this geometric mean value, M is smaller than its maximum value and $V_s$ is also smaller than its maximum.

The behavior just discussed leads to the current voltage curve represented in FIG. 1.3, in which the voltage $V_b$ is neglected compared to $V_s$ so that the total voltage V is used in place of $V_s$. As is seen there, for I greater than $I_s$, M is greater than unity and V is correspondingly greater than zero. V rises to a maximum for I equal approximately to the $(I_sI_o)^{1/2}$ and V is less than this maximum value on either side of the maximum. These results may be summarized by:

$$\text{Maximum } V_s \text{ for } I_s/I = I/I_o \quad (7)$$

$$I = (I_sI_o)^{1/2} \quad (8)$$

One of the conventional approximations for avalanche multiplication with $V_B$ representing the breakdown or limiting voltage at the junction leads to the following condition at the maximum for voltage:

$$1/M(V_s) = 1 - (V_s/V_B)^n$$
$$\doteq n\Delta V/V_B = 2(I_s/I_o)^{1/2} \quad (9)$$

where $\Delta V$ is the amount by which $V_s$ falls short of reaching $V_B$ at the maximum. For example, if $n=3$ and $I_s$ is $10^{-8}$ amperes and $I_o$ is $10^{-2}$ amperes, the maximum will occur at $10^{-5}$ amperes and $\Delta V$ will be about $10^{-3}$ of $V_B$.

The treatment just given for the determination of the current at the voltage and current maximum is based on the assumption that $\alpha$ is proportional to I near this maximum. A more general expression can be obtained by differentiating Equation 1 in respect to I. At the maximum, $V_s$ does not change in respect to I, so that at the maximum the condition must hold $$1 = M(V_s)\alpha'(I)I + M(V_s)\alpha \quad (10)$$

Combining this equation with Equation 1, we find that at the maximum the relationship $$I_c(V_s)/M(V_s) = I^2\alpha'(I) \quad (11)$$

This relationship reduces to Equation 8 if alpha is assumed to be of the form given by Equation 6.

For currents much larger than $I_o$, the voltage approaches a limiting value given by $$V_s = V_B(1 - \alpha_{\max})^{1/n} \quad (12)$$

where $\alpha_{\max}$ is the maximum value of $\alpha$ for large currents.

1B.—*Approximate treatment of the current voltage characteristic of a four-layer diode*

This section treats a four-layer diode in the simplified graphical form used in connection with the three-layer diode. This will illustrate another way in which negative resistance can arise and can also be used as a basis for comparing a new form of operation of four-layer diode with the conventional form. Proceeding as was done for Equation 1, the total current flowing through the device is assumed to consist of a multiplication of the current that would be generated if both emitter currents were zero plus the multiplication of the two injected currents which arrive at the center collector junction. This leads to $$I = M(V_s)[\alpha_L(I)I + \alpha_R(I)I + I_s] \quad (1)$$

where $\alpha_L(I)$ and $\alpha_R(I)$ apply to the junction at the left and at the right in a diagram like FIG. 6. (FIGURE 1.6 emphasizes space-charge narrowing of a base layer; an effect treated in Subsection 1D and neglected in this subsection.)

In Equation 1 we have again made the simplifying assumption that the multiplication factor M is the same for all currents and that the space-charge generated current is constant and independent of voltage.

If Equation 1 is divided by MI, we again obtain separation into voltage-dependent and current-dependent terms.

$$1/M(V_s) = \alpha_L(I) + \alpha_R(I) + I_s/I \quad (2)$$

Equation 2 may be analyzed by plotting the right-hand side of the equation as a function of I upon logarithmic coordinate paper. This is represented in FIG. 1.4 where the term $I_s/I$ is represented by line of 45° negative slope, while the two $\alpha$ terms are represented by rising lines which do not reach unity and which approach their limiting $\alpha$ values at two different points denoted by $I_{oL}$ for the $\alpha_L$ term and $I_{oR}$ for the $\alpha_R$ term. Again, the sum of the terms on the right-hand side of Equation 2 is represented by a dark-solid line. It is seen that in this case the solid line crosses the zero axis of logarithms on the vertical scale, corresponding to the value 1 for M. This corresponds to zero voltage. Thus, for the four-layer diode there is a holding current at which the voltage goes substantially to zero.

The theory of the voltage dependence when the collector voltage drops to values small compared to thermal voltage is a separate subject and is not needed at this point in the discussion. In the "on" condition the four-layer diode behaves much like three p-n junctions all biased forward in parallel.

In terms of the foregoing it can be seen how a variety of shapes of the current voltage curves may be produced. The curve corresponding to FIG. 1.4 is represented in FIG. 1.5, and it is seen that it exhibits a peak of voltage determined by $I_s$ and $I_{oL}$ in much the same way as the peak voltage of FIGS. 1.2 and 1.3 was determined. This is followed by a substantially flat portion in which $\alpha_1$ is constant and $\alpha_R$ is small. As $\alpha_R$ approaches unity, there is another drop, and the voltage approaches zero abruptly in the neighborhood of $I_{oR}$. The value at which V drops to zero in accordance with the approximate Equation 2 is denoted by $I_h$ and is called the holding current for four-layer diodes.

The behavior of the current-voltage characteristic for currents slightly less than the holding current can be obtained using the approximate expression for multiplication $$M(V_s) = [1-(V_s/V_B)^n]^{-1} \quad (3)$$

This equation may be inserted in Equation 2. Approximating the right-hand side of Equation 2 by a straight line of positive slope in the neighborhood of $I_h$ leads to $$1-(V_s/V_B)^n = 1 - A(I_h - I) \quad (4)$$

where the coefficient A is the sum of the derivatives of $\alpha_L$ and $\alpha_R$ in respect to I in the neighborhood of $I_h$. This equation leads to a proportionality between the deviation of the current from holding current and the voltage, as represented by $$I_h - I = (V_s/V_B)^n \text{ or } \frac{dI}{dV_s}\alpha - nV_s^{n-1} \quad (5)$$

Since $n$ is usually about 2 or 3, this relationship leads to a vertical slope on the V—I plot in the neighborhood of $I_h$. (Other effects related to space-charge widening may cause this shape to be altered so that a horizontal to the axis is obtained; see Subsection 1D.)

This theory of the conventional four-layer diode shows that adjustment of the values of $I_{oL}$ and $I_{oR}$ can lead to a wide variety of shapes of curves like FIG. 1.5. For example, if $I_{oL}$ corresponds to an $\alpha$ behavior in which $\alpha_L$ rises to values near unity at relatively low currents, whereas $I_{oR}$ is very much larger, then a substantial initial drop in voltage followed by a long plateau will occur, leading to a very high holding current. Characteristics of this sort are desirable for making voltage regulators and other applications.

*1C.—A transistor diode with negative resistance not using avalanche but instead using space-charge narrowing of a base layer*

FIGURE 1.6 illustrates a type of four-layer diode in which avalanche multiplication plays no significant role. In this case, it is supposed that one of the base layers is sufficiently weakly doped and narrow that the space-charge layer of the collector penetrates it to a significant degree. The base and emitter structure on the right-hand side of FIG. 1.6 are treated mathematically as a hook collector which gives hook-collector multiplication. (See W. Shockley, "Electrons and Holes in Semiconductors," D. Van Nostrand, 1950.) The multiplication in a hook collector can be derived by considering the induced current produced by current flowing into the base layer of the hook collector. For a transistor this multiplication is represented by the well-known relationship $$\alpha/(1-\alpha) = \text{ratio of induced collector current to base current} \quad (1)$$

The actual multiplication of current arriving across the collector junction is obtained by adding the original current to the induced current, thus obtaining for the multiplication in the hook collector the expression $$M_{hook}(I, V_s) = 1 + \alpha_R/(1-\alpha_R) = 1/(1-\alpha_R) \quad (2)$$

where the quantity $\alpha_R$ will be a function of both the current flowing through the device and the voltage across the space-charge layer since the latter affects the width of the base layer.

Regarding the four-layer diode of FIG. 1.6 as a three-layer structure having an $\alpha_L$ on the left side and multiplication on the right, Equation 2 may be inserted into the approximation of Equation 3 (Subsection 1A) considered for the three-layer diode. This leads to $$\alpha_L M_{hook} = 1 \quad (3)$$

Substituting Equation 2 into Equation 3 leads readily to $$\alpha_L + \alpha_R = 1 \quad (4)$$

This latter result could have been obtained equally well from Equation 1 of Subsection 1.B for the four-layer diode by setting M equal to unity and neglecting $I_s$ in comparison to I.

Equation 4 now involves both current and voltage. The simplifying assumptions that voltage has no effect upon $\alpha_L$ and current no effect upon $\alpha_R$, permit it to be shown that Equation 4 will lead to a negative resistance characteristic when the effect of space-charge widening upon $\alpha_R$ is considered as follows: To a first approximation, the $\alpha$ of a junction transistor may be taken to vary inversely as the base-layer thickness. This is true for a silicon junction operating under conditions in which the loss of transmitted current occurs chiefly because of recombination at the emitter junction. Assuming this relationship, we conclude $$\alpha_R \alpha \frac{W}{W(V_s)} = 1/\left[1-\left(\frac{V_s}{V_p}\right)^{1/n}\right] \quad (5)$$

where W is the total width of the region $b_R$ and $W(V_s)$ is the remaining width left after space-charge penetration has been taken into account. Since, in a p-n junction, the voltage across the junction varies approximately the second or third power of the width of the space-charge layer, it is evident that the narrowing of the layer will depend upon the $1/n$ power of the voltage where $n$ is of the order of 2 or 3. This is represented by the term in the denominator of Equation 5. The voltage $V_p$ is the so-called punch-through voltage and is the voltage at which space-charge widening would lead the space charge to penetrate completely through the base layer $b_R$. In the neighborhood of the holding current $I_h$, at which $\alpha_L + \alpha_R$ equals unity for $V_s$ equals zero, the dependence of the alphas upon current may be represented by a linear term and the dependence of $\alpha_R$ upon voltage may be obtained by taking the first term in the expansion of Equation 5. Then for I slight less than $I_h$, Equation 4 becomes $$A(I_h - I) + B(V_s/V_p)^{1/n} = 0 \quad (6)$$

where A and B are constants.

This relationship shows that the deviation of the current from the holding current depends upon voltage by the proportionality $$I_h - I \alpha (V_s/V_p)^{1/n} \quad (7)$$

This should be compared with Equation 5 of 1.B, discussed earlier, in which it was seen that the current deviation depended upon the square or higher power of voltage, whereas in Equation 7 the voltage depends upon the square or higher power of the current deviation.

The effect shown in Equation 7 of space-charge narrowing of a base layer can affect the current voltage characteristic of a four-layer diode employing avalanche multiplication, and will tend to alter the vertical approach to $I_h$ represented in FIG. 1.5 and replace it by a tangential approach to the current axis like that shown for FIG. 1.7. FIGURE 1.7 corresponds to a case in which $I_{oL}$ and $I_{oR}$ have comparable influences upon the curve like that of FIG. 1.4 so that the plateau is largely missing.

In the following subsection a case of hook-multiplication without avalanche multiplication will be treated in detail as an illustration of design theory.

*1D.—Symmetrical hook collector transistor diode*

As a more complete example of design theory for transistor diodes not using avalanche multiplication, we shall consider a p-n-p-n diode which is symmetrical in the sense that the alphas of the two transistors are assumed to be the same function of current and voltage.

As a basis for an analytical treatment, it is assumed that over the range of interest the current injected into the base and emitter bodies varies as the Boltzmann factor of the voltage across the emitter junction, that is as $$I \text{ (injected)} = I_2 \alpha \exp(-qV_b/kT) \tag{1}$$

where $V_e$ is taken as zero so that $-V_b$ is the forward bias on the base. It is also assumed, in keeping with results obtained by Sah, Noyce, and Shockley, "Carrier Generation and Recombination in p-n Junctions and p-n Junction Characteristics," Proc. IRE, vol. 45, No. 9, pp. 1228–1243, September 1957, Equation 30, that the current recombining in the transition region varies as the Boltzmann factor of half the voltage:

$$I \text{ (combining in transition region)} = I_{1\alpha} \exp(-qV_b/2kT) \tag{2}$$

It should be noted that in keeping with their subscripts $I_1$ and $I_2$ vary as the 1st and 2nd powers respectively of the Boltzmann factor of half the voltage that occurs in Equation 2. For devices of interest, $I_1$ is much larger than $I_2$ for small values of $V_b$ while $I_2$ is larger at large values of $V_b$ because of its more rapid increase with $V_b$. If $I_o$ represents the current at which the two are equal, then it follows that $$I_1^2 = I_o I_2 \tag{3}$$

It should be noted that since $I_o$ varies as the zeroth power of the Boltzmann factor of half the voltage, i.e., is constant, the subscripts of Equation 3 add up as would exponents.

The total current across the junction is $$I = I_1 + I_2 = I_1 + I_1^2/I_o \tag{4}$$

This equation is a quadratic in $I_1$ and may be solved to give $$I_1 = [(I_o^2 + 4II_o)^{1/2} - I_o]/2 \tag{5}$$

The ratio of total injected current to total emitter current is denoted by $\gamma_2$:

$$\gamma_2 \equiv I_2/I \tag{6}$$

The quantity $\gamma_2$ may be written in a convenient form by the following manipulations:

$$\begin{aligned} I_2 = I_1^2/I_o = (I_1/I_o)[I_1] \\ = (I_1/I_o)[(I_o^2 + 4II_o)^{1/2} - I_o]/2 \end{aligned} \tag{7}$$

and $$\begin{aligned} I = I_2 + I_1 = I_2 + (I_1/I_o)I_o \\ = (I_1/I_o)[(I_o^2 + 4II_o)^{1/2} + I_o]/2 \end{aligned} \tag{8}$$

so that $\gamma_2$ may be expressed as a function $\gamma_2(I/I_o)$ of $I/I_o$:

$$\begin{aligned} \gamma_2(I/I_o) = \frac{(I_o^2 + 4II_o)^{1/2} - I_o}{(I_o^2 + 4II_o)^{1/2} + I_o} \\ = \frac{[1 + 4(I/I_o)]^{1/2} - 1}{[1 + 4(I/I_o)]^{1/2} + 1} \end{aligned} \tag{9}$$

The expression for $\gamma_2$ has the following limiting forms:

$$I/I_o \ll 1 \quad \gamma_2 = I/I_o \tag{10}$$

$$I/I_o = 1 \quad \gamma_2 = 0.38 \tag{11}$$

$$I/I_o = 2 \quad \gamma_2 = 0.5 \tag{12}$$

$$I/I_o \gg 1 \quad \gamma_2 = 1 - \sqrt{I_o/I} \tag{13}$$

It will be shown below that the current voltage characteristic may be determined in terms of the functional form of $\gamma_2$ when the dependence of the current $I_o$ upon the voltage $V_s$ is taken into account.

The next step in development consists of deriving an expression for the alpha of the emitter base collector structure as a function of the total current flowing through the structure and the voltage across the collector junction. The latter voltage produces the space-charge widening, with resultant narrowing of the base layer, and thus affects the transmission of minority holes through the base layer. By definition, the quantity $\alpha$ is $$\alpha(I, V_s) = I(\text{minority holes to depletion layer edge})/I \tag{14}$$

Several steps are necessary in determining the functional dependence of $\alpha$ upon the variables $I$ and $V_s$.

The total current carried by injection is composed of two parts, denoted by $I_{2e}$ and $I_{2b}$ representing, respectively, the injected currents that flow into the emitter body and into the base layer:

$$I_2 = I_{2e} + I_{2b} \tag{15}$$

The flow into the emitter body is independent of bias across the collector junction and in keeping with Equation 1 may be written in the form $$I_{2e} = I_{2e0} \exp(-V_b/v_o) \tag{16}$$

where $I_{2e0}$ is a constant for the structure at a given temperature, and $v_o$ is the thermal voltage $$v_o = kT/q \tag{17}$$

The current injected into the base layer depends upon the thickness of the base layer and thus upon the voltage across the collector junction. It may be expressed in the form $$I_{2b} = I_{2b0}(V_s) \exp(-V_b/v_o) \tag{18}$$

In accordance with the assumption of Equation 2, the current combining in the transition region may be written as $$I_1 = I_{10} \exp(-V_b/2v_o) \tag{19}$$

In terms of Equations 15 and 19 and the definition of Equation 3, it follows that $$I_o(V_s) = I_{10}^2/[I_{2e0} + I_{2b0}(V_s)] \tag{20}$$

The dependence of $I_{2b0}(V_s)$ upon voltage is derived below.

Several factors are involved in evaluating $\alpha$ of Equation 14. One of these is the minority transmission factor $\beta(V_s)$ for the base layer. This quantity is defined as follows:

$$\beta(V_s) = I(\text{minority holes to depletion layer edge})/I_{2b} \tag{21}$$

In terms of $\beta(V_s)$, $\alpha$ may be written in the form $$\begin{aligned} \alpha(I, V_s) = \beta(V_s) I_{2b}/I \\ = \beta(V_s)(I_{2b}/I_2)(I_2/I) \end{aligned} \tag{22}$$

In this equation the ratio in the second factor is the emitter efficiency in terms of injection current alone. It is represented by the symbol $\gamma^*(V_s)$ where $$\gamma^*(V_s) = I_{2b}/I_2 = I_{2b0}(V_s)/[I_{2b0}(V_s) + I_{2e0}] \tag{23}$$

The last factor in Equation 22 is simply $\gamma_2$, which is defined by Equation 9.

Equation 22 is the desired equation from which the current voltage relationship may be obtained. In the case of a symmetrical four-layer structure, the condition that the two alphas have a sum equal to unity, in keeping with Equation 4 of 1.C, is equivalent to requiring that each $\alpha$ be equal to ½. Thus, on the negative resistance slope, Equation 22 may be rewritten in the form $$\gamma_2[I/I_o(V_s)] = \alpha(I, V_s)/\beta(V_s)\gamma^*(V_s) \tag{24}$$

In this equation the quantity $\alpha$ now has the value $$\alpha(I, V_s) = \tfrac{1}{2} \tag{25}$$

so that Equation 24 involves the current, $I$, only in the term to the left of the equal sign. In this term the current, $I$, enters only in terms of a ratio with the current $I_o$ which is a function of $V_s$. Making use of the functional relationship for $\gamma_2$ given in Equation 9, Equation 24 may be solved for $I$ assuming that $\alpha = \tfrac{1}{2}$. The result is $$I = I_o(V_s)\frac{1}{4}\left[\left(\frac{2\beta(V_s)\gamma^*(V_s)+1}{2\beta(V_s)\gamma^*(V_s)-1}\right)^2 - 1\right] \tag{26}$$

The right-hand side of Equation 26 is a function of $V$ only and may be expressed in analytic form for a particular junction structure. Thus Equation 26 contains the desired current voltage relationship.

As a next step, the quantities $I_{2b0}(V_s)$, and other quantities must be evaluated as functions of $V_s$.

The injected current flowing into the base layer, previously introduced in Equation 18 can now be evaluated in terms of the charge of majority carriers per unit area in the base layer under conditions of the operating bias $V_s$. The analytical expression for this current is $$I_{2b}=[q^2 D_p n_i^2/(Q_0-Q)] \exp(-V_b/v_0) \qquad (27)$$

where $q$ is the electronic charge, $D_p$ the diffusion constant for holes, and $n_i$ intrinsic carrier density. The quantities $Q_0$ and $Q$ are defined as follows:

$$Q_0 = \int q(N_d - N_a) dx \qquad (28)$$

where the integration extends over the base layer under the conditions of 0 applied bias, so that $Q_0$ is the net charge per unit area of base layer of donors $N_d$ minus acceptors $N_a$, and is thus the charge density on a unit area basis of majority carriers in the base layer. $Q$ is a function of $V_s$ and is the amount of the charge $Q_0$ that lies in the space-charge region, and is thus not balanced by majority carriers. $Q_0 - Q$ is thus the charge of majority carriers in the base layer per unit area under operating conditions. Equation 27 follows from the analysis of Moll and Ross, "The Dependence of Transistor Parameters on the Distribution of Base Layer Resistivity," Transistor Technology, vol. II, 51, pp. 392–404. (Combining Equations 7 and 8 of the Moll and Ross reference, solving for $I_p$ and noting that $N_o p_n = n_i^2$, leads to Equation 27.) Equation 27 may be rewritten in the form $$I_{2b} = I_{2b0}(V_s) \exp(-V_b/v_0)$$
$$= I_{2b0}(0)(1-Q/Q_0)^{-1} \exp(-V_b/v_0) \qquad (29)$$

where the new coefficient $I_{2b0}(0)$ is the value of $I_{2b0}(V_s)$ for 0 collector bias and is given by $$I_{2b0}(0) = q^2 D_p n_i^2 / Q_0 \qquad (30)$$

In terms of $I_{2b0}(0)$, the desired quantity $I_{2b0}(V_s)$ may be expressed in the form $$I_{2b0}(V_s) = I_{2b0}/[1 - Q(V_s)/Q_0] \qquad (31)$$

where the dependence of $Q$ upon $V_s$ has been explicitly indicated for concreteness.

In terms of Equation 31 and the definition in Equation 20 of $I_0(V_s)$, we readily obtain $$I_0(V_s) = I_{10}^2 / [I_{2e0} + I_{2b0}(0)(1-Q/Q_0)^{-1}]$$
$$= \left(1 - \frac{Q(V_s)}{Q_0}\right) I_{10}^2 / [I_{2b0}(0) + I_{2e0}(1-Q/Q_0)] \qquad (32)$$

This may be re-expressed in terms of the emitter efficiency for injected currents $\gamma^*$ at 0 collector bias as follows:

$$\gamma^*(0) = I_{2b0}(0)/[I_{2b0}(0) + I_{2e0}] \qquad (33)$$

so that $I_0(V_s)$ $$= \left[1 - \frac{Q(V_s)}{Q_0}\right] \frac{I_{10}^2}{[I_{2b0}(0) + I_{2e0}]} \frac{1}{\left[\gamma^*(0) + (1-\gamma^*(0))\left(1-\frac{Q}{Q_0}\right)\right]} \qquad (34)$$

It may be seen that the important variations of $I_0(V_s)$ occur from the first factor. As $Q$ approaches $Q_0$ corresponding to an approach to space-charge punch-through of the base layer, the first term in the expression approaches zero. On the other hand, $\gamma^*$ is equal to unity, the remaining terms are independent of $Q$. If $\gamma^*$ is close to unity, the effect of the last term of Equation 34 will be unimportant, compared to the first term.

Equation 26 involves a factor containing $\beta(V_s)$ and $\gamma^*(V_s)$. The assumptions on which $I_{2b0}(V_s)$ is based neglect recombination in the base layer and correspond thus to setting $\beta(V_s)$ equal to unity. If $\beta$ and $\gamma^*$ are equal to unity, then the large bracket of Equation 26 becomes equal to eight. If they differ only slightly from unity, the variation in the bracket will not be pronounced. In order to get a simple and approximately correct expression for the current-voltage relationship, it is assumed that $$\beta(V_s)\gamma^*(V_s) = 1 \qquad (35)$$

so that Equation 26 reduces to $$I \doteq 2I_0(V_s) \qquad (36)$$

Since these same assumptions lead to the conclusion that the dependence of $I_0(V_s)$ upon $V_s$ arises chiefly from the first factor of Equation 34, the current-voltage relationship (36) may be re-expressed in the form $$I/I_h \doteq 1 - [Q(V_s)/Q_0] \qquad (37)$$

where $I_h$, the holding current, is given by $$I_h = 2I_{10}^2 / [I_{2b0}(0) + I_{2e}(0)] \qquad (38)$$

Equation 37 leads readily to explicit forms of the current-voltage relationship through the dependence of $Q(V_s)$ upon the voltage, $V_s$.

The relationship of $Q(V_s)$ to the voltage $V_s$ depends upon the distribution of chemical charge near the middle junction. If the junction is abrupt, the charge $Q$ is proportional to the width of the space-charge layer and the voltage to the square of the width. Hence, we have $$\text{abrupt: } Q/Q_0 = (V_s/V_p)^{1/2} \qquad (39)$$

where $V_p$ is the "punch-through" voltage. For a linear gradient, $Q$ is proportional to width squared and voltage to width cubed. Hence, for this case:

$$\text{linear gradient: } Q/Q_0 = (V_s/V_p)^{2/3} \qquad (40)$$

If $\gamma^*(0)$ is nearly unity, the current voltage curve becomes $$I/I_h = 1 - (V_s/V_p)^{1/m} \qquad (41)$$

where $m=2$ for the abrupt case and 3/2 for the gradual case. If $x$ and $y$ are $$V_s/V_p = y \text{ and } I/I_h = x \qquad (42)$$

The abrupt case of Equation 39 becomes $$y = (1-x)^2 \qquad (43)$$

so that $y$ is a parabolic function of $x$ tangent to the $x$-axis at $x=1$. This case is illustrated in FIG. 1.8. The linear gradient case has the form $$y = (1-x)^{3/2}$$

and has a somewhat less curved shape but is generally similar in appearance.

The differential resistance is $$\frac{dV}{dI} = \frac{V_p}{I_h}\frac{dy}{dx} = -m(1-x)^{m-1}\frac{V_p}{I_h}$$

$$= -\frac{m}{(1-x)}\frac{V}{I} = -mVI_h/I(I_h-I) \qquad (44)$$

where $m=2$ for the abrupt junction and (3/2) for the linearly graded junction.

The above treatment is illustrative of general design principles. Symmetrical punch-through transistor diodes may be particularly adapted to impulsive charging discussed below, but useful punch-through types need not be symmetrical.

1E.—Other forms of negative resistance characteristic

Hook-collector action and avalanche multiplication can be used in combination in four- and three-layer diodes to produce negative resistance characteristics. Other means of producing negative-current voltage characteristics can also occur.

For example, a stagnant region (see Shockley, Analog Transistor, Patent 2,790,037, April 23, 1957) producing a field outside of the stagnant region equal to the avalanche field or approaching the avalanche field can be used, and this gives rise to a case in which multiplication depends upon current and is thus similar to the alpha term depending upon current. This can be coupled with a region like the hook-collector region just discussed in which the hook-collector action depends upon voltage. Such a device may have an application in some cases. It has the disadvantage, however, that both of the regions where potential maximum for holes and electrons can occur do not have high lateral conductivity. This, as we shall show in a subsequent section, means that for small signal operation the dimensions of the device must be very small.

SECTION 2.—THE COMPLEX IMPEDANCE OF A THREE-LAYER TRANSISTOR DIODE

2A.—Introduction

FIGURE 2.1 represents the diode considered in this section. Five regions are represented within the diode: the emitter body itself, assumed to be p-type and denoted by $\epsilon$; a transition region T between the p-type emitter and n-type base (this is the region in which most of the recombination current occurs in the silicon p-n junction); the n-type base layer itself, denoted by $b$; the space-charge regions between the base layer and the collector produced by reverse bias in which multiplication by secondary generation occurs; and finally, the p-type collector body denoted by $c$.

The current conventions shown on this diagram are somewhat different from those usually employed in that the sign of the collector current is reversed. This makes possible the equating of the two current $I_\epsilon$ and $I_c$ when the device is operating as a diode with no base current. The base current is shown for purposes of exposition and for use in equations which follow.

In order to treat this example, a set of symbols applying to the A.-C. and D.-C. conditions are defined. The relationships between A.-C. and D.-C. parameters will be developed and the dependence of various parameters upon frequency will also be introduced. The theory developed in this section is a relatively low frequency theory so that only linear terms in the frequency need be considered in various admittance constants which appear in the theory. This suffices to show the general frequency behavior of transistor diodes and to indicate what design aspects must be considered in constructing devices for high frequency performance.

2B.—Notation and functional dependence of the quantities involved

We shall deal with all currents and admittances on a unit-area basis. This simplifies the mathematics, and application to any particular area can easily be made.

In general, the D.-C. quantities will be represented by capital letters with a subscript "o." Total quantities, such as a combination of A.-C. and D.-C. currents, will be denoted as the sum of the capital letter with a subscript "o" and a small letter.

The notation may be conveniently introduced by writing down the equations containing both A.-C. and D.-C. terms, and then discussing the symbols which occur in these equations in order:

$$I_\epsilon = I_{\epsilon 0} + i_\epsilon = I_{\epsilon 0} - g_\epsilon v_b \quad (1)$$

$$I_c = I_{c0} + i_c$$
$$= [M + M'(v_b - v_c)][\alpha_0 I_{\epsilon 0} - \alpha g_\epsilon v_b]$$
$$+ I_{c0} + I_{c0}'(v_b - v_c) + i\omega C_s(v_b - v_s)$$
$$= M\alpha_0 I_{\epsilon 0} + I_{c0} + (-M\alpha g_\epsilon + g_s)v_b - g_s v_c \quad (2)$$

$$I_b = I_{b0} + i_b = I_c - I_\epsilon \quad (3)$$

In these terms, some quantities depend upon the D.-C. bias values $V_{bo}$ and $V_{co}$. Actually, for stability reasons, it might be better to consider the currents as being the independent variables; however, for mathematical purposes, it is more convenient to express functional relationship in terms of the voltages rather than the currents.

Transit time effects through the space-charge region are not explicitly indicated in these equations. They may be included by methods like those of W. T. Read, Jr., in Bell System Technical Journal, "A Proposed High-Frequency Negative-Resistance Diode," vol. 37, pp. 401–446, (1958).

The D.-C. values in Equations 1 to 3 are as follows: (1) the D.-C. currents, and (2) the multiplication M which depends upon the voltage across the space-charge junction, the voltage drop occurring from left to right in the figure and being of magnitude $V_{bo} - V_{co}$. The current $I_{co}$ is assumed to be like that discussed in Section 1 and is the current which would flow between base and collector if the emitter current were zero. Under the D.-C. conditions, the base current is assumed to be zero so that $I_{\epsilon o}$ and $I_{co}$ are equal. Thus, the D.-C. values depend upon voltages as indicated below:

D.-C. values:
$$V_{bo}, V_{co}, I_{\epsilon 0}(V_{bo}) = I_{co} = I_0,$$
$$M(V_{bo} - V_{co}), \alpha_0(V_{bo}), I_{co}(V_{bo} - V_{co}) \quad (4)$$

In this treatment space-charge widening is not considered. It is discussed in Section 6.

The A.-C. terms in Equations 1 to 3 are the two A.-C. voltages and the three A.-C. currents:

$$\text{A.-C. signals: } i_\epsilon, v_b, i_c, v_c, i_b \quad (5)$$

We shall regard these as being sinusoidal functions of time or possibly exponentially increasing or decreasing functions of time. This dependence upon time will be expressed by introducing factors of the form $\exp(j\omega t)$.

The coefficients of the A.-C. terms in Equations 1 and 2 depend upon the D.-C. voltages and upon the frequency term $j\omega$. Their definitions are A.C. coefficients:
$$g_\epsilon(V_{bo}, \omega), M' \equiv \partial M(V_{bo} - V_{co}) / \partial V_{bo} = dM(V_s)/dV_s$$
$$\alpha(V_{bo}, \omega), I_{co}' \equiv \partial I_{co}(V_{bo} - V_{co}) / \partial V_{bo} = dI_{co}/dV_s$$
$$g_s(V_{bo}, V_{co}, \omega) \equiv M' \alpha_0 I_0 + I_{co}' + j\omega C_s$$
$$= I_0(d\ln M/dV_s) + I_{co}' + j\omega C_s \quad (6)$$

It is seen that in the above expressions $M'$ is the rate of change of multiplication with voltage $V_s = V_{bo} - V_{co}$ across the space-charge layer. The complex admittance term $g_s$ is the admittance between base and collector for constant emitter current. The first term in the last expression in (6) results from the approximation that $\alpha_0 M$ is unity discussed in Subsection A, Equation 3. It contains a capacitative term $C_s$ which is simply the capacitance per unit area of the space-charge layer $s$. The meanings of these terms will become somewhat clearer from a discussion of their functional dependence on frequency and their relationship to the D.-C. values which follow.

It should be noted that the currents and admittances so far discussed are expressed on a unit area basis so that the currents are really current densities or amps/cm.$^2$, and the admittance terms are mhos/cm.$^2$. The reader may find it easier, however, to think in terms of amperes and mhos and imagine that a device of unit area is involved.

2C.—Notation for the frequency dependence

For convenience in expressing and considering the frequency dependence of the terms involved in the impedance in the device, we shall represent the variation in admittance up to linear terms in the frequency only. Accordingly, we write $$g_\epsilon(V_b, \omega) = g_\epsilon(0)(1 + j\omega \tau_\epsilon) \quad (1)$$

$$\alpha(V_b, \omega) = \alpha(0)(1 - j\omega \tau_a) \quad (2)$$

in which the (0) notation implies zero frequency. It should be noted that in the admittance of the emitter junction, the frequency dependence is a capacitative term corresponding to the storage of injected charges in the base layer. We shall discuss this term more fully in Subsection 2E. On the other hand, in the alpha term the frequency dependence indicates a delay representing the fact that the injected current which reaches the collector junction will be delayed in phase and in respect to the current injected in the emitter. The delay of current reaching the collector junction in respect to voltage applied across the emitter junction is given by the term $\alpha g_\epsilon$ and from (1) and (2) this term is evidently $$\alpha g_\epsilon \doteq \alpha(0) g_\epsilon(0) [1 - j\omega(\tau_a - \tau_\epsilon)] \qquad (3)$$

In order that this represent a delay of current at the collector junction in respect to voltage applied at the emitter junction, it is evident that the time constant $\tau_a$ must be greater than $\tau_\epsilon$:

$$\tau_a > \tau_\epsilon \qquad (4)$$

We shall illustrate the fact that this condition holds for a simple example in Subsection 2E. The final admittance term we need to consider is $g_s$, which is a function of the emitter current and also of the voltage across the collector junction as well as of the frequency. It can be represented as follows:

$$g_s(V_{bo}, V_{co}, \omega) \doteq g_s(0)[1 + j\omega\tau_s] \qquad (5)$$

In the next three sections we shall consider the form for these frequency dependent admittance and alpha terms and relate the differential alpha denoted by $\alpha(0)$ to the D.-C. alpha denoted by $\alpha_0$.

2D.—The collector admittance

The last form of expression (6) in Subsection 2B shows that an important term in $g_s$ involves the derivative of the logarithm of the multiplication M in respect to the voltage across the collector junction. The approximate form, given in Equation 9 in Subsection 1A leads to $$d\ln M/dV_s = d\ln\left[1 - \left(\frac{V_s}{V_B}\right)^n\right]^{-1}/dV_s$$

$$= \frac{n}{V_s}\left(\frac{V_s}{V_B}\right)^n M = \frac{n(M-1)}{V_s} \qquad (1)$$

In the region of negative differential resistance, the $I_0$ term dominates $I_{co}$ in the $g_s$ expression, as discussed in Section 1. The value of $g_s(0)$, the value of the space-charge conductance or admittance at zero frequency, thus becomes $$g_s(0) = n(M-1)I_0/V_s = n(1-\alpha_0)I_0/\alpha_0 V_s \qquad (2)$$

where we have made use of the relationship that $\alpha_0 M$ is substantially unity in the negative-resistance range.

The value of the capacity $C_s$ is obtained in the usual way for reverse biased p-n junctions, since all quantities in this section apply to unit area, $C_s$, and may be written in the form $$C_s = H\epsilon_0/W_s \qquad (3)$$

where H is the dielectric constant of silicon, $\epsilon_0$ is the permeativity of free space, and $W_s$ is the width of the space-charge region.

Equations 2 and 3 lead readily to the value of $\tau_s$ needed for the frequency dependence of $g_s$ and we obtain $$\tau_s = C_s/g_s(0) = H\epsilon_0 V_s/W_s n(M-1)I_0$$
$$= H\epsilon_0 V_s \alpha_0 / n(1-\alpha_0) I_0 W_s \qquad (4)$$

For use in determining design parameters, it should be noted that in the space-charge region the electric field is close to that which will produce substantial multiplication in a distance equal to the width of the space-charge region. This field depends slightly on the width of the space-charge region but to a first approximation it is substantially the same for junctions which break down over a considerable range of voltages, say from 5 volts to 50 volts. If we denote this critical field by $E_s$, then we will have to a fair approximation $$V_s/W_s \doteq E_s \qquad (5)$$

Inserting this value in Equation 4 and solving the equation for the current density $I_0$, we obtain $$I_0 = H\epsilon_0 E_s \alpha_0/n(1-\alpha_0)\tau_s \qquad (6)$$

In this equation, it is seen that the expression $H\epsilon_0 E_s$ has the dimensions of charge per unit area and corresponds to the dielectric displacement which must exist in an avalanche region to produce multiplication. This quantity divided by $\tau_s$ has the dimensions of a current density, and is a critical density characteristic of the material being used and the desired upper limit of the frequency response which is determined by $\tau_s$. The factor involving $\alpha_0$ and $n$ has the value approximately 1/10 and reduces the required value of $I_0$ somewhat.

As we shall see later, the value of $\tau_s$ plays a significant role in determining the upper limit to which a transistor diode of the form considered here will exhibit negative resistance.

In this treatment and in subsequent parts of this exposition, transit time effects across the space-charge region are neglected. This is a simplification and not essential to the treatment or to the operation of the devices considered. A discussion of transit time effects will be found in W. T. Read, Jr., "A Proposed High-Frequency Negative-Resistance Diode," Bell System Technical Journal, vol. 37, pp. 401–446 (1958).

2E.—Frequency dependence of alpha and the admittance for a uniform base layer The situation in the emitter region is more complex than that in the collector region. In this subsection it will be shown that the relationship (4) in Subsection 2C is valid for a simple emitter-base structure in which all of the current flow consists of minority carriers diffusing in the base layer.

For a uniform base layer with large lifetime, the hole density for small A.-C. signals can easily be shown to vary with distance according to the expression $$p = p_0 \exp(j\omega t) \sinh x(j\omega/D)^{1/2} \qquad (1)$$

where the space variable $x$ is chosen to be zero at the boundary of the space-charge region and equal to W at the base-emitter junction, and D is the diffusion constant for minority carriers. The hole diffusion current in the base layer is proportional to a partial derivative of $p$ in respect to distance and thus varies as $$\frac{\partial p}{\partial x} = (p_0/W) \exp(j\omega t)(j\omega W^2/D)^{1/2} \cosh x(j\omega/D)^{1/2} \qquad (2)$$

The boundary condition at the emitter is such that for a constant voltage amplitude a constant amplitude of $p$ is obtained at $x = W$. Accordingly, the admittance $g_\epsilon$ at the emitter junction is proportional to the ratio of (2) and (1), and an examination of this ratio suffices for determining the frequency dependence. Thus, we may write $$g_\epsilon \alpha (\partial p/\partial x)_W/p_W = (j\omega W^2/D)^{1/2} \coth(j\omega W^2/D)^{1/2}$$
$$\doteq (1 + j\omega W^2/3D) \qquad (3)$$

from which it follows that the quantity $\tau_\epsilon$ introduced in Equation 1 in Subsection 2C is given by $$\tau_\epsilon = W^2/3D \qquad (4)$$

The variation of alpha with frequency can also be obtained by a simple ratio. Alpha is the ratio of current at the collector junction to current at the emitter junction for the case assumed here. Thus, $\alpha$ is found to be $$\alpha = (\partial p/\partial x)_0/(\partial p/\partial x)_W = \text{sech}(j\omega W^2/D)^{1/2}$$
$$\doteq (1 - j\omega W^2/2D) \qquad (5)$$

from which we conclude that the quantity $\tau_a$ given in Equation 2 in Subsection 2C is $$\tau_a = W^2/2D \quad (6)$$

The term $\tau_a$ gives, in effect, the delay of the current at the collector junction compared to that flowing at the emitter junction. The current at the emitter junction, however, leads the applied voltage by the time $\tau_e$ since this current contains a capacitative term. Thus, the current at the collector junction does not lag by $\tau_a$ but by the smaller amount $\tau_a - \tau_e$ in respect to the voltage across the emitter junction. The lag of current at the collector junction in respect to voltage at the emitter junction is thus given by $$\tau_a - \tau_e = W^2/6D \quad (7)$$

This treatment suffices to illustrate the way in which the terms in $\tau_e$ and $\tau_a$ may arise in a simple case. A more complete treatment would take into account built-in fields in the base layer which alter the hole distribution in the base layer from (1). Furthermore, capacitative and conductive terms for the transition region must be included in considering high frequency devices. (See copending application Ser. No. 783,026, filed December 26, 1958, now Patent No. 2,953,488.) It is chiefly the conductive term in the transition region which gives rise to the variation of $\alpha$ with current required for the three-layer transistor diode in this section. These terms may be chosen so that the desired variation of $\alpha$ with current may be obtained but at the expense of some increase in the effective value of $\tau_e$ for a given base width. These matters have to do with refinement of design, however, rather than general principles, and will not be considered here.

It may be noted that smaller time lags than $\tau_a = W^2/2D$ can be produced by using base material having minority carrier lifetimes $\tau_b$ less than $\tau_a$. For this case, the appropriate diffusion equation for minority carrier is $$\partial p/\partial t = j\omega p = D(\partial^2 p/\partial x^2) - p/\tau_b \quad (8)$$

A solution is $$p = p_0 \exp(j\omega t) \sinh x[(j\omega + \tau_b^{-1})/D]^{1/2} \quad (9)$$

This leads to a value of $\alpha$ as follows:

$$\alpha = (\partial p/\partial x)_0/(\partial p/\partial x)_W = \mathrm{sech}\; W[(j\omega + \tau_b^{-1})/D]^{1/2}$$
$$\doteq 2[\exp(W^2/D\tau_b)^{1/2}][1 + j\omega(\tau_b W^2/4D)^{1/2}] \quad (10)$$

The last expression is valid for the case in which $\tau_b$ is much less than $(W^2/2D)$ and $\omega\tau_b$ is much less than unity. Thus the effective value of $\tau_a$ for this case is $$\tau_a = [(\tau_b/2)(W^2/2D)]^{1/2} \quad (11)$$

so that $\tau_a$ is the geometric mean of the $\tau_a$ of Equation 6 and $(\tau_b/2)$. In order that $\alpha_0 M$ be approximately unity, the value of $\alpha(o)M$ must be greater than unity (this point is discussed more fully in Equation 6 in Subsection 2F). Hence, it follows that $$\exp{-(W^2/D\tau_b)^{1/2}} \doteq 1/M \quad (12)$$

so that $$\tau_b \doteq 2(W^2/D)/(lnM)^2 \quad (13)$$

and that $$\tau_a \doteq (W^2/2D)/2^{1/2} lnM \quad (14)$$

For this case, the phase lag is thus reduced by the logarithm of the multiplication factor. Thus, the frequency response of a transistor diode can be increased by having strong attenuation of injected carriers in the base layer (a result which follows from the dependence of limiting frequency upon $\tau_a$ as discussed in Equation 11 in Subsection 2G).

The physical interpretation of the reduction in phase lag is simple. If $\tau_b$ is very short compared to $W^2/2D$, the carriers reaching the collector at a given instant cannot have started $W^2/2D$ earlier because they would have recombined already; of those that started only $\tau_b$ earlier, a very small fraction have arrived. The geometric means (11) represents the time for the most important group of holes arriving at any instant.

This treatment has been intended to be illustrative of principles rather than a basis for optimum design. Optimum design will make use of built-in drift fields such as are discussed by W. Shockley, Bell System Technical Journal, vol. 33, 799–826 (1954), and H. Kroemer, Arch. Electr. Ubertr., vol. 8, pp. 223–228, 363–369, 499–504 (1954). It will also make use of optimum emitter junction design theory, see copending application Serial No. 783,026, filed December 26, 1958, now Patent No. 2,953,488. The same considerations will apply to four-layer diodes also.

2F.—*The relationship of the D.-C. alpha and the zero frequency A.-C. alpha*

The value of the D.-C. alpha, denoted by $\alpha_0$, is given by the ratio of the current injected at the emitter which arrives at the space-charge junction to the entire current flowing into the emitter lead. This ratio may be written in the form $$\alpha_0 = \beta I_{2b}/(I_1 + I_2) \quad (1)$$

Where in the notation of Subsection 1D, particularly Equation 15, $\beta$ is the transmission factor through the base layer, $I_{2b}$ is the minority carrier current injected into the base (thus $\beta I_{2b}$ is the minority current reaching the depletion layer), $I_2$ is the total injected current, and $I_1$ is the current combining in the transition region. $I_1 + I_2$ is thus the total current $I_{\epsilon o}$ across the emitter junction.

For current values $I_{\epsilon o}$ for which $\alpha_0$ is increasing with $I_{\epsilon o}$, the zero frequency A.-C. $\alpha(o)$ is greater than $\alpha_0$; in fact, from the definition of $\alpha(o)$ the following equation results:

$$\alpha(o) = d(\alpha_0 I_{\epsilon o})/dI_{\epsilon o} = \alpha_0 \left[ 1 + \frac{dln\alpha_0}{dlnI_{\epsilon o}} \right] \quad (2)$$

Thus, for example, where $\alpha_0$ is proportional to $I_{\epsilon o}$, the value of $\alpha(o)$ is just twice $\alpha_0$.

The expression for $\alpha(o)/\alpha_0$ can be simplified for the case in which the injected currents vary as the Boltzmann factor of the voltage $V_{\epsilon o} - V_{bo}$ across the emitter junction, while the current $I_1$ varies as the Boltzmann factor of "$a$" times the voltage where "$a$" is approximately one-half. The assumption that $\beta$ is constant leads to the ratio of increment of transmitted current to increment of total current given by Equation 3:

$$\alpha(o) = \frac{\beta I_{2b}}{aI_1 + I_2} \quad (3)$$

From Equations 1 and 3 it follows that $$\frac{\alpha(o)}{\alpha_0} = \frac{I_1 + I_2}{aI_1 + I_2} = \frac{1}{a(1-\gamma_2) + \gamma_2} = \frac{1}{1 - (1-a)(1-\gamma_2)} \quad (4)$$

where $\gamma_2$ is the ratio of total injected current to total emitter current.

It is again evident from Equation 4 that $\alpha(o)$ must always be larger than the D.-C. $\alpha_0$ so long as the injected current is increasing more rapidly with voltage than the current combining in the transition region. Mathematically this follows from the fact that "$a$" will then be less than one, and since $\gamma_2$ is always less than one, the second term in the denominator is greater than zero and less than unity. Thus, the denominator of Equation 2 lies between one and zero so that $\alpha(o)$ is greater than $\alpha_0$.

As an example, if we take for "$a$" the good approximation of 0.5, assume that $\gamma_2$ under bias conditions is one-fourth, and neglect recombination in the base layer and injection into the emitter body so that $\alpha_0$ is also one-fourth, then the value of $M$ will be approximately 4; and if the exponent $n$ in the expression for avalanche multiplication is taken as 3, the voltage across the space-charge junction will be approximately 63% of the breakdown voltage. For this approximation with "$a$" equal to 0.5 and $\gamma_2$ equal to 0.25, Equation 2 leads to $$\alpha(o) = 1.6\alpha_0 \qquad (5)$$

It may be noted that the largest value obtainable for (4) will occur as $\gamma_2$ approaches zero. If "$a$" has a value of one-half under these circumstances, $\alpha(o)$ will be just twice $\alpha_0$. It is thus evident that the ratio between $\alpha(o)$ and $\alpha_0$ will not vary in an extremely striking way under most circumstances.

2G.—The impedance for unit area measured at the collector with the base floating The preceding subsections can be used to evaluate the A.C. impedance in the negative resistance region for the three-layer transistor diode and analyze its frequency response. Thus, the three A.-C. parts of Equations 1, 2 and 3 in Subsection 2B are as follows:

$$i_\epsilon = -g_\epsilon v_b \qquad (1)$$

$$i_c = (-M\alpha g_\epsilon + g_s) v_b - g_s v_c \qquad (2)$$

$$i_b = [(1-M\alpha) g_\epsilon + g_s] v_b - g_s v_c \qquad (3)$$

In these equations $M\alpha$ differs significantly from $M\alpha_0$ as discussed in (6) below. The impedance is evaluated by noting that if the base is floating and the device is being used as a diode, $i_b$ is equal to zero so that Equation 3 may be solved for $v_b$:

$$v_b = g_s v_c / [(1-M\alpha) g_\epsilon + g_s] \qquad (4)$$

Since with $i_b$ equal to zero, $i_c$ is equal to $i_\epsilon$, the current $i_c$ is given by (1). Since, in accordance with the current convention of FIG. 2.1, $i_c$ is the current out of the collector terminal while $v_c$ is the A.C. voltage on the terminal, the impedance looking into the terminal is $-v_c/i_c$. Thus, the impedance for the unit area structure is $$Z = -v_c/i_c = v_c/g_\epsilon v_b = (1-M\alpha)/g_s + 1/g_\epsilon$$
$$= \frac{1 - M\alpha(0)(1 - j\omega t_\alpha)}{g_s(0)(1 + j\omega t_s)} + \frac{1}{g_\epsilon(0)(1 + j\omega t_\epsilon)} \qquad (5)$$

For zero frequency this expression leads to a real negative differential resistance: Since $\alpha(0)$ is larger than $\alpha_0$, the term $M\alpha(0)$ will be larger than unity: In fact, using the approximation $M\alpha_0 = 1$ of Subsection 1A leads to $$M\alpha(0) = M\alpha_0 \alpha(0)/\alpha_0 = \alpha(0)/\alpha_0 \qquad (6)$$

For the example discussed in Equation 5 in Subsection 2F, the first term in $Z$ is approximately $-0.6$ times the collector junction resistance and the second term is equal to the emitter resistance. Thus, the resistance for $\omega = 0$ is $$Z(0) = -R(\text{neg}) = \frac{[1 - M\alpha(0)]g_\epsilon(0) + g_s(0)}{g_s(0) g_\epsilon(0)} \qquad (7)$$

where R (neg) is a positive quantity in the negative resistance region.

In general, the collector resistance will be much larger than the emitter resistance as may be seen as follows: The emitter conductance is approximately the current $I_0$ divided by the thermal voltage $v_\theta$. At room temperature $v_\theta$ is equal to approximately $\frac{1}{40}$ of a volt. Using this approximation for $g_\epsilon(0)$ and using Equation 2 in Subsection 2D for $g_s(0)$, the ratio of the collector impedance to the emitter impedance is approximately $$g_\epsilon(0)/g_s(0) = (I_0/v_\theta)/[n(1-\alpha)I_0/\alpha V_s]$$
$$= \alpha V_s / v_\theta n(1-\alpha) \qquad (8)$$

Taking $n$ as approximately 3 and $\alpha$ as 0.25, this expression reduces to $$g_\epsilon(0)/g_s(0) = 3V_s \text{ (in volts)} \qquad (9)$$

so that the first term will dominate the impedance at zero frequency by a factor of approximately 30 if $V_s$ is as large as 10 volts.

For finite values of $\omega$, the real part of $Z$ is given by $$ReZ = \frac{1 + M\alpha(0)(\omega^2 \tau_\alpha \tau_s - 1)}{g_s(0)(1 + \omega^2 \tau_s^2)} + \frac{1}{g_\epsilon(0)(1 + \omega^2 \tau_\epsilon)} \qquad (10)$$

From this we see that if the $\omega^2$ term (in the numerator of the first term) approaches a value as large as 0.5, then the numerator of the first term will become positive for $\alpha(0)/\alpha$ equal to values of the order of 1.6 discussed in Subsection 2F. Thus, an upper limit for $\omega$ to the approximation given by Equations 5 and 8 is $$\omega^2 \tau_\alpha \tau_s < \frac{1}{2} \qquad (11)$$

From this we see that $\tau_\alpha$ and $\tau_s$ both enter the frequency behavior in equally important ways. The theory developed applies only to small values of $\omega\tau_\alpha$ or $\omega\tau_s$ so that for values as high as 0.7 Equation 5 is not strictly correct. However, the type of consideration presented indicates clearly in what general range of $\omega$ the negative impedance presented by the transistor diode will become complex, and indicates to a first approximation at what point it will lose its negative character.

An alternative treatment which is somewhat more accurate for calculating the dependence of the impedance upon frequency is as follows: The effect of $\alpha$ is approximated by supposing that it delays the emitter current exactly by $\tau_\alpha$. Then $\alpha$ $$\alpha = \alpha(0) \exp(-j\omega\tau_\alpha) \qquad (12)$$

and the dominant term in $Z(\omega)$ becomes $$Z(\omega) = (1 - 1.6 e^{-j\omega\tau_\alpha}) g_s(0) (1 + j\omega\tau_s)$$
$$= \frac{(1 - 1.6 \cos \omega\tau_\alpha + 1.6j \sin \omega\tau_\alpha)(1 - j\omega\tau_s)}{g_s[1 + (\omega\tau_s)^2]} \qquad (13)$$

so that the sign of the real part of $Z(\omega)$ depends on the factor $$1 + 1.6\omega\tau_s \sin \omega\tau_\alpha - 1.6 \cos \omega\tau_\alpha$$
$$= -0.6 + 0.8\omega^2 (2\tau_\alpha\tau_s + \tau_\alpha^2) \qquad (14)$$

The last expression is valid up to terms of second order in $\omega$. It is seen that if $\tau_s$ is as large as $\tau_\alpha$ the conclusion reached above is valid, but if $\tau_\alpha$ is the larger, then the negative resistance will be substantially deteriorated when $\omega\tau_\alpha$ is of the order of 0.7.

SECTION 3.—LATERAL STABILITY AND SIZE LIMITATION FOR A THREE-LAYER TRANSISTOR DIODE

3A.—Introduction

It is possible to construct a device in accordance with the principles disclosed above which has an internal instability even when it is biased by a high-resistance source. In this particular instability, the total current through the device does not change, but in one portion the change in collector current is positive and in the other it is negative. The collector voltage remains constant under these conditions but the voltage $v_b$ varies from one part of the base layer to another. This effect is referred to as the lateral stability problem.

Lateral stability may be assured by limiting the lateral dimensions of the device in accordance with principles developed in this section. Other means including the introduction of additional conducting patterns in or around the base layer are discussed in Section 7.

3B.—The diode stability problem

As a preliminary to the consideration of the lateral stability problem, the stability of a device of unit area shunted by an external A.-C. impedance load $Z_L(\omega)$ is examined. Then in accordance with Equation 5 in Subsection 2G $$i_c = -Zv_c = Z_L(\omega) v_c \qquad (1)$$

which says that the current $i_c$ out of the c-terminal equals the current into $Z_L(\omega)$. Thus if $v_c$ is not equal to zero, $$Z = -Z_L(\omega) \qquad (2)$$

If $Z_L$ is a pure resistance, denoted by $R_L$, and is approximately equal to R (neg) of Equation 7 in Subsection 2G, then Equation 1 can be solved for a small real value of $j\omega$ as follows: For $j\omega\tau_a$ and $j\omega\tau_s$ small and real, Z can be approximated by first-order terms and Equation 2 becomes $$R_L = -Z = +R(\text{neg}) - \left[\frac{M\alpha(0)\tau_a + (M\alpha(0)-1)\tau_s}{g_s(0)} - \frac{\tau_\epsilon}{g_\epsilon(0)}\right]j\omega \qquad (3)$$

The coefficient of $j\omega$ is in general positive for reasons like those discussed in connection with Equation 9 in Subsection 2G. Thus, if $R_L$ is greater than R (neg), $j\omega$ will also be negative, corresponding to an exponentially damped disturbance. On the other hand, for $R_L$ less than R (neg), exponentially increasing solutions will occur.

In terms of a load line on the current-voltage plot, these conclusions correspond to requiring that the load line make only a single intersection with the curve at an operating point like that illustrated in FIG. 3.1.

The impedance of Equation 3 can be expressed in terms of a negative R and positive L in series:

$$Z = -R + j\omega L \qquad (4)$$

$$R = R(\text{neg}) = (M\alpha(0)-1)/g_s(0) - 1/g_\epsilon(0) \qquad (5)$$

$$L = \frac{M\alpha(0)\tau_a + [M\alpha(0)-1]\tau_s}{g_s(0)} - \frac{\tau_\epsilon}{g_\epsilon(0)} \qquad (6)$$

If this equivalent circuit is connected to ground with a resistance $R_L$, the current will vary as $$\exp[R(\text{neg}) - R_L]t/L \qquad (7)$$

Thus, for $R_L$ greater than R(neg) disturbances decay, and for R (neg) greater than $R_L$ they build up. This approximation is valid only for small values of the $\omega\tau$ quantities in Equation 5 of Subsection 2G, since only first-order terms in that equation were used.

The impedance Z of Equation 5 in Subsection 2G can be exactly represented by an equivalent circuit with frequency independent lumped constants as represented in FIG. 3.2 in which the values of the circuit elements are $$R_1 = M\alpha(0)\tau_a/g_s(0)/\tau_s \qquad (8)$$
$$R_2 = [M\alpha(0)(\tau_s - \tau_a)/g_s(0)\tau_s] - 1g_s(0) \qquad (9)$$
$$R_3 = 1/g_\epsilon(0) \qquad (10)$$
$$C_2 = \tau_s/R_2 \qquad (11)$$
$$C_3 = \tau_\epsilon g_\epsilon(0) \qquad (12)$$

The A.-C. behavior at low frequencies can be analyzed in terms of this circuit; however, when any of the $\omega\tau$ values becomes comparable to unity, the linear approximations on which the complex conductance terms $g_\epsilon$, $g_a$ and $g_s$ were based become questionable, especially for $\tau_\epsilon$ and $\tau_a$. It may be noted that the sum of the three resistances of the equivalent circuit is $-R$ (neg), as it should be.

3C.—The base impedance in a transistor structure

It is evident that short circuiting the transistor diode for A.-C. will lead to instability, and the same would be true for a transistor of the same structure but with a floating base. If the base is grounded, however, stability can again be achieved. To show this, the expression for the base admittance as a function of the load between emitter and collector is derived. The relevant equations are $$i_\epsilon = -g_\epsilon v_b \qquad (1)$$
$$i_c = (-M\alpha g_\epsilon + g_s)v_b - g_s v_c \qquad (2)$$
$$v_c = Z_L i_c \qquad (3)$$
$$i_b = i_\epsilon - i_s \qquad (4)$$

Elimination of $v_c$ and $i_c$ from these equations leads to $$i_b = \frac{[(1-M\alpha)g_\epsilon + g_s + g_\epsilon g_s Z_L]}{1 + g_s Z_L} v_b \qquad (5)$$

so that the admittance $A_b$ looking into the base terminal is $$A_b \equiv i_b/v_b = g_\epsilon g_s(Z + Z_L)/(1 + g_s Z_L) \qquad (6)$$

The base will exhibit a negative resistance at zero frequency if $R_L$, the real part of $Z_L$, is smaller than R(neg). Thus negative resistance arises at the base terminal under the same circumstances that produce an unstable load line in FIG. 3.1.

As a next step toward considering the problem of lateral stability, the resistance between base and ground that will stabilize the transistor when the collector is short circuited is evaluated. Setting $Z_L = 0$ leads to an admittance at the base terminal given by $$A_b = g_\epsilon g_s Z = (1-M\alpha)g_\epsilon + g_s$$
$$= g_\epsilon(0)(1+j\omega\tau_\epsilon) - M\alpha(0)g_\epsilon(0)$$
$$\quad [1 - j\omega(\tau_a - \tau_\epsilon)]g_s(0)(1+j\omega\tau_s)$$
$$= -g_\epsilon(0)g_s(0)R(\text{neg})$$
$$+ [g_\epsilon(0)\tau_\epsilon + M\alpha(0)g_\epsilon(0)(\tau_a - \tau_\epsilon) + g_s(0)\tau_s]j\omega$$
$$\equiv -G_b + j\omega C_b \qquad (7)$$

This corresponds to a parallel combination of a negative conductance $-G_b$ and since $\tau_a - \tau_\epsilon$ is positive according to Equation 4 in Subsection 2C, a positive capacitance $C_b$. This combination is, of course, open circuit unstable and an exponential build-up will occur in keeping with the short-circuit instability for the transistor diode already concluded in connection with Fig. 3.1. Stability can be achieved by connecting a positive conductance greater in magnitude than $$G_b \equiv g_\epsilon(0)g_s(0)R(\text{neg}) = [M\alpha(0)-1]g_\epsilon(0) - g_s(0) \qquad (8)$$

between base terminal and ground. This quantity is of the general magnitude of $g_\epsilon(0)/2$ for the cases of chief interest, a conclusion that may readily be reached by the reasoning employed in Subsection 2G, especially Equation 9.

3D.—Simplified model for lateral stability problem

The lateral stability problem for a large-area transistor diode can be understood in terms of two transistors connected together. This is illustrated in FIG. 3.3. Here the large-area diode is represented as being connected to an infinite impedance source of current $I_0$. It may not be stable, however, for reasons like those which produce instability in the two transistors shown in FIG. 3.4. FIGURE 3.5 represents a disturbance which can occur for the two transistors. Here the disturbance corresponds to equal but opposite disturbances in the two so that the voltage $v_c$ remains zero and the total current remains $I_0$. Thus, in each transistor the currents vary as if the collector were short-circuited to ground.

To a first approximation, the transistor diode may be regarded as equivalent to two transistors each having negligible base resistance with the connecting resistor 2R corresponding to resistance to sidewise or lateral current flow in the base layer of the transistor diode. Lateral instability is then seen to arise as follows: As the edge L of the transistor diode is made longer, the admittance of the transistor diode increases as $L^2$. On the other hand, the resistance R does not depend on L since the resistance of a rectangular conducting sheet from edge to edge depends on its shape but not its size. The critical condition occurs when $$1/R = (L^2/2)g_\epsilon(0)g_s(0)R(\text{neg}) = (L^2/2)G_b \qquad (1)$$

where the right side is the admittance of a base terminal for a transistor of area $(L^2/2)$ rather than of unit area.

The equation for R is approximately $$1/R = 4\sigma$$

where $\sigma$ is the sheet conductance in the base layer, i.e., the conductance from one side of a square to the opposite side. The factor four is estimated as follows: On the average the base current has to come from the middle of the base layer. Thus, it flows from long edge to long edge of a rectangle of dimensions L by $L/4$. Such a rectangle has a conductance of $4\sigma$.

Thus, for stability in the transistor diode we must have $$L^2 < 8\sigma/g_\epsilon(0)g_s(0)R(\text{neg})$$
$$= 8\sigma/[(M\alpha(0)-1)g_\epsilon(0)-g_s(0)] \quad (3)$$

This result is approximately correct. However, deeper insight into the lateral stability problem can be gained by considering the possible modes of disturbance in the base layer. This leads to the same form of equation but with the factor 8 replaced by $\pi^2 = 9.8$.

3E.—The lateral stability problem

In an unstable transistor diode, the base potential is a function $v_b(x, y, t)$ of position and time in the base layer. The lateral electric field produces a current, and the current has a divergence so that the current flowing laterally accumulates as a current density of $\sigma \nabla^2 v_b$ per unit area of the base layer. This is evidently equal to the local value of $i_b$, the net loss of charge per unit area of base layer to the current density $i_c - i_\epsilon$.

Thus, the equation for $i_b$, the local density of base current becomes $$i_b = [(1-M\alpha)g_\epsilon + g_s]v_b = \sigma \nabla^2 v_b \quad (1)$$

For this case $v_c$ has been set equal to zero. (This follows from the fact, which need not be analyzed here, that the differential equation for $i_b$ can be expanded in a set of eigen-functions in $x$ and $y$ and only the lowest or trivial case admits a term which is independent of $x$ and $y$, as must be the case for $v_c$, since the collector is assumed to be an equipotential.)

Equation 1 is essentially an equation of the form $$\nabla^2 v_b = \lambda v_b \quad (2)$$

which is a well-known form of eigen-function equation. $v_b$ is the unknown eigen-function of coordinates $x$ and $y$ in the base layer and $\lambda$ is the eigen-value. As is well known from the theory of characteristic functions and characteristic values, the values are determined by the boundary conditions. For a simple transistor diode, the boundary condition is that no base current leave the base layer at the periphery of the device. Thus, we may write for the boundary condition $$\partial v_b/\partial n = 0 \quad (3)$$

where $n$ represents distance measured perpendicular or normal to the periphery of the base layer.

The value of $\lambda$ which satisfies Equation 1 for $\omega = 0$ represents the critical condition separating stability from instability. It is analogous to connecting the bases of the two transistors of FIG. 3.4 together with a resistance given by Equation 1 in Subsection 3D. The value of $\lambda$ corresponding to this condition is given by $$\lambda\sigma = (1-M\alpha)g_\epsilon + g_s$$
$$= -G_b + j\omega C_b \quad (4)$$

the last expression being in the notation of Equation 7 of Subsection 3C. Evidently stable conditions correspond to negative values of $\lambda$ with $$\lambda\sigma < -G_b \text{ or } (-\lambda\sigma) > G_b \quad (5)$$

so that $j\omega$ is negative, giving a disturbance that decays exponentially in time.

The possible eigen-values of $\lambda$ permitted by Equations 2 and 3 are negative and depend on the dimensions of the structure. If $(-\lambda\sigma)$ is more positive than $G_b$, then a lateral disturbance decays as $$\exp-[(-\lambda\sigma)-G_b]t/C_b \quad (6)$$

This expression shows that if $(-\lambda\sigma)$ is larger than $G_b$ decay occurs and, if smaller, build-up occurs.

Equations 2 and 3 are analogous to the vibrations of a stretched membrane whose periphery is attached to the frictionless walls of a cylinder. The lowest eigen-function for such a membrane corresponds to zero frequency and represents the entire membrane sliding along the cylinder as a flat sheet. This represents the case of the short-circuited transistor diode which was shown to be unstable in connection with the discussion following Equation 7 of Subsection 3C.

As a simple example for which the lowest eigen-value can be readily found, we consider a rectangular transistor diode structure having dimension L in the $x$ direction and an equal or smaller dimension in the $y$ direction. The simplest eigen-function for this case having the lowest value of $\lambda$ other than zero is $$v_b(x,t) = \cos(\pi x/L) \exp(j\omega t) \quad (7)$$

where $x = 0$ and $x = L$ are the edges of the rectangle. This eigen-function is represented in FIG. 3.6. For this equation, it is evident that the eigen-value $\lambda$ is given by $$\lambda = -(\pi/L)^2 \quad (8)$$

so that the lateral flow in the base layer produces an effective source strength for base current per unit area given by $$i_b = \sigma \nabla^2 v_b = -(\pi/L)^2 \sigma v_b \quad (9)$$

Inserting this expression in Equation 1 leads to $$(\pi/L)^2 \sigma + [1-M\alpha(0)]g_\epsilon(0) + g_s(0)$$
$$+ j\omega\{g_\epsilon(0)[\tau_\epsilon - M\alpha(0)\tau_\epsilon + M\alpha(0)\tau_a]$$
$$+ g_s(0)\tau_s\} = 0 \quad (10)$$

which now becomes an equation for $j\omega$. That is, for this particular eigen-function there will be only one value of $j\omega$ which satisfies the equation. Furthermore, if L is very large so that the eigen-value $\lambda$ is very small, then the real term of Equation 10 is negative in accordance with the reasoning used in respect to the impedance (Equation 5 in Subsection 2G) discussed earlier. Consequently, the only value of $j\omega$ which will satisfy this equation is for $j\omega$ to be itself real and positive. This corresponds in Equation 4 to an exponentially increasing solution and thus to the form of internal instability referred to in the first part of this subsection. It should be noted that in the coefficient of $j\omega$ the terms involving M occur multiplied by $\tau_a - \tau_\epsilon$, and as discussed in Subsections 3C and 3E this quantity is positive.

In order that there can be no real positive values for $j\omega$, it is necessary that the terms in Equation 10 that do not involve $j\omega$ be positive, and this requires that the term involving the eigen-value $\lambda$ be more positive than the negative admittance of the base layer. This requires that the dimension L introduced in Equation 7 satisfy the inequality $$L^2 < \pi^2\sigma/\{[M\alpha(0)-1]g_\epsilon(0)-g_s(0)\} \quad (11)$$

It should be noted that for the rectangular case considered, if L satisfies this inequality then no other eigen-function will build up exponentially, since the eigen-value given by Equation 8 will be the smallest eigen-value. The other modes of operation will involve cosines of the other dimension, such as is represented in FIG. 3.7, or harmonics of the cosine of Equation 7 and all of these will lead to larger values of $\lambda$ than Equation 8 and hence to more rapidly decaying disturbances in Equation 6.

A numerical approximation for the value of L in Equation 11 may be obtained by noting that the term in $g_\epsilon(0)$ dominates the denominator in accordance with conclusions reached in Subsection 2G, Equation 9. The approximate value of 1.6 for $M\alpha(0)$ discussed in Equation 6 of Subsection 2G, reduces Equation 11 to $$L^2 < \pi^2\sigma/0.6g_\epsilon(0) \cong 16\sigma/g_\epsilon(0) \quad (12)$$

Insight into Equation 12 is helped by considering Equation 4 which may be looked at usefully as follows: The quantity $(-1/\lambda)$ is an effective area. The relationship for stability $$\sigma > (-1\lambda)[(M\alpha-1)g_\epsilon - g_s] = (-1/\lambda)G_b \qquad (13)$$

evaluated at zero frequency states that the conductance per square of the base layer expressed in mhos must exceed the negative conductance of an area $(-1/\lambda)$ of the base layer. The negative conductance per unit area of base layer is also seen from Equation 8 in Subsection 3C to be $$G_b \doteq g_\epsilon(0)/2 > 1/R(neg) \doteq g_s(0)/2 \qquad (14)$$

where R(neg) is the slope of the current-voltage characteristic as discussed in Equation 5. Thus it is seen that $G_b$, the negative conductance per unit area of base layer, is generally much larger than $1/R(neg)$.

The negative conductance $G_b$ can be expressed to a crude approximation in terms of the current $I_o$ since $$g_\epsilon \doteq I_o/v_\theta \qquad (15)$$

Taking $M\alpha(0)$ as 1.5 we can then write $$\sigma > (-1/\lambda)I_o/2v_\theta \doteq L^2 I_o/20v_\theta \doteq 2L^2 I_o \qquad (16)$$

where $L^2$ is the area and for a device at room temperature $v_\theta = 1/40$ volts and $L^2 I_o$ is the total D.-C. current, I (total) in amperes. This leads to $\sigma$(mhos per square) > twice total current in amperes (17)

as a rough but helpful approximation.

In the interests of simplicity of exposition, certain steps required to make rigorous treatment have been omitted. In brief, the omitted steps are as follows: An arbitrary $v_b(x, y, t)$ should first have been expanded in terms of a complete set of eigen-functions for Equation 2 subject ot the boundary condition (3). It should be proved that all eigen-values are negative save $\lambda = 0$ corresponding to $v_b = \text{const}$. From the orthogonality of eigen-functions it follows that all save $\lambda = 0$ have zero average values and thus do not contribute to the net current through the diode. This justifies the short-circuit approximation used in connection with Equation E in which $v_c$ is set equal to zero. The additive effect of the individual eigen-functions is obtained in the usual way by multiplying Equation 1 by an eigen-function and integrating. This leaves only one time dependent coefficient of an eigen function which, for the case of the lowest eigen-function with $\lambda = 0$, leads to an equation like Equation 4, which can then be solved for the time dependence. When the g quantities are approximated by linear terms in $j\omega$ only, simple terms like $j\omega C_b$ are obtained. Otherwise, Equation 4 can in principle be solved if the g's and $\alpha$ are known functions of the complex frequency variable $j\omega$.

Equation 12 leads to a substantially larger dimension in the lateral directon in the base layer than would be desirable for a conventional junction transistor operating near the same high frequency limit. This conventional transistor is treated in the next section.

SECTION 4.—COMPARISON BETWEEN TRANSISTOR DIODE AND CONVENTIONAL TRANSISTOR

The same mathematical considerations used in Subsections 3C and 3E apply to a conventional transistor. In this case, M may be taken practically as unity and $g_s$ will be negligible compared to $g_\epsilon$. If we suppose that contact is made to one edge of the base layer so that the input signal proceeds along the base layer in the $x$ direction, then we may write for the base voltage the approximation.

$$v_b = \exp(i\omega t - x/L) \qquad (1)$$

This approximation is valid for the case in which the collector is grounded. In this case, the quantities studied will be in effect short-circuit trans-conductances. We shall be concerned with the parameter L occurring in (1), since this determines the effective penetration of the signal along the base layer. If the collector is not grounded for A.-C. signals, then the effect of the collector capacitance will also enter through the $g_s v_c$ term in the equation for $i_c$ which was neglected in Equation 1 of Subsection 3E. This term will give rise to an additional attenuation of the signal so that the estimate derived below is in effect an upper limit for the effective base extension in the lateral direction.

Inserting the value from Equation 1 into Equation 1 of Subsection 3E leads to $$i_b = \sigma \partial^2 v_b / \partial x^2 = (\sigma/L^2) v_b$$
$$= [(1-M\alpha)g_\epsilon + g_s]v_b \qquad (2)$$

Since M is nearly unity the value for $L^2$ is given by $$L^2 = \sigma/(1-\alpha)g_\epsilon$$
$$= \sigma/j\omega t_a g_\epsilon(0)(1+\omega t_\epsilon) \qquad (3)$$

In the last form of this expression, we have used the low-frequency approximation for alpha and assumed negligible recombination in the base layer, and have neglected $g_s$ compared to $g_\epsilon$.

The effective width of the base layer may be obtained by integrating the voltage function $v_b$ over a distance W:

$$\int_0^W v_b dx = L[1-\exp(-W/L)]v_b(x=0) \qquad (4)$$

From this expression it is seen that the integral of $v_b$ is equal to the quantity L times $v_b$ for very wide base layer. Thus, little is gained by making the base layer much wider than the quantity L and in any event the maximum effective area of operation is not much wider than L.

We next consider the effective value of L at an upper frequency limit corresponding to that considered for the transistor diode in accordance with the discussion of Subsection 2G. We furthermore assume that the quantities $\tau_a$ and $\tau_s$ are approximately equal so that we can operate the transistor diode up to values of $\omega \tau_a$ approximately equal to 0.5. Since $\tau_\epsilon$ is of the same order of magnitude as $\tau_a$ for a simple base-layer structure, Equation 3 reduces for this case to $$L^2 = 1.4\sigma/g_\epsilon(0) \qquad (5)$$

which is seen to be more than ten times smaller than Equation 12 of Subsection 3E. Thus, we conclude that substantially smaller base widths are usable for conventional transistors operating near their upper frequency limit than for transistor diodes of the form considered here for comparable base structures.

The performance of a transistor operating near its upper frequency limit is in many ways inferior to that of the transistor diode. The transistor diode maintains substantially constant impedance, independent of frequency up toward its upper limit. A junction transistor, on the other hand, has an alpha value which may vary from nearly unity giving very high values for current gain down to values giving current gain more than 10 times less as it approaches it upper frequency limit. For this reason, it is evident that a dissected amplifier, the Shockley and Shockley, Mason patents, 2,777,906; 2,775,658, and 2,794,864, using transistor diodes will have a flatter frequency response than a transistor with corresponding base-layer parameters. Furthermore, the requirements for fabrication of the base layer itself are much more favorable for the transistor diode. Since it is desirable to keep the alpha high for a transistor, the doping of the base layer must be kept small enough so that recombination currents are small compared to transmitted currents. For the transistor diode, this requirement is not necessary and, in fact, is undesirable. The transistor diode operates by making use of substantial amounts of recombination in a controlled way. Thus, it is possible to have base layers with higher carrier densities and correspondingly larger values for the quantity $\sigma$ in transistor diodes, than for the transistor with comparable frequency response. If the two devices are operated at the same current density level then the $g_\epsilon(0)$ values will be comparable for the two, and the cross-section dimension of the transistor diode will thus be more than 10 times as large.

SECTION 5.—COMPLEX IMPEDANCE AND LATERAL STABILITY IN A FOUR-LAYER TRANSISTOR DIODE

5A.—Introduction

The lateral stability problem of a four-layer diode is similar to that for a three-layer diode but considerably more complex. The additional complexity arises from the fact that there are two base layers rather than one and the diode has, so to speak, two internal degrees of freedom.

A notation similar to that used for the three-layer diode may be employed and thus is represented in FIG. 5.1. The currents across the three junctions are $$i_\epsilon = g_\epsilon(v_\epsilon - v_b) \qquad (1)$$

$$i'_\epsilon = g'_\epsilon(v'_b - v'_\epsilon) \qquad (2)$$

$$\begin{aligned}i_c &= M\alpha i_\epsilon + M'\alpha' i'_\epsilon + g_s(v_b - v'_b) \\ &= -(M\alpha g_\epsilon - g_s)v_b + (M'\alpha' g'_\epsilon - g_s)v'_b \\ &\quad + M\alpha g_\epsilon v_\epsilon - M'\alpha' g'_\epsilon v'_\epsilon\end{aligned} \qquad (3)$$

In this notation the quantities with primes apply to the npn structure. As for the three-layer diode, $g_s$ arises chiefly from variation of the multiplication factors M and M' with voltage $V_s$ across the collector junction and is $$g_s = \alpha M I_{co} d(\ln M)/dV_s + \alpha' M' I'_{co} d\ln M/dV_s \\ + dI_{co}/dV_s + j\omega C_s \qquad (4)$$

in keeping with Equation 6 of Subsection 2B, except for the difference in notation in regard to M'. FIGURE 5.2 shows the equivalent circuit.

The general conclusions reached are that if both component transistor structures in the four-layer diode contribute significantly to the negative resistance, then it is important that the lateral stability requirement of Section 3 be met by at least one of the base layers. In fact, under some circumstances it suffices to have the lateral stability requirement met by only one base layer. These conclusions are special cases of the more general analytical results given in Subsection 5F.

5B.—Diode impedance

The impedance of a diode is found by setting the two base currents equal to zero so that the total current through the device is $i_c$ and $$i_\epsilon = i_c = i'_\epsilon \qquad (1)$$

Equations 1 and 2 in Subsection 5A can be used to eliminate $v_b$ and $v'_b$ in Equation 3 of Subsection 5A. This leads to an equation in $i_c$ and the total A.-C. voltage across the device $v_\epsilon - v'_\epsilon$:

$$i_c = \left[\frac{M\alpha g_\epsilon - g_s}{g_\epsilon} + \frac{M'\alpha' g'_\epsilon - g_s}{g'_\epsilon}\right] i_c + g_s(v_\epsilon - v'_\epsilon) \qquad (2)$$

The impedance is by definition $$\begin{aligned}Z &= (v_\epsilon - v'_\epsilon)/i_c \\ &= \frac{(M\alpha g_\epsilon - g_s)g'_\epsilon + (M'\alpha' g'_\epsilon - g_s)g_\epsilon - g_\epsilon g'_\epsilon}{g_s g_\epsilon g'_\epsilon} \\ &= \frac{1 - M\alpha - M'\alpha'}{g_s} + \frac{1}{g_\epsilon} + \frac{1}{g'_\epsilon}\end{aligned} \qquad (3)$$

(The next to last expression is introduced for later reference in connection with Equation 7 in Subsection 5C.)

The frequency dependence of the impedance for relatively low frequencies may be found by the same procedures as were used in Subsection 2G. The result is Real Part of $Z = -R$ (neg)
$$= \frac{1 - M\alpha(0) - M'\alpha'(0)}{g_s(0)} + \frac{1}{g'_\epsilon(0)} + \frac{1}{g_\epsilon(0)} \qquad (4)$$

Imaginary part of $$\begin{aligned}Z &= j\omega L \\ &= (1/g_s(0))\{M\alpha(0)\tau_a + M'\alpha'(0)\tau'_a \\ &\quad + [M\alpha(0) + M'\alpha'(0) - 1]\tau_s\} \\ &\quad - [\tau_\epsilon/g_\epsilon(0)] - [\tau'_\epsilon/g'_\epsilon(0)]\end{aligned} \qquad (5)$$

As in the case of the three-layer diode, we may conclude that since $$M\alpha(0) + M'\alpha(0) = \frac{M\alpha(0) + M'\alpha(0)}{M\alpha_o + M'\alpha'_o} \cdot (M\alpha_o + M'\alpha'_o) \qquad (6)$$

and since $$M\alpha_o + M'\alpha'_o \doteq 1 \qquad (7)$$

on the negative resistance characteristic, the quantity which plays the role of $M\alpha(0)$ here is a weighted average of $$\alpha(0)/\alpha_o \text{ and } \alpha(0)/\alpha'_o$$

the weighting factors being $$(M/\alpha'_o)/[(M/\alpha'_o) + (M'/\alpha_o)] \qquad (8)$$

and $$(M'/\alpha_o)/[(M/\alpha'_o) + (M'/\alpha_o)] \qquad (9)$$

The value of $M\alpha(0) + M'\alpha'(0)$ will thus be of the order of 1.6 as discussed in Subsection 2G.

Again, as for the three-layer diode, $g_\epsilon$ and $g'_\epsilon$ will generally be much larger than $g_s$. It thus follows that Z will represent a negative resistance and positive inductance in series.

It should also be noted that the four-layer diode equations may be altered to represent the three-layer diode by choosing special values for the constants. Thus, setting $g'_\epsilon$ equal to infinity and $M'\alpha'g'_\epsilon$ equal to zero in effect shorts out the second emitter junction and reduces the four-layer diode to the three-layer case. Setting $M'\alpha g'_\epsilon$ equal to zero and $g'_\epsilon = 1/R_L$ represents a three-layer diode and resistance $R_L$ in series. The flexibility of the model thus prohibits some general conclusions, unless specific relationships among the values are assumed.

5C.—Case of both emitters grounded

As a preliminary to treating the lateral stability problem, the admittance of the base layer connections of FIG. 5.2 will be evaluated for the short-circuited case. Setting the voltages on the emitters equal to zero:

$$v_\epsilon = v'_\epsilon = 0 \qquad (1)$$

leads in terms of the notation defined below to $$\begin{aligned}i_b &= i_c - i_\epsilon \\ &= [(1 - M\alpha)g_\epsilon + g_s]v_b + (M'\alpha'g'_\epsilon - g_s)v'_b \\ &\equiv Av_b + Cv'_b\end{aligned} \qquad (2)$$

$$\begin{aligned}i'_b &= i_\epsilon - i_c \\ &= (M\alpha g_\epsilon - g_s)v_b + [(1 - M'\alpha')g'_\epsilon + g_s]v'_b \\ &\equiv Bv_b + Dv'_b\end{aligned} \qquad (3)$$

where the abbreviations A, B, C, D (used for this section only) are $$A \equiv (1 - M\alpha)g_\epsilon + g_s \qquad C \equiv M'\alpha'g'_\epsilon - g_s \qquad (4)$$

$$B \equiv M\alpha g_\epsilon - g_s \qquad D \equiv (1 - M'\alpha')g'_\epsilon + g_s \qquad (5)$$

$$g_\epsilon = A + B \qquad g'_\epsilon = C + D \qquad (6)$$

In the negative resistance region for the diode, a simple relationship holds between the four constants A, B, C, and D. This is found by noting that, in terms of these constants, the impedance between terminals $e$ and $e'$ given in Equation 3 in Subsection 5B takes the form $$Z = -[B(C+D) + C(A+B) - (A+B)(C+D)]/g_e g'_e g_s$$
$$= [BC - AD]/g_e g'_e g_s \qquad (7)$$

Since the $g$-quantities in the denominator are positive, negative resistance at zero frequency occurs as follows:

Negative Resistance for Diode Means $BC - AD > 0 \qquad (8)$

This is, of course, the condition of interest in investigating lateral stability.

It will next be shown that if condition (8) holds, power may be withdrawn from terminals $b$ and $b'$. If zero frequency voltages $v'_b$ are applied to $b$ and $b'$, then the power furnished to them is $$v_b i_b + v'_b i'_b = A v_b^2 + (B+C) v_b v'_b + D v'_b{}^2 \qquad (9)$$

The sign of the power into $b$ and $b'$ can be expressed in terms of $x$:

$$v_b / v'_b = x \qquad (10)$$

Then the sign of the power flow is the same as the sign of $$A x^2 + (B+C) x + D \qquad (11)$$

which is simply Equation 9 divided by $(v'_b)^2$. This quadratic equation for $x$ has real roots if its discriminant is positive; that is, if $$(B+C)^2 - 4AD = (B-C)^2 + 4(BC - AD) > 0 \qquad (12)$$

However, if condition (8) holds, (12) is positive and (11) has two real values of $x$ that set it equal to zero. For $x$-values in the interval between the roots, one sign of power flow prevails, and for $x$ outside the interval the opposite prevails. It is thus evident that if the four-layer diode has negative resistance between $e$ and $e'$ then when $e$ and $e'$ are shorted for A.-C., the two base layers can be unstable if connected to a passive load having inappropriate impedance characteristics, since the two base layers can deliver power.

As a next step in approaching the lateral stability problem, an analysis is given for the case in which the four-layer diode with grounded emitters has the two bases grounded through conductances $g$ and $g' = rg$. (These conductances will subsequently be identified with lateral conductances in the base layers.) The condition of zero net current to the base terminals then leads to $$0 = i_b + g v_b = (g + A) v_b + C v'_b \qquad (13)$$
$$0 = i'_b + rg v'_b = B v_b + (rg + D) v'_b \qquad (14)$$

These are homogeneous simultaneous linear equations and have a non-vanishing solution only if the determinant of the coefficients of $v_b$ and $v'_b$ vanishes:

$$r g^2 + (rA + D) g + AD - BC = 0 \qquad (15)$$

For any given value of $g$, this is an equation which can be solved for $\omega$ since the coefficients A, B, C, and D are functions of $\omega$. If the linear approximations previously employed are introduced, Equation 15 becomes a quadratic in $\omega$. The terms may be represented to a first approximation by neglecting the smaller $g_\epsilon$ terms as follows:

$$B \equiv M\alpha(0) g_\epsilon(0) - M\alpha(0) g_\epsilon(0)(\tau_a - \tau_\epsilon) j\omega$$
$$\equiv B_0 - B_1 j\omega \qquad (16)$$

$$A = -B_0 + B_1 j\omega + g_\epsilon(0) + g_\epsilon(0) \tau_\epsilon j\omega$$
$$\equiv A_0 + A_1 j\omega \qquad (17)$$

Since the admittance $g_\epsilon(\omega)$ leads the voltage and the transadmittance $M\alpha(\omega) g_\epsilon(\omega)$ lags, the coefficients $B_0$, $B_1$, and $A_1$ are positive with $$0 < B_1 < A_1 \qquad (18)$$

$A_0$ will be positive unless $M\alpha(0)$ is greater than unity; for a symmetrical structure $M\alpha(0)$ will be about 0.8 for the four-layer device for the reasons that made $M\alpha(0)$ about 1.6 in the three-layer device.

Similar conclusions apply to C and D:

$$C = C_0 - C_1 j\omega \qquad (19)$$
$$D = D_0 + D_1 j\omega \qquad (20)$$

In terms of these definitions, Equation 15 may be expanded in powers of $j\omega$:

$$r g^2 + (rA_0 + D_0) g + A_0 D_0 - B_0 C_0$$
$$+ [g(rA_1 + D_1) + A_0 D_1 + A_1 D_0 + B_0 C_1 + B_1 C_0] j\omega$$
$$+ [A_1 D_1 + B_1 C_1](j\omega)^2 \equiv H + J j\omega + K(j\omega)^2 = 0 \qquad (21)$$

It is evident that if $g$ is chosen to make H (that is, the term that does not involve $\omega$) vanish, then one solution will be $j\omega = 0$. This is the case which is particularly relevant to the lateral stability problem. It is considered in the following subsection.

5D.—Transients for $g$ near stability limit

The values of $g$ which make H vanish are the two solutions of the quadratic equation obtained by setting H equal to zero:

$$g = \frac{-(rA_0 + D_0) \pm [(rA_0 + D_0)^2 + 4r(B_0 C_0 - A_0 D_0)]^{1/2}}{2r} \qquad (1)$$

The quantity $B_0 C_0 - A_0 D_0$ is positive if the diode is negative resistance range according to inequality (8) in Subsection 5C. Thus the square root is real and larger in magnitude than $rA_0 + D_0$ so that for any real value of $r$, the two values of $g$ given in Equation 1 are real and opposite in sign; let $g(+)$ be the positive root and $g(-)$ the negative root in (1).

The case of interest for lateral stability for reasons developed below corresponds to $$r > 0 \text{ and } g > g(+) \qquad (2)$$

For $g > g(+)$ the term H of (21) in the preceding subsection must be positive (because H has only two roots for $g$ and represents an upturned parabola being negative only between the two roots).

For H positive, the two roots of (21) in Subsection 5C for $j\omega$ are in general both negative and represent decaying disturbances. This follows from the fact that $$K > 0 \qquad (3)$$

in accordance with Equation 18 in the preceding subsection and the fact that J is also positive for most cases of interest. Accordingly, the solution for $j\omega$ of (21) in the preceding subsection is $$j\omega = \frac{-J \pm [J^2 - 4HK]^{1/2}}{2K} \qquad (4)$$

The square root is less in absolute value than J, thus both roots of $j\omega$ have the sign of $-J$. To show that J is usually positive, we note that the only terms that can be negative in J are $A_0$ and $D_0$. If both $A_0$ and $D_0$ are negative, it can easily be seen that the $g$ term in J is positive and dominates the negative $A_0 D_1$ and $A_1 D_0$ term.

However, if only $D_0$ is negative while $A_0$ is positive, it is possible to have J negative. For example, a three-layer diode corresponding to terminals $\epsilon$, $b$, and $b'$ in FIG. 5.1 may be connected to $\epsilon'$ with a high resistance which equals its own R(neg) and a capacitance in parallel. This will be stable if the capacitance is small enough, which corresponds to a small value of $D_1$ in this case. If the condenser is made large however, $D_1$ also becomes large, and since $A_0$ is negative, J may be made to become negative for any given value of $g$. This is an example of the wide variety of cases covered by the model of FIG. 5.1 and illustrates the design considerations that may be involved.

The stability theory of Equation 21 in Part C of this section will next be applied to the simpler case where the two structures are fairly symmetrical, so that $M\alpha(0)$ and $M'\alpha'(0)$ are both about 0.8 as discussed below Equation 18 of Subsection 5C and all of the $A_o$, $A_1$, $B_o$, etc., quantities are thus positive. Then J and K are positive and for $H=0$ Equation 4 gives two roots $$j\omega \cong -J/K \text{ and } -H/J \qquad (5)$$

The first represents a rapidly decaying disturbance corresponding to $j\omega$ values for which the linear expansions may be rather inaccurate. The second root decays at a rate proportional to $g-g(+)$ since H passes through zero as a function of $g$ near $g=g(+)$.

Thus, when the D.-C. condition $H=0$ is nearly satisfied, one form of disturbance decays or builds up slowly, depending on whether $g$ is larger or smaller than $g(+)$. The other decays quickly.

5E.—*Form of disturbance for slow solution*

Equations 13 and 14 in Subsection 5C show that $$\frac{v_b}{v'_b} = -\frac{C}{g+A} = -\frac{rg+D}{B} \qquad (1)$$

and for low frequencies these may be expressed in terms of the (normally positive) $A_o$, $B_o$, $C_o$, $D_o$ quantities:

$$\frac{v_b}{v'_b} = -\frac{C_o}{g+A_o} = -\frac{rg+D_o}{B_o} \qquad (2)$$

(The second equality is equivalent to $H=0$.) It is evident that for $g>0$, $v_b$ and $v'_b$ have opposite signs. Thus the slow solution for $g(+)$ has opposite values of $v'_b$. This corresponds to the disturbance occurring in a four-layer diode while switching on to high current, i.e., both base layers charge in the forward direction. As $g$ is decreased from $g(+)$, the first fraction increases and the second decreases. They again become equal when $g=g(-)$, and then give positive ratio for $v_b/v'_b$. Thus, the quick decay corresponds to a situation in which the two base layers are biased in the same polarity so as to increase forward bias on one emitter and decrease it on the other.

The results just obtained can readily be extended to considerations of lateral stability.

5F.—*The lateral stability condition*

If the four-layer diode is connected to a load which makes it stable for uniform disturbances in the base layers, it may still be unstable for disturbances which vary over the base layer. The problem may be dealt with for small disturbances by expanding the voltages $v_b$ $(x, y, t)$ and $v'_b$ $(x, y, t)$ in terms of eigen-functions for the boundary conditions for the base layer. As for the case of the three-layer diode, the eigen-function of zero eigen-value corresponds to operation of the device as a diode between terminals, and the other eigen-functions correspond to cases that produce no external currents. The problem of stability again involves the eigen-function with the eigen-value of smallest absolute value. These conclusions may be established in general by standard methods and lead to focusing attention upon the eigen-value of lowest absolute value.

This eigen-function is represented by $f_1$ where $$\nabla^2 f_1(x,y) = \lambda f_1(x,y) \qquad (1)$$

and $$\partial f_1/\partial n = 0 \qquad (2)$$

on the boundary. As discussed at the end of Section 3

$$\int f_1(x,y) dx dy = 0 \qquad (3)$$

over the base layer.

The disturbance in the base layers is represented by $$v_b(x,y,t) = b f_1(x,y) \exp j\omega t \qquad (4)$$

$$v'_b(x,y,t) = b' f_1(x,y) \exp j\omega t \qquad (5)$$

These voltages lead to a lateral flow of current in the base layers having divergences which are equivalent to current sources of $$\sigma \nabla^2 v_b = \lambda \sigma v_b \qquad (6)$$

$$\sigma' \nabla^2 v'_b = \lambda \sigma' v'_b \qquad (7)$$

Since $\lambda$ is negative these are equivalent to grounding the base layers with conductances per unit area of base layer $$g = (-\lambda)\sigma \qquad (8)$$

$$rg = (-\lambda)\sigma' \qquad (9)$$

Since $\lambda$ is negative, this means that lateral flow carries current away from a region of the base layer at a rate per unit area of $(-\lambda)\sigma v_b$. This is equivalent to grounding the base layers of a unit area device by conductances $$g = (-\lambda)\sigma \text{ and } rg = (-\lambda)\sigma' \qquad (10)$$

as in the model discussed above.

In terms of the voltage $v_b$ $(x, y, t)$ it is required that lateral flow provide the currents $i_b$ $(x, y, t)$. This leads to $$\sigma \nabla^2 v_b(x,y,t) = \sigma \lambda b f(x,y) \exp (j\omega t)$$
$$= [Abf(x,y) + Cb'f(x,y)] \exp (j\omega t) \qquad (11)$$

This equation contains the same function of $x$, $y$, $t$ as a factor on both sides. Dividing out this factor and proceeding similarly for $i'_b$ leads to $$0 = [(-\lambda)\sigma + A]b + Cb \qquad (12)$$

$$0 = Bb' + [r(-\lambda)\sigma + D]b \qquad (13)$$

These simultaneous equations are equivalent to Equations 13 and 14 of Subsection 5C with $(-\lambda)_\sigma$ and $r(-\lambda_\sigma$ in the role of $g$ and $rg$ and $b$ and $b'$ in place of $v_b$ and $v'_b$. These equations thus have a solution only if the determinant of the coefficients vanishes. This means that for any given value of $$g = (-\lambda)\sigma \text{ and } r = \sigma'/\sigma \qquad (14)$$

$j\omega$ must be found so as to make Equation 21 in Subsection 5C vanish. This is just the case discussed above. The conclusion reached is that exponential build-up will occur for one solution unless $$-\lambda\sigma = g > g(+) \qquad (15)$$

where $g(+)$ is greater root of Equation 1 of Subsection 5D. In general, if $-\lambda\sigma$ is near $g(+)$, the other mode of disturbance will decay rapidly.

The relative importance of the conductances of the two base layers may be appreciated from the expression for $g(+)$ which is repeated here from Equation 1 of Subsection 5D:

$$g(+) = -\lambda\sigma$$
$$= \frac{[(rA_o + D_o)^2 + 4r(B_o C_o - A_o D_o)]^{1/2} - (rA_o + D_o)}{2r}$$
$$\qquad (16)$$

Several cases will be considered:

*Case 1.*—A normal situation with both transistor structures participating in making $M\alpha + M'\alpha' > 1$ with neither $M\alpha$ alone $>1$. Then all constants $A_o B_o C_o D_o$ are positive. For $r=\infty$, the value of $g(+)$ is 0. The meaning is that the lateral instability cannot arise from the $\epsilon bb'$ structure since the latter is not, per se, in a negative resistance condition and the $b'$ layer is at uniform potential.

*Case 2.*—Suppose $A_o$ is negative so that the $\epsilon bb'$ structure is in a negative-resistance condition. Again let $r=\infty$, then $g(+)$ approaches $-A_o$. This is equivalent to $$-\lambda\sigma = -A_o = -[(1-M\alpha)g_\epsilon + g_s] \qquad (17)$$

which is identical with the formula for the three-layer case given in Subsection 3G. Thus, if one base layer becomes infinitely conducting, the stability is determined by the internal stability of the other structure.

*Case 3.*—$A_o$ and $D_o$ both zero so that the individual structures $\epsilon bb'$ and $bb'\epsilon'$ are both on the edge of stability. Then $$g(+) = [B_o C_o/r]^{1/2}$$
$$= [M\alpha g_\epsilon - g_s)(M'\alpha' g_\epsilon' - g_s)/r]^{1/2} \qquad (18)$$

and $$g+g'=(r^{\frac{1}{2}}+r^{-\frac{1}{2}})[(M\alpha g_\epsilon-g_s)(M'\alpha'g_\epsilon'-g_s)] \quad (19)$$

From this we see that if one layer has zero conductivity, the other must have infinite conductivity. If the layers have equal conductivities, then the conductivity of each is approximately the geometric mean of $g_\epsilon$ and $g_\epsilon'$ divided by $(-\lambda)$. This is about the same as the value found for the three-layer device discussed in Subsection 3E, particularly Equation 13.

The quantities $g(+)$ and $rg(+)$ are seen in general to be dominated by the $g_\epsilon$ terms that occur in them and thus $g(+)$ and $rg(+)$ will be of the same general magnitude as $g_\epsilon$. This leads, by reasoning like that at the end of Section 3, to the conclusion that $_r$ in mhos per square must be of the order twice the total device current in amperes for a device operating at room temperature.

SECTION 6.—SPACE-CHARGE WIDENING IN THE FOUR-LAYER DIODE

6A.—*The space-charge widening effects in a three-layer transistor*

In this section we shall extend the theory discussed earlier in Subsection 1D to the A.-C. current condition so that the impedance can be calculated. The effect of avalanche multiplication will also be included in the theory.

For these calculations it is necessary to include the effect of space-charge narrowing of the base layers upon the current passing across the middle junction of the device. FIGURE 6.1 illustrates the structure chosen for purposes of exposition. It is a three-layer transistor with the small signal voltage $v_1$ applied in the forward direction on the emitter junction, and the voltage $v_2$ applied in the reverse direction upon the collector junction. The A.-C. voltage drop from emitter to collector is thus $v_1+v_2$. The total current flowing in the collector junction may be regarded as made up of three parts: (1) the current which is generated within the space-charge region itself; (2) the electron current diffusing from the p-type collector body; (3) the current arriving, which originated as holes in the emitter body, and as thermally generated holes in the base body. Since the theory will be applied chiefly to cases in which there is substantial forward bias, we shall consider only the hole component which comes from the emitter body. The part of this current which arrives at the collector junction is represented in $$I_{pc}=MI_{pcm}=M(\alpha/\gamma)I_{p\epsilon}=M\alpha I_\epsilon \quad (1)$$

In this equation the symbol $I_{pcm}$ stands for the hole current which arrives in the form of minority carriers at the base side of the base-collector depletion layer. This current is multiplied by secondary processes by the factor M and produces a current at the collector, denoted by $I_{pc}$. $I_{p\epsilon}$ is the hole current entering the base layer from the emitter junction and is equal to $\gamma$ times $I_\epsilon$, the total emitter current. The fraction of the total emitter current which arrives at the collector junction is denoted as in previous pairs by $\alpha$ times $I_\epsilon$.

All of these currents have both A.-C. and D.-C. components. The entire current due to the hole flow considered here may be represented by $$I_{p\epsilon}=I_{p0}+g_{p11}v_1+g_{p12}v_2 \quad (2)$$

$$I_{pc}=I_{pc0}+g_{p21}v_1+g_{p22}v_2 \quad (3)$$

In these equations the D.-C. components of current have an additional subscript 0. The $g$ terms represent the conductances associated with the voltages $v_1$ and $v_2$. For the sign conventions used in FIG. 6.1, these $g$ quantities are all positive: increasing $v_1$ leads to more injection and thus to a larger emitter current and to a larger hole current arriving internally across the collector junction. Increasing $v_2$ leads to space-charge widening and an increase in the effective value of alpha for the emitter, so that $g_{p12}$ is positive. The current across the collector is also increased by increasing $v_2$ so that $g_{p22}$ is positive.

In terms of the previous definitions, it is evident that $$g_{p11} \equiv g_{\epsilon p} \equiv \gamma g_\epsilon \quad (4)$$

$$g_{p21} \equiv M\alpha g_\epsilon \quad (5)$$

The quantity $g_{p22}$ has a more complicated interpretation. It is evaluated by finding the change in the second term of Equation 1 due to a change $\delta v_2$ in the voltage on the collector, while $v_1$ is held constant. Part of this change occurs due to a change in M and part due to the change in the minority-carrier current arriving at the collector junction. These two expressions can be written as follows:

$$g_{p22}=\frac{dM}{dv_2}I_{pmo}+M\frac{\partial I_{pmc}}{\partial v_2}=I_{pco}(dlnM/dV_s)+Mg_{sp} \quad (6)$$

The first term in the last expression is readily obtained by multiplying and dividing by M. The symbol $V_s$ has been introduced in keeping with the usage of earlier sections to represent the voltage drop across the space-charge layer. It is evident that a differential increase in $v_2$ is equal to the corresponding differential increase in $V_s$ when the base is grounded, as in FIG. 6.1. In the last term of Equation 6, the symbol $g_{sp}$ has been introduced to represent the increase in minority carrier current traversing the base and reaching the edge of the depletion layer per unit increase in voltage at the collector. This term arises as a result of space-charge widening which reduces the width of the base layer and increases the hole flow to the depletion layer for a fixed bias across the emitter junction. This current is multiplied by M as it crosses the collector junction.

Narrowing the base and increasing the hole current arriving at the collector junction also results in an increase in current at the emitter. The quantity $\alpha_r$ represents the ratio of these changes and is, in effect, an alpha for hole current across the base layer in the reverse direction.

$$g_{p12}=\alpha_r g_{sp} \quad (7)$$

Similar terms will occur in regard to the last two layers of a four-layer diode and will be distinguished by the superscript ′ in keeping with the notation used in Section 5.

As a result of the space-charge widening effects just discussed, a four-layer diode exhibits a larger conductance across the space-charge junction for situations in which the two emitter-base voltages are each held constant. The new term which replaces $g_s$ of Equation 4 of Subsection 5A in giving the dependence of current across the collector junction upon collector voltage is thus $$\begin{aligned}g_s+Mg_{sp}+M'g'_{sn}\\=\alpha MI_{\epsilon o}dlnM/dV_s+\alpha'I'_{\epsilon o}dlnM'/dV_s\\+dI_{co}/dV_s+j\omega C_s+Mg_{sp}+M'g'_{sn}\end{aligned} \quad (8)$$

in keeping with the notation of Subsection 5A.

Summarizing the results described so far, we see that the effect of space-charge widening is to introduce into the current expression of Subsection 5A the three additional currents given by Equations 9, 10, and 11:

$$\text{addit. } i_c=(Mg_{sp}+M'g'_{sn})(v_b-v'_b) \quad (9)$$
$$\text{addit. } i_\epsilon=\alpha_r g_{sp}(v_b-v'_b) \quad (10)$$
$$\text{addit. } i'_\epsilon=\alpha'_r g_{sn}(v_b-v'_b) \quad (11)$$

As a result, the complete current expressions for this case become $$i_\epsilon=g_\epsilon(v_\epsilon-v_b)+\alpha_r g_{sp}(v_b-v'_b) \quad (12)$$

$$\begin{aligned}i_c=M\alpha g_\epsilon(v_\epsilon-v_b)+M'\alpha'g'_\epsilon(v'_b-v'_\epsilon)\\+(Mg_{sp}+M'g'_{sn}+g_s)(v_b-v'_b)\end{aligned} \quad (13)$$

$$i'_\epsilon=M'g'_\epsilon(v'_b-v'_\epsilon)+\alpha'_r g'_{sn}(v'_b-v'_\epsilon) \quad (14)$$

6B.—*Evaluation of the space-charge widening terms*

A treatment of space-charge widening effects will be found in the publications of J. M. Early, BSTJ, vol. 32, November 1953; see also "Transistor Technology," vol. II, D. Von Nostrand, 1958, p. 289, where this article is reprinted. Early points out that as a result of variation in the width of the space-charge layer due to varying collector bias, a new boundary condition must be introduced on hole flow in the base region. This boundary condition requires the hole density to reach zero on a plane whose position fluctuates. In order to complete the design theory of this section, certain portions of Early's treatment will be presented in a modified form suited to the purposes of this section.

Since the cases of chief interest are those in which injected carrier density largely predominates over thermally generated carriers, the effect of the latter will be neglected in this treatment. Accordingly, the hole density in the base layer is written in the form:

$$p(x,t) = p_{n0}[f_1(x) + f_2(x,t)] + p_{n1}f_3(x,t) \quad (1)$$

In this expression, $p_{n0}$ represents the hole density in the base layer just at the emitter junction, due to the D.-C. forward bias on the base. This density can be written as $$p_{n0}(V_{b0}) = p_n \exp(-V_{b0}/v_\theta) \quad (2)$$

where, in keeping with the previous notation $V_{b0}$ is the D.-C. component of base potential in respect to emitter potential.

In the following treatment we shall assume that the A.-C. component of base voltage is 0 and that A.-C. signals $v_1$ and $v_2$ are applied in the polarities represented in FIG. 6.1. In terms of the notation used elsewhere, these voltages are as follows:

$$v_1 = v_e \neq 0, \quad v_b = 0, \quad v'_b \equiv -v_2 \neq 0 \quad (3)$$

The A.-C. component of hole density is given by $$p_{n1} = (v_1/v_\theta)p_{n0} \quad (4)$$

The functions denoted by the letter $f$ in Equation 1 satisfy different parts of the boundary conditions. $f_1$ represents the D.-C. part of the hole disturbance. It satisfies the continuity equation $$D \nabla^2 f_1(x) - f_1(x)/\tau = 0 \quad (5)$$

in which, as stated earlier, we have neglected the thermal equilibrium density compared to the disturbance and $D$ and $\tau$ are minority carrier diffusion constant and lifetime. Accordingly, $f_1$ must satisfy the boundary conditions:

$$f_1 = 1 \text{ at } x = 0; \quad f_1 = 0 \text{ at } x = W \quad (6)$$

where the average or D.-C. position of the edge of the depletion layer lies at $x = W$ while the emitter junction lies at $x = 0$.

The function $f_2$ represents an A.-C. disturbance which causes the first parentheses to vanish at a moving location for the collector junction. For a sinusoidal disturbance a circular frequency $\omega$, $f_2$ must satisfy $$i\omega f_2 = D \nabla^2 f_2 - f_2/\tau \quad (7)$$

and, since it is assumed that the A.-C. voltage across the emitter is accounted for by $p_{n1}$, it is required that $f_2$ vanish at the emitter junction:

$$f_2 = 0 \text{ at } x = 0 \quad (8)$$

At the collector junction, however, $f_2$ must cancel out the hole density due to $f_1$ in such a way that the density is brought to zero, not at $W$, as is the case for $f_1$ but, instead, at the new position which results from $v_2$ being present. Since we are dealing with a linear theory for the small signals, we can assume that $f_1$ varies linearly in the neighborhood of the D.-C. position, W. Accordingly, we may write $$f_2(x) = f_1(x) \text{ at } x = W + (\partial W/\partial v_2)v_2$$
$$= -\left(\frac{df_1}{dx}\right)\left(\frac{\partial W}{\partial v_2}\right)v_2 \quad (9)$$

In this equation it is evident that the partial derivative of $W$ in respect to $v_2$ is negative, since increasing $v_2$ leads to space-charge widening and harrowing of the base layer. On the other hand, the derivative of $f_1$ is negative at $x = W$. Thus we see that for a positive value of $v_2$, $f_2$ consists of the product of three negative terms and is thus negative. As a result, the sum $f_1 + f_2$ reaches zero at a smaller value of $x$ than would $f_1$ alone. This is the correct result and indicates that when $v_2$ is positive, the plane at which the hole density goes to zero moves toward the emitter.

The term in $f_3$ represents simply the conventional A.-C. component of hole density in the base layer. $f_3$ satisfies the condition $$i\omega f_3 = D \nabla^2 f_3 - f_3/\tau \quad (10)$$

and the boundary conditions $$f_3 = 1 \text{ at } x = 0; \quad f_3 = 0 \text{ at } x = W \quad (11)$$

It is noted that $f_3$ does not satisfy the moving boundary condition (9). Strictly speaking, it should do so; however, since $f_3$ itself is multiplied by a first-order term in the A.-C. voltages and the boundary condition also involves a first-order term in $v_2$, the correction to the $f_3$ term would be second order and thus not necessary to include in a first-order A.-C. theory.

For the case of a uniform base layer, as is implied by the differential equations for $f_1$, $f_2$, and $f_3$, the quantities can be calculated by straightforward procedures. The expressions are simplified by introducing the two symbols $L$ and $s$ by the relationships $$L = (D\tau)^{1/2} \quad (12)$$

$$s = (1 + j\omega\tau)^{1/2} \quad (13)$$

The necessary quantities are then readily evaluated and are found to be $$f_1 = [\sinh(W-x)/L]/\sinh W/L \quad (14)$$

$$\frac{df_1}{dx} = -1/L \sinh W/L \text{ at } x = W \quad (15)$$

$$f_3 = -[\sinh(W-x)s/L]\sinh Ws/L \quad (16)$$

$$f_2 = +\frac{\partial W}{\partial v_2}\frac{v_2}{L}\frac{\sinh xs/L}{(\sinh W/L)(\sinh Ws/L)} \quad (17)$$

In order to evaluate $f_2$, it is necessary to have a value for the derivative of $W$ in respect to $v_2$.

By well-known results, the voltage across a space-charge layer is related to the thickness of the space-charge layer according to the proportionality.

$$V_s \alpha (W_b - W)^m \alpha (Q/Q_0)^m \quad (18)$$

where $W_b$ means the total width of the base layer for zero-applied bias and $Q_0$ is the majority carrier charge density per unit area of the base layer, in accordance with the treatment of Subsection 1D. The exponent $m$ has a value which depends on the type of junction:

$$m = 2 \text{ abrupt}, \quad m = 3 \text{ linear graded} \quad (19)$$

This leads readily to $$\partial W/\partial v_2 = -(W_b - W)/mV_s \quad (20)$$

for the term required in Equation 17.

In terms of the expressions just derived, the coefficients needed for the A.-C. voltage relationships are readily obtained by computing the hole currents in terms of the diffusion constant times the concentration gradient for holes. For hole current crossing the emitter junction due to the applied A.-C. voltage $v_1$, the relationship $$g_{\epsilon p}v_1 = -qDp_{n1}\frac{\partial}{\partial x}f_3(x,t)x=0 \qquad (21)$$

applies and this leads directly to $$g_{\epsilon p}=(qDp_{n0}/v_\theta)(s/L)\coth sW/L \qquad (22)$$

In keeping with Equation 1 in Part A of this section, the ratio $\alpha/\gamma$ is the ratio of hole currents due to $v_1$ at collector and emitter junctions of the base layer, respectively. This leads to $$\alpha/\gamma=(\partial f_3/\partial x)_W/(\partial f_3/\partial x)_0=\operatorname{sech} sW/L \qquad (23)$$

A similar procedure for the terms dependent upon $v_2$ leads to $$gSPv_2 = -qDp_{n0}\frac{\partial}{\partial x}f_2(x,t)x=W \qquad (24)$$

$$=M\frac{(W_b-W)}{MV_a}\frac{qDp_{n0s}}{L^2}\frac{\coth sW/L}{\sinh W/L} \qquad (25)$$

$$\alpha_r=(\partial f_3/\partial x)_0/(\partial f_3/\partial x)_W=\operatorname{sech} sW/L \qquad (26)$$

The expression $qDp_{n0}/L$ occurs in all of the conductance terms $g$. This quantity is simply related to the D.-C. emitter current injected in the form of holes in the base layer:

$$I_{p\epsilon 0}=g_{\epsilon p}(0)v_\theta=(qDp_{n0}/L)\coth W/L \qquad (27)$$

6C.—Evaluation of the impedance

In terms of the quantities that have just been evaluated, a complete set of A.-C. equations may be written down. These may be dealt with most simply if three voltage variables are introduced in terms of the voltage drops from left to right through the four-layer structure across the junction:

$$v_\epsilon - v_b = v_1 \qquad (1)$$
$$v_b - v'_b = v_2 \qquad (2)$$
$$v'_b - v'_\epsilon = v_3 \qquad (3)$$

In terms of these variables, Equations 12 to 14 in Subsection 6A may be written as follows:

$$i_\epsilon = g_\epsilon v_1 + \alpha_r g_{sp} v_2 \qquad (4)$$
$$i_c = M\alpha g_\epsilon v_1 + (Mg_{sp}+M'g'_{sn}+g_s)v_2 + M'\alpha' g' v_3 \qquad (5)$$
$$i'_\epsilon = +\alpha'_r g'_{sn} v_2 + g'_\epsilon v_3 \qquad (6)$$

In order to find the A.-C. impedance corresponding to these equations, the total voltage across the device must be found for an A.-C. current $i$ flowing across all the junctions. This requires that $$i_\epsilon = i_c = i'_\epsilon = i \qquad (7)$$

Equations 4, 5, and 6 may be solved as follows: If Equation 4 is multiplied by $M\alpha$ and Equation 6 by $M'\alpha'$, and these are subtracted from Equation 5, the result is:

$$i_c - M\alpha i_\epsilon - M'\alpha' i'_\epsilon = (1 - M\alpha - M'\alpha')i$$
$$= [g_{sp}M(1-\alpha\alpha_r)g'_{sn} + M'(1-\alpha'\alpha'_r)+g_s]v_2 \qquad (8)$$

This equation can be solved for $v_2$ in terms of $i$. It is seen the $v_2$ will be opposite in sign to $i$ if the sum of $M\alpha$ and $M'\alpha'$ is greater than unity, a result in keeping with the general conclusions reached about four-layer diodes. Equation 4 may be solved for $v_1$ in the form $$v_1 = (i/g_\epsilon) - (\alpha_r g_{sp}/g_\epsilon)v_2 \qquad (9)$$

and Equation 6 may similarly be solved for $v_3$.

The A.-C. impedance is then evidently $$Z(\omega) = (v_1+v_2+v_3)/i = (v_\epsilon - v'_\epsilon)/i$$
$$= \frac{1-M\alpha-M'\alpha'}{g_{sp}M(1-\alpha\alpha_r)+g_{sn}M'(1-\alpha'\alpha'_r)+g_s}$$
$$\left(1-\frac{\alpha_r g_{sp}}{g'_\epsilon}-\frac{\alpha'_r g'_{sn}}{g'_\epsilon}\right)+\frac{1}{g_\epsilon}+\frac{1}{g'_\epsilon} \qquad (10)$$

If the reverse alphas are set equal to zero, corresponding to neglecting the effect of space-charge widening upon the current across the emitter junction, then it is seen that Equation 10 reduces to the impedance expression obtained in Equation 3 in Subsection 5B. In this case the denominator of the first term is shown as composed of three terms arising from the three forms of current crossing the collector junction. It may be noted that $\alpha$ and $\alpha_r$ terms reduce the conductance across the collector junction. The reason is that if these terms are large, the extra current drawn from the emitter by the $\alpha_r$ effect tends to be stolen from the injected current, with the result that the total current across the collector junction does not increase as rapidly as it would if both alphas were small.

The frequency dependence in Equation 10 can be worked out in terms of the expressions previously considered. It should be noted that, in general, the $g_\epsilon$ and $g'_\epsilon$ terms will be much larger than the other $g$ terms, so that the impedance will be largely dominated by the first fraction in Equation 10. It is seen in this fraction that all of the terms present may play an important role. This shows that substantial loss in negative resistance can occur as soon as $\omega\tau$ becomes comparable to unity for any of the $\tau$'s involved.

6D.—Comments on lateral stability

The problem of lateral stability for the four-layer diode, involving space-charge widening effects, is similar to that treated in Section 5, but is made more complex by the presence of the terms involving $\alpha_r$ and $\alpha'_r$. It is evident, however, that negative resistances on the base layers will again be obtained if the two emitter junctions are grounded and that these will again be of the order of the emitter conductances and, thus, approximately equal to $I_0/v_\theta$ where $I_0$ is the total D.-C. current density. From this it follows, as was discussed in Section 3, that the required conductances and, thus, approximately equal to $I_0/v_\theta$ proximately controlled by the inequality (12) of Subsection 3E:

$$L^2 < 16\sigma/g_\epsilon(0) \cong 16v_\theta\sigma/I_0 \qquad (1)$$

where $L$ is now the edge of the structure considered and $v_\theta$ is thermal voltage.

For the case of a symmetrical diode with the current voltage characteristic controlled by space-charge widening, certain simple relationships hold. The conductance per unit square of the n-type base layer is evidently $$\sigma = q\mu_n[Q_0-Q] \qquad (2)$$

since $Q_0-Q$ is the charge of majority carriers per unit area under the operating condition. Proceeding as in Subsection 1D, we note that the D.-C. current is given $$I_0 = I_h\left[1-\frac{Q}{Q_0}\right] = \sigma I_h/\sigma_0 \qquad (3)$$

which leads to the relationship $$L^2 < 16v_\theta\sigma_0/I_h \qquad (4)$$

where $\sigma_0$ is the conductance of the base layer at conditions of zero bias $$\sigma_0 \equiv \mu_n Q_0 \qquad (5)$$

Equation 4 shows the interesting result that the lateral stability of the symmetrical punch-through diode is independent of the operating point.

The expression for $L^2$ may be put in simpler form by making use of the expression for the holding current $I_h$ discussed in Subsection 2D. If we suppose that recombination in the emitter junction occurs over a region of width $W_J$ in which the lifetime, taken the same for holes and electrons, is $\tau_J$, then the equation for holding current may be put in the form $$I_h = 2(qn_iW_J/\tau_J)^2/(q^2D_pn_i^2/Q_0)$$
$$= 2Q_0W_J^2/D_p\tau_J^2 \qquad (6)$$

This leads to a value for $L^2$ $$L^2 < 8v_0\mu_n Q_0 D_p \tau_J^2 / Q_0 W_J^2$$
$$= 8 D_n D_p \tau_J^2 / 8 W_J^2 \qquad (7)$$

If, as an example, it is supposed that the quantity $\tau_J$ is made approximately equal to the time required for carriers to diffuse through the base layer, then we have $$\tau_J = W_b^2 / D_p \qquad (8)$$

Inserting this into Equation 7 and neglecting the difference between electron and hole mobilities, we see that the permissible area L is given by $$L^2 \doteq 8 W_b^4 / W_J^2 \qquad (9)$$

This shows that if the emitter junction is made very narrow, then the lateral dimensions may be made larger than the thickness of the base layer in the ratio $$L/W_b = 8^{1/2} W_b / W_J \qquad (10)$$

SECTION 7.—OTHER COMMENTS ON LATERAL STABILITY PROBLEM

Still larger areas may be used for transistor diodes by providing high conductivity rims around the structure. One possible structure is illustrated in FIG. 7.1. Here, a type of rib or guard ring principle is employed as disclosed in earlier Shockley applications [1]. The device consists of a working region near the center having a junction at which avalanche occurs. At the surface very heavily doped inserts are present in the extended base layer, and a lower concentration gradient is provided at the surface. Thus, the value of M at the surface is nearly unity and avalanche multiplication occurs in the central working region. If the conductivity in the heavily doped n-type inserts in the surface (which also serve as anti-channel regions) is sufficiently large, in effect these regions produce a rim of constant value for $v_b$. This alters the boundary condition at the periphery from that given by Equation 3 of Subsection 3E to the requirement that the value $v_b$ must be constant on the periphery and no net current can flow to the periphery. This alters the eigen-function and eigen-value situation in a favorable way for making large area devices.

In order to discuss the eigen-value situation, we refer to FIGS. 3.6 and 3.7 which represent the case already considered. On these figures we show the variations of $v_b$ corresponding to two of the eigen-functions. It is seen for the cosine variation of voltage with position in these two cases that the boundary condition of Equation 3 of Subsection 3E is satisfied. The eigen-value for FIG. 3.6 which has the variation along the long dimension of the structure is smaller in magnitude than the eigen-value for FIG. 3.7, which has a more rapidly varying dependence of voltage upon distance.

FIGURE 7.2 corresponds to the "clamped" boundary condition discussed in connection with FIG. 7.1. It represents the lowest eigen-function satisfying the boundary conditions for the case in which the larger dimension is along the x axis. There is an eigen-function having a lower eigen-value which varies with a single maximum at the center of the rectangle. However, this eigen-function does not give rise to zero net base current, and thus does not satisfy the boundary conditions. The eigen-function shown in FIG. 7.2 is the one having the lowest eigen-value which can result in internal instability.

The eigen-function of FIG. 7.2 is represented by the expression $$v_b(x,y,t) = -\sin\left(\frac{2\pi x}{L_1}\right) \sin\left(\frac{\pi y}{L_2}\right) \exp(j\omega t) \qquad (1)$$

and the eigen-value is given by $$\lambda v_b = \nabla^2 v_b = -\left(\frac{4\pi^2}{L_1^2} + \frac{\pi^2}{L_2^2}\right) v_b \qquad (2)$$

---

[1] Copending applications Serial No. 637,244, filed January 30, 1957, and Serial No. 722,577, filed March 19, 1958.

If the short dimension $L_2$ is made the same as the long dimension L of FIG. 3.6, then as the long dimension approaches infinity we have $$L_1 = \infty, \quad \lambda = -(\pi/L_2)^2 \qquad (3)$$

Thus, it is evident that for the "clamped" boundary conditions, the smallest dimension of FIG. 7.1 can be made equal to the longest dimension corresponding to boundary condition of Equation 3 of Subsection 3E while still preserving internal stability.

The clamped boundary condition discussed in connection with FIG. 7.1 can be extended to larger areas by using the rib- and web-type of construction disclosed in copending application Serial No. 605,646, filed August 22, 1956.

Such a structure is illustrated in FIG. 7.3. It is evident that ribs can also be introduced at right angles to those shown.

In the case of rib and web structures, the area is limited by the finite conductivity of the ribs. For example, for a square structure with many web areas, the average conductance per square, including contributions of both ribs and webs can be introduced into the stability theory just as was the simple conductance per square of Section 3. The theory will then apply in essentially the same form.

FIG. 7.4 illustrates a method of making a still larger area device. In this case the emitter structure does not cover the entire base layer and portions of the base layer come to the surface. These regions may be heavily doped and covered with high conducting metal plate which ensures that all base web areas have the same edge potential. Such a structure has the disadvantage that it requires greater geometrical precision than does a simple three-layer diode, but it permits extending the working area very greatly. Furthermore, since the lateral dimensions can be larger for a transistor diode than for a transistor, as discussed in Section 4, high-frequency transistor-diode structures can be made on a larger scale for interdigitated structures like FIG. 7.4 than can a conventional junction transistor operating at the same frequency.

It is evident that similar considerations can be applied to four-layer devices.

SECTION 8.—IMPULSIVE BASE CHARGING AND POWER GAIN

Uniform charging of base layers that would be unstable according to the criteria of Sections 3, 5, and 6, may be achieved by the rapid build-up of voltage across the types of transistor diodes discussed in Section 1. The impulsive method of charging for large signals will be illustrated in terms of the three-layer diode.

One way of viewing the type of operation to be discussed in this section is to consider that it employs a form of time separation between the input and output power. In effect, the device is found in a waiting condition by the input signal which then charges the base layer. The charging of the base layer subsequently results in an amplified signal being delivered to the load circuit.

A simplified example of the situation considered is represented in FIG. 8.1. Here, a three-layer transistor diode, represented by a symbol similar to that conventionally used for a four-layer diode, is connected in series with a rectifier across a condenser which is charged to a voltage $V_2$. The voltage $V_2$ is supposed to be smaller than the voltage required to produce sustained current through the transistor diode. This situation is illustrated in FIG. 8.2, which shows the current voltage characteristic. It is seen that the sustaining voltage in this case is approximately 40% of the peak voltage. This is the situation which will prevail if the value of $\alpha$ for the high current condition is about 0.95, corresponding to a transistor having a current gain of twenty-fold.

In order to understand the way in which current gain occurs in FIG. 8.1, consider a conventional transistor having the same base structure and emitter and collector junctions as the three-layer transistor diode in the circuit of FIG. 8.1. If such a diode were biased at a voltage substantially below $V_2$ of FIG. 8.2, then multiplication in the collector region would be negligible. If the current is large enough to produce the $\alpha$ of 0.95, then it is evident that the current gain through the device would be twentyfold. If the current is equal or larger than this value and the voltage is in the neighborhood of $V_2$ or more, then it is evident that the current reaching the collector will be significantly more than twenty times the current entering the base layer through the base lead.

Now, returning to FIG. 8.1, we assume that an input signal is applied briefly to the transistor diode with a voltage larger than the critical voltage $V_B$ which corresponds to the maximum of FIG. 8.2. If this voltage is applied over a period of time sufficiently short, a condition that is analyzed further below, then the diode will act as a conventional voltage limiting or avalanche diode, since time is insufficient for carriers injected at the emitter to pass through the base. Consequently, the voltage will be limited to a value in the neighborhood of $V_B$ and a charge will pass through the diode being carried by avalanche multiplication at the collector junction. It is evident that this charge will be formed by the separation of hole-electron pairs and will result in charging the base layer with majority carriers whose quantity is substantially equal to the pulse of charge passed.

Subsequent to the passage of this charge, the transistor diode will have a substantial positive bias across the emitter junction which will establish a level in which the $\alpha$ of the emitter structure will be larger than 0.95. The large current which flows through the device after the input voltage has been applied can cause the voltage across the device to drop to zero if it does not encounter an external load. In the circuit of FIG. 8.1, it does not encounter an appreciable load until its voltage has dropped below $V_2$, at which point the conventional diode becomes conducting. The collector junction then remains at substantially the voltage $V_2$, while a charge approximately equal to twenty times the initial charge passes through the diode. If this charge is large enough, it will discharge the condenser $C_2$ to a low value, but if the condenser is so large that the quantity $C_2V_2$ is more than twenty times the initial charge, then the voltage will evidently not drop to zero.

It is evident that by this means of operation, current multiplication is performed in the form of a pulse passing through the transistor diode.

The form of impulsive charging considered will result in uniform charging of the base layer if properly carried out. This aspect of the phenomenon will be analyzed next. Subsequently it will be shown that power gain and oscillation can be produced by using transistor diodes in this manner. The mathematical theory of these effects, as applied to avalanche transistors, has been treated in the literature by W. Shockley and J. Gibbons as "Theory of Transient Build-up in Avalanche Transistors," a preprint of an article for the transactions of the American Institute of Electrical Engineers, Transactions Paper 58–1249. In this paper, it is shown that the current in an avalanche transistor which is maintained at constant voltage increases exponentially with time. For a uniform base layer of width W and diffusion constant D, the rate of build-up is given by $$\nu_1 = d\ln I / dt = (D/W^2)(ln2M)^2 \qquad (1)$$

where M is the avalanche multiplication at the collector junction. It is further shown that if the diode has a condenser applied across it, then as its voltage drops due to discharging the condenser, the charging of the base layer builds up to such a degree that the rate of drop of voltage across the device is given approximately by $$dV/dt = (2D/W^2)V_B/(n+1) \qquad (2)$$

where $n$ and $V_B$ are defined as in Equation 3 of Subsection 1B. These formulae apply to the case in which the current is large enough so that the quantity $\alpha$ is approximately equal to unity. The current will build up somewhat more slowly for smaller values of $\alpha$.

The rate of build-up $\nu_1$ corresponds to the rate of build-up that would occur if the lateral instability existed in a transistor of infinite transverse dimensions. It is evident that if the base layer of the transistor is to be charged impulsively, it is desirable that this be done in a time which is relatively short compared to the time in which a lateral instability will build up. If this occurs, the lateral instability will not have an opportunity to build up and an area of indefinite size can be driven at once. (Actually, there are limits to the size even in this case which are set by the velocity with which electromagnetic waves can propagate through the semiconductor material when voltage is applied across the structure; these effects can be reduced by making the diode in the form of an elongated strip.)

If we now suppose that the voltage applied at the input of FIG. 8.1 is building up rapidly, then the current through the transistor diode will initially be given by the approximations discussed in Section 1. We shall suppose in this case that the secondary multiplication obeys the same formula as the multiplication for carriers injected through the base layer and will approximate the current by the expression $$I = M(V_s)I_s \qquad (3)$$

which corresponds to the approximation discussed in connection with Equation 4 in Subsection 1A.

We shall now combine Equations 2 and 3 to see how rapidly the rate of charging of the base layer will be compared to the rate of build-up of the instability corresponding to the time constant $\nu_1$. The exponential rate of build-up of current on the base layer due to increasing voltage will be derived. We shall suppose in this case that the rate of increase of voltage on the input is accomplished by driving the input with a similar transistor diode. We shall then find that this rate of drive will be so great that impulsive charging of the base layer will occur at a much higher rate than the build-up of a possible instability as given by Equation 1. After the necessary mathematical manipulations, the logarithmic derivative of current build-up in accordance with applying the rate of change of voltage of Equation 2 to the current of Equation 3 can be written as follows:

$$\begin{aligned}\nu_2 &= d\ln I/dt = d\ln M/dt \\ &= (d\ln M/dV_s)(dV_s/dt) \\ &= [n(M-1)/V_s][2DV_B/W^2(n+1)] \\ &\doteq (D/W^2)[2n(M-1)/(n+1)] \end{aligned} \qquad (4)$$

The last line of Equation 4 uses the approximation that under the conditions of interest the voltage across the space-charge region $V_s$ is substantially equal to the breakdown voltage $V_B$; in any event, the ratio between the two will introduce at most a very small correction in the formula. We see that the rate of build-up given by (2) depends linearly upon the current multiplication in the space-charge region. In contrast, the rate of build-up in (1) depends upon the logarithm of this quantity. Thus, for large values of the quantity M, Equation 4 will be very much greater than (1). For a particular example, if $$M = 100, \; n = 3 \qquad (5)$$

then the ratio of the build-up constants is $$\nu_2/\nu_1 = 150/28 = 5.3 \qquad (6)$$

Thus, for such a case, the rate of build-up in the transistor diode will be chiefly dominated by the change of voltage of the input signal and any instability in the base layer will not have time to build up. It should be noted that a ratio of I or less will be sufficient to give stable operation for the device. The input applied will actually tend to initiate a disturbance in the base layer which is uniform over the base layer, provided the breakdown voltage is uniform over the area. If the value of $\nu_1$ differs from one place in the base layer to another place, then one part of the transistor may build up its avalanche multiplication faster than another place, with the result that one area will tend to carry more current than another in the turn-on phase of operation discussed in connection with FIG. 8.1. However, for the type of operation considered in FIG. 8.1, the device never sits in the negative resistance region of the curve. Thus, no matter what is the relationship between $\nu_1$ and $\nu_2$, the tendency for one part of the device to work in opposition to the other does not arise. The worst that can happen is that one portion of the device will carry substantially more current than another portion.

From these considerations, it is evident that it will be possible to charge the base layer of a transistor diode of large area substantially uniformly by impulsive charging.

The degree to which it is necessary to achieve impulsive charging with a ratio as high as that given by Equation 6 depends upon the uniformity and burn-out resistance of the transistor diode structure. Some protection is furnished by the fact that while the charging proceeds, the emitter junction may have a relatively high impedance compared to the collector junction. Thus, a series resistance will be present in each area of the structure, which will tend to equalize the disturbance of current flow.

In FIG. 8.3, we illustrate a pulse-amplifying circuit which can be used to trigger transistor diodes of progressively larger area. The first stage is essentially that illustrated in FIG. 8.1. An additional charging resistance and voltage supply $B_1$ is shown, which biases the first transistor diode at a voltage of approximately $V_B$ and is so large in value that it cannot produce a sustaining current through the transistor diode. An input signal whose voltage amplitude is sufficiently larger than the voltage $V_W$ at which the device waits, produces impulsive charging of the base layer. This causes the diode to turn on and build up toward a current whose magnitude will be given approximately by $$I = Q2D/W^2 = \nu_s Q \qquad (7)$$

as discussed in the quoted reference by Shockley and Gibbons. In this expression, Q is the charge passed by the input pulse. This causes the voltage across the transistor diode to drop until the conventional diode in series with it is biased forward, at which point the current I charges the two condensers attached to the conventional diode. By controlling the ratio of these two condensers, a fraction of the current I can be deflected to the second transistor diode.

During the next phase of the operation, the first transistor diode is above the sustaining voltage, and current build-up of the form discussed in connection with Equation 1 occurs. This results in additional charging of the base layer of the first diode and a further build-up of the current. As a consequence of this, a voltage drop in the first diode of the value given by Equation 2 is applied to the second transistor diode.

As a consequence of the form of operation just discussed, it is evident that current amplification will occur in the devices considered and the current available for charging each subsequent diode at the rate given by Equation 2 will be available in an enhanced degree. Thus, transistor diodes may be used to amplify currents in sharp wave-front current pulses up to very large area devices.

It is evident from the foregoing that sharp, wave-front pulses may be generated by driving a three-layer diode into the avalanche condition with a rate of current build-up produced by the driving circuit that is faster than the characteristic build-up constant of the three-layer structure. This mode of operation is similar to those used for generating sharp pulses with avalanche transistors. For example, pulses of about one millimicrosecond duration have been produced by avalanche transistors and used in connection with a transistor oscilloscope by G. B. B. Chaplin, and described in "Digest of Technical Papers for the 1958 Transistor and Solid-State Circuit Conference," held under the auspices of the Institute of Radio Engineers and American Institute of Electrical Engineers at Philadelphia, February 20 and 21, 1958. Three-layer transistor diodes are superior for the purpose of generating such pulses, since they can be turned on over relatively much larger areas than transistors of comparable base-layer thickness and are simpler to fabricate.

FIGURE 8.4 illustrates a pulse-generating circuit. It is supposed that the supply $B_1$ biases the diode slightly below its breakdown voltage. An input pulse then raises it above breakdown. As the diode starts to build up current, it sees the low impedance of a forward biased conventional diode. When the current in the transistor diode builds up to a value larger than that in the conventional diode, it starts to extract injected carriers. The conventional diode can furnish a large current for a time comparable to the lifetime of minority carriers in it. After this it presents a capacitance that decreases with increasing reverse bias. As a consequence of the rapid build-up of current in the transistor diode, followed by the rapid increase of impedance of the conventional short-lifetime (i.e., quick recovery time) diode, a very sharp pulse will be developed across the output circuit.

Similar results will be obtained by eliminating the conventional diode and its voltage supply and simply using a load consisting of a capacitance and resistance as a load circuit; the pulse will not be quite as sharp, however, as with a suitable diode load.

For relatively low-power applications such as are discussed above, it is possible to utilize certain, very rapid processes that will be relatively more difficult to control in larger areas. In particular, if punch-through the base layer and avalanche multiplication occur at almost the same voltage, then secondary carriers returning to the base will accumulate there and produce a stagnant region. (Such regions and their current gain characteristics are discussed in Patent 2,790,037, issued April 23, 1957, to W. Shockley.) As more carriers arrive in the stagnant region, they produce current gain and thus provoke more current to the avalanche region. Furthermore, the stagnant region tends to widen as the number of trapped carriers increase and this causes the voltage drop to occur across a narrower region and thus produce a higher field and increased multiplication. These effects will lead to a very rapid build up of current with a time characterized by diffusion through the narrow stagnant region and by transit time across the high field region.

Such effects of combined punch-through and avalanche have been discussed in general terms by Statz and Pucel, Proc. I.R.E., vol. 45, pp. 317–324 (1957). However, as the conclusion to their article clearly shows, they do not appreciate the possible use of carriers in a stagnant region or the variation in width of the stagnant region so as to usefully produce very short pulses.

It is evident that the principle of impulsive charging described above can be used to aid in bringing the combination of punch-through and avalanche multiplication under useful control. It is desirable that as a combined result of the two effects, an accumulation of carriers of the type normally present in the base layer be initially produced, relatively uniformly across the working area. The subsequent build-up of current will then drop the voltage across the device rapidly to a low value if the device is connected to a suitable load, and by this means a very short pulse can be generated.

We shall next consider some alternative forms for transistor diodes which may be well adapted to use in pulse-charging operation. One possible difficulty with using avalanche multiplication for pulse charging is that avalanche multiplication increases extremely rapidly with voltage as the breakdown voltage is approached. Consequently, relatively small differences in breakdown voltage from one part of the device to another will produce relatively much larger differences in base charging in these regions. This can be overcome by using another method for voltage-controlled base charging. In Section 1, four-layer diodes were discussed which utilized space-charge narrowing of the base region. If this narrowing proceeds far enough, punch-through will actually occur. When punch-through occurs, relatively large space-charge limited currents will be drawn through the base region. Space-charge limited currents and punch-through effects are discussed in W. Shockley Patent 2,790,037, issued April 23, 1957; and "Space-Charge Limited Emission in Semiconductors," by W. Shockley and R. C. Prim, Physical Review, vol. 90, pp. 753-758 (1953). Thus, an alternative method of producing impulsive charging without the necessity of secondary multiplication utilizes four-layer transistor diodes in which one of the layers can be brought to a punch-through condition before avalanche is reached. Transit times, when punch-through occurs, are very short since they involve drift motion of the carriers in relatively high electric fields rather than diffusion. Consequently, space-charge limited punch-through currents may be used to accomplish quick impulsive charging of the base layers. If, for example (referring to FIG. 1.6), the thickness of the layer $b_R$ and its properties are uniform—for example, by controlled successive diffusions from the same surface—then quite uniform punch-through conditions may prevail throughout the layer $b_R$ with the result that uniform base charging of $b_L$ may be readily produced.

SECTION 9.—CARRIER EXTRACTION

So far as uniform charging by pulses and avalanche multiplication of base layers is concerned, three-layer and four-layer diodes behave in generally similar ways. Three-layer diodes cannot be charged by punch-through effects, since there is no other layer having the same majority carriers as the base layer.

Majority carriers can be removed from the base layer of three-layer diodes only by recombination, since there is no layer to which they can be withdrawn as majority carriers. On the other hand, in four-layer diodes majority carriers may be both added to and removed from the base layers by transfer between them and the emitter layers of the same conductivity type. The removal processes are referred to as carrier extraction and constitutes the chief subject of discussion in this section.

In FIG. 9.1, a four-layer diode is represented in two conditions: (1) thermal equilibrium, and (2) the "on" condition.

Parts (c) and (d) show the electrostatic potential. Under conditions of forward bias with currents greater than the holding current, forward bias develops across the center junction. The resulting hole and electron densities are represented in parts (c) to (h) of the figure. In the holding condition, minority carrier flowing through the base layers proceeds toward the collector junction.

FIGURE 9.2 shows the same diode with small reverse bias, parts (a), (c), and (e) apply to the steady state and show the development of a small reverse bias across the center junction as a result of minority carrier extraction across the two reverse biased emitter junctions.

Parts (c), (e) and (g) of FIG. 9.2 show the situation immediately following application of reverse bias to the forward biased situation of FIG. 9.1. It is seen that injected carriers in the base layers go to nearly zero density at the reversed biased emitter junctions. The situation at these junctions is like that of a forward biased two-layer rectifier immediately after voltage reversal. The carriers injected near the collector junction will maintain forward bias across that junction for a certain time. This time will be either the diffusion time to the emitter junction or the lifetime in the base layer, whichever is the shorter. In general, the shorter time will be the diffusion time since in order for the four-layer diode to stay on, the $\beta$ of the base layers must be high enough and this requires a diffusion time less than lifetime. It, therefore, follows that a four-layer diode may be put into the "off" or "open" position by reverse bias in a time less than its recovery or turn-off time under zero bias or zero current. In effect, reverse bias extracts minority carriers from the two base layers.

FIGURE 9.3 illustrates a more extreme form of extraction, which will be referred to as majority extraction. The upper curve (a) represents a four-layer diode at a large reverse bias. The diode is assumed to be symmetrical so that equal voltage drops appear across the two emitter junctions. Space-charge or depletion layers extend about two-thirds of the way through each base layer. Evidently the number of majority carriers in each layer is reduced by about a factor of three for the case of uniformly doped layers.

The situation shown in FIG. 9.3(a) can arise from the thermal equilibrium condition of FIG. 9.1(c) by application of reverse bias. Very rapid application of reverse bias across the two emitter junctions causes current to flow by displacement in the resulting space-charge regions. This current is carried by displacement, injection, and recombination across the collector junction. Some of the injected current arrives at the reverse biased emitter junctions and is collected by the two emitter bodies. In a sense the majority carriers are siphoned as minority carriers through the base layers, and thus are removed from the two base layers. This majority carrier extraction process will be the dominant process of removing majority carriers from the base layers if the alphas for injection across the collector junction are high.

A four-layer diode in a condition of majority extraction is in a favorable situation for the abrupt application of forward bias. This is illustrated in parts (b) and (c) of FIG. 9.3. In (b) the zero bias situation is shown. The extraction of majority carriers from the two base layers result in space-charge regions forming on both sides of the base layers, so that all three junctions are in a condition of reverse bias. (This can be appreciated in the figure by noting that the net charge in each base layer is the same in each figure; i.e., the neutral regions are the same length and so are the total regions of space charge.) If the zero bias is maintained, the voltages across the junctions will decay at a rate dependent upon their capacities and the reverse saturation current arising from thermal generation of hole-electron pairs of the form $I_c(V_s)$ discussed in Subsection 1A.

If the voltage is brought from the reverse bias situation of part (a) of FIG. 9.3 to the forward bias situation of part (c) sufficiently rapidly, the number of majority carriers in the base layers will not change appreciably and the situation of part (c) will prevail. The critical time is that required for thermal generation of hole-electron pairs to add substantially to the majority carriers in the base layers.

It is evident that injection across the emitter junctions will not occur until reverse bias across the emitter junctions has been eliminated and forward bias has been produced. The voltage at which this occurs will evidently increase with increasing initial reverse voltage in part (a). Because of this feature an undesirable effect, referred to as the $dV/dt$ effect, is substantially reduced by majority extraction. The $dV/dt$ effect is that the switching voltage is reduced when the voltage on a four-layer diode is increased rapidly. The interpretation is that the displacement current at the center junction is carried by carriers at the emitter junctions and may raise their alphas sufficiently to produce switching even though the multiplication factor M is relatively low. This causes the switching voltage to drop when the rate of voltage increase is high. In FIG. 9.3, it is seen that the current at the emitter junctions is carried by displacement until the situation of zero emitter bias of part (c) is reached.

Similar conclusions apply to the case of an unsymmetrical four-layer diode. One important new feature that can occur is that one emitter junction may reach the avalanche condition before a large reverse voltage develops across the other. Under these conditions, further increase in reverse voltage will cause the added drop to develop chiefly across the other junction until both junctions approach avalanche. A negative resistance region may then occur due to variation in alpha with current at the center junction.

The chief conclusions reached from the preceding analysis are that in four-layer diodes carrier extraction to discharge base layers of both minority and majority carriers may be accomplished by reverse bias. The times may be much shorter than lifetimes of minority carriers. Furthermore, by majority extraction, a situation may be produced in which switching to the "on" condition is primarily voltage controlled rather than current controlled. Furthermore, for rapid switching the voltage control is variable and dependent upon the reverse bias prevailing prior to the forward swing.

These effects are further discussed in Section 10 in connection with power-generating circuits.

Majority carrier extraction can also play a role in three-layer diodes in high-power circuits. In FIG. 9.4 an unsymmetrical diode is shown such as might result from diffusing first phosphorous and second boron from the emitter side of the structure. Since the collector junction is more gradual than the emitter and the collector body much less heavily doped than the emitter, the reverse alpha will rise at a larger current density and will have a smaller maximum value than the forward alpha. If the diode is biased in the reverse direction it will also have a lower breakdown voltage. This leads to the unsymmetrical current-voltage characteristic of FIG. 9.5.

If the diode is biased reverse to a current below the reverse voltage maximum, there will be relatively little injected current. The charge on the emitter junction will be large, however, and this will make the diode relatively immune to the $dV/dt$ effect if forward bias is suddenly applied.

The foregoing reasoning can be extended and will be more fully appreciated by referring to Subsection 10E and Subsection 10G, where majority carrier extraction is dealt with more fully.

SECTION 10.—SOME OSCILLATOR CIRCUIT PRINCIPLES

10A.—*Some simple oscillator circuits*

FIGURES 10.1 and 10.2 illustrate a means of utilizing the impulsive charging and carrier extraction principles disclosed in the preceding sections.

The operation of the circuit can be understood in terms of FIG. 10.2. The inductance $L_B$ is assumed to act as a choke and to furnish a constant current $I_0$. When the four-layer diode is open, this current produces a voltage drop $I_0R$ across the resistor, a linearly increasing voltage across the capacitor, and no drop across L. The voltage wave builds up until the diode closes. (As discussed below, an additional circuit may be employed to impulsively charge the base layers of the four-layer diode just before it reaches the breakdown voltage $V_B$.)

When the four-layer diode is closed, a damped oscillation is set up in the L, C, R circuit. The initial condition after closing has a current $I_0$ through the inductance so that the voltage across the condenser continues to increase as shown in part (*b*) of FIG. 10.2.

The damped oscillation then proceeds until the current in L once again reaches $I_0$, at which instant the current through the four-layer diode goes to zero and it opens. The current thereafter remains $I_0$ through L and R, and a linearly rising voltage wave once more occurs.

It should be noted that at the instant the current through R returns to $I_0$, the current is increasing both through R and L. In order for the current through L to be increasing, (there must be a positive voltage from left to right and since $V_D$ is zero, $V_R+V_C$ must be negative. This voltage is referred to as $-V_K$. Since $V_R=I_0R$ is positive, it follows that the voltage across the condenser is negative and equal in magnitude to $V_K+I_0R$. During the charging cycle with the diode open the voltage across the condenser swings through a range $V_B+V_K$ so that the charging time is evidently $$t_2 = C(V_B+V_K)/I_0 \qquad (1)$$

For the idealized behavior of the diode represented in FIG. 10.2, the total power in the load R is readily calculated since it is simply the power furnished by the battery, since the diode itself always consumes zero power, i.e., either zero current or zero voltage prevails. The battery voltage is $V_{D_0}$, the average value of the diode voltage since the current through the choke $L_B$ is constant. Hence the power from the battery is $I_0V_{D_0}$. From part (*c*) of FIG. 10.2, it is evident that $$V_{D_0} = (V_B-V_K)t_2/2(t_1+t_2) \qquad (2)$$

so that the power dissipation in the load R is $$P_R = I_0(V_B-V_K)t_2/2(t_1+t_2) \qquad (3)$$

If the peak current through the diode is $I_M$ (which we shall take to be the maximum permissible current), the average current during the time it is on may be written as $$I_D(\text{on}) = \text{av}\ (I_0-I) = fI_M \qquad (4)$$

where $f$ is ratio of the average value to peak value of current through the diode while it is on. From part (*a*) of FIG. 10.2, it is seen that $f$ is the average value of the downwards excursion of current from the line at $I_0$. If this excursion is approximated by a triangle, a sine wave and a parabola in turn, the value of $f$ is 0.5, $2/\pi=$ 0.64 and 0.75. For the damped sine wave of FIG. 10.1(*a*), it will be somewhat less than $2/\pi$. The average current through the diode must be $I_0$ since the condenser eliminates any other conducting path so that $$I_0 = fI_Mt_1/(t_2+t_1) \qquad (5)$$

In terms of these quantities the power to the load $P_R$ may be rewritten as follows:

$$P_R = I_MV_B[1-(V_K/V_B)][t_1t_2/2(t_1+t_2)^2]f \qquad (6)$$

The maximum value for the bracket containing the $t$ terms is 1/8 and occurs for $t_1=t_2$, and is 1/9 if $t_2=2t_1$ as is approximately the case in FIG. 10.2. Thus, the maximum power that can be obtained from the four-layer diode is less than $I_MV_B/8$ by a factor of about $$[1-(V_K/V_B)]f \qquad (7)$$

In considering $V_K$, it should be noted that for practical purposes it is desirable to make sure that the diode is turned off by an inductive kick in the reverse direction. This requires that the reverse current wave through the diode, shown shaded in part (*a*), can extract the minority and preferably some majority carriers from the diode while turning off the diode. At the time of opening I will thus be greater than $I_0$, and when the diode opens this current will give an inductive kick which may lead to majority carrier extraction. (The mechanism of the extraction is discussed more fully in connection with the circuit of FIG. 10.6)

In general, a favorable phase for turn-off will be before the current I has reached its maximum so that a negative kick $-V_K$ will appear. If $V_K=V_B/4$, the factor (7) becomes 0.45 for $f=0.6$. Thus, it follows that the maximum power that can be produced without exceeding $V_B$ or $I_M$ on the diode is approximately $$P_R\ (\text{max}) \cong V_BI_M/20 \qquad (8)$$

For a more efficient push-pull circuit discussed in connection with FIG. 10.6, the A.-C. output per diode can be made about three times larger, FIGURE 10.3 illustrates a modified oscillator circuit of the form of FIG. 10.1, with a pulse generator connected across the diode. If the pulse generator makes sharp pulses of positive polarity at a rate somewhat higher than the four-layer diode circuit, it will impulsively charge the four-layer diode and ensure uniform turn-on over the area of the base layers, prior to the time when the charging wave would reach $V_B$ more gradually.

FIGURE 10.4 illustrates a push-pull arrangement in which one diode turns the other off.

FIGURE 10.5 illustrates what appears to be a simple flip-flop or bistable circuit. The mode of operation, however, is very high power with many times the holding current passing down the resistors. Each diode turns the other diode off in turn and, in fact, accomplishes majority carrier extraction. It is evident that the load resistors may be replaced by the primaries of a transformer to deliver A.-C. power to a load.

*10B.—A high performance push-pull oscillator circuit*

In the following subsections, a high performance circuit will be analyzed in considerable detail. The analysis describes certain features related to minority and majority carrier extraction and energy losses during the switching cycle, which are generally applicable to four-layer diode oscillators.

In this subsection, the oscillator circuit will be analyzed in terms of ideal switching devices. The problem of the $dV/dt$ effect is introduced in Subsection 10C, and Subsections 10D and 10E deal with its control by minority and majority carrier extraction. The mechanism in the resulting switching cycle is discussed in Subsection 10F. Subsection 10G outlines more detailed design considerations which will properly relate device parameters to the circuit.

Subsection 10H concludes the section by outlining logical extensions of the foregoing analysis.

In FIG. 10.6 an oscillator circuit comprising two substantially identical four-layer diodes, $D_1$ and $D_2$, is shown together with associated control circuits. The control circuit C can be activated externally to open or close the junction transistor switch S. It can also act as a protective element to open the circuit in the event of the flow of excessive current or a disappearance of the A.-C. signal on the load, due to accidental simultaneous turn-on of the two four-layer diodes. The voltage supply point at $-V_C$ volts in respect to ground acts initially to charge the condenser C to a voltage less than the reverse breakdown voltage of diode $D_2$.

When the switch S closes, the voltage across $D_1$ rises towards a value of $V_a + V_C$ which is greater than the breakdown voltage $V_B$ of diodes. Diode $D_1$ then becomes conducting, and voltage $V_D$ rises to $+V_a$ producing a voltage of $2V_a$ in the forward direction across $D_2$; as will be discussed more fully below, this does not turn on $D_2$ because of the condition of majority carrier extraction prevailing prior to the closure of $D_1$, and the fact that $2V_a$ is sufficiently less than $V_B$.

The behavior of the circuit will first be discussed neglecting the $dV/dt$ effects described in Section 9. Subsequently, the roles and interrelationships of diffusion times through the base layers, minority carrier lifetime, majority carrier extraction, and reverse and forward breakdown will be discussed so as to show how device design for the diodes affects their high-frequency performance.

FIGURE 10.7 represents the current and voltage waves in the load circuit of FIG. 10.6. Ideal switching characteristics and zero capacity are assumed for the diodes. The diagram starts at a phase when the current I is a maximum and diode $D_1$ is closed. If $D_1$ were a dead short, the mode of oscillation of the circuit would be a damped sine wave with the voltage on the condenser oscillating about $+V_a$. This mode is represented by the dashed line of part (b) of the figure.

At the instant, $t_1$, however, the current through diode $D_1$ drops to zero, the capacitor C is charged to its maximum voltage $V_M$ and the diode opens. The rate of change of current in L then remains zero and the voltages across it and across R vanish. Thus, the voltage $V_D$ would be equal to $V_M$ at this instant if diode $D_2$ did not close. If the voltage $V_M - V_a$ is larger than $V_K$ where $$V_K = V_B - 2V_a \quad (1)$$

then diode $D_2$ breaks down and the voltage $V_D$ drops to $-V_a$.

This excursion of voltage upwards and downwards is represented by the vertical line in part (b) of FIG. 10.7. The voltage across L tending to make I become negative thus changes from $V_M - V_a$ to $V_M + V_a$, and $dI/dt$ becomes more negative than it would have if $D_1$ had remained a dead short. This is represented by the change in slope of the solid line at $t_1$ in part (a) of FIG. 10.7.

After $t_1$, $V_D$ remains equal to $-V_a$ and a damped oscillation ensues with the voltage on the condenser oscillating about $-V_a$. This behavior terminates when I again falls to zero at $t_2$, at which instant the diodes again switch and the voltage $V_D$ becomes $+V_a$ once more.

The efficiency and period of this circuit, which is essentially a class C push-pull circuit using novel switching means, can be calculated readily in terms of the parameters involved. An L, C, R series circuit has currents and voltages that vary as damped oscillations of the form $$\exp(j\omega\cos\psi - \omega\sin\psi)t$$
$$= \exp[j-(2Q)^{-1}]\omega t \cos\psi \quad (2)$$

where $$\omega = (LC)^{-\frac{1}{2}} \quad (3)$$

$$\sin\psi = R(C/L)^{\frac{1}{2}}/2 \quad (4)$$

$$\omega\sin\psi = R/2L \quad (5)$$

$$\omega\cos\psi = \left(\frac{1}{LC} - \frac{R^2}{2L^2}\right)^{1/2} \quad (6)$$

$$Q = \frac{1}{2}\cot\psi = \frac{1}{2}(4L/R^2C - 1)^{1/2}$$
$$\cong L\omega/R \quad (7)$$

From these it is evident that from maximum to maximum, the amplitude of a current or voltage wave decreases by a factor $$A = \exp(\pi/2Q) \quad (8)$$

and that the energy decreases by $\exp(2\pi Q)$ per cycle. From this it follows that if the voltage across the condenser is $V_1$ at instant $t_1$ when diode $D_1$ opens and diode $D_2$ closes, then the voltage at $t_2$ is $$V_2 = -V_a - (V_1 + V_a)A \quad (9)$$

since the amplitude at $t_1$ is $V_1 + V_a$ in respect to $-V_a$, and this amplitude reverses in sign and decreases by a factor A in going to the next reversed maximum. Thus, the ratio of energy stored in the condenser at $t_2$ compared to $t_1$ is $$V_2^2/V_1^2 = [(1+A)(V_a/V_1) + A]^2 \quad (10)$$

This ratio is unity if $$V_1 = \frac{1+A}{1-A}V_a \equiv V_M \quad (11)$$

and is less than unity if $V_1 > V_M$ and greater than unity if $V_1 < V_M$. Thus, it is evident that successive cycles will result in the peak voltage approaching $V_M$.

The energy transferred from the condenser to the resistor in one half cycle is $$\Delta E = C[(V_M + V_a)^2 - (V_M - V_a^2)]/2$$
$$= 2CV_MV_a = 2CV_a^2\left(\frac{1+A}{1-A}\right) \quad (12)$$

and the total charge that flows through the resistor is $$\Delta Q = 2CV_M \quad (13)$$

As discussed earlier, the average value of a sine wave for a half cycle is $(2/\pi)=0.635$, hence the peak current $I_M$ is $$I_M = (\pi/2)\Delta Q/\Delta t = \pi C V_M/\Delta t$$
$$= \pi C V_a(1+A)/\Delta t(1-A) \qquad (14)$$

if the damped wave is approximated by a sine wave and $\Delta t$ is the half period.

Power is furnished to the resistor at a rate $\Delta E/\Delta t$ and this can be expressed in terms of $V_a$ and $I_M$ as follows:

$$\Delta E/\Delta t = 2CV_M V_a/[\pi C V_M/I_M]$$
$$= (2/\pi)V_a I_M \qquad (15)$$

This result can be understood by considering the power input at $V_D$. At $V_D$ the voltage is $\pm V_a$. The peak current is $\pm I_M$ and the average current $\pm 2I_M/\pi$. Hence the average power input is product voltage and current, and this power must be dissipated in the resistor.

If the diodes can be regarded ideal so that $dV/dt$ effects may be neglected, then $V_a$ may be made to approach $V_B/2$ closely and the A.-C. power furnished to the load R per diode approaches $$(1/2)(2/\pi)(V_B/2)I_M$$
$$= V_B I_M/2\pi \qquad (16)$$

This value is about three times higher than that quoted for the circuit of FIG. 10.1. The increased efficiency results from the better form of the voltage wave $V_D$ of FIG. 10.7.

The value of the resistor R which gives rise to the peak current $I_M$ when applied voltage is $\pm V_a$, may be obtained by equating the power to the resistor, which is about $I_M^2 R/2$ to the power dissipated in it. This gives $$R = (2/I_M^2)\Delta E/\Delta t$$
$$= (4/\pi)V_a/I_M \qquad (17)$$

If the limiting value of $V_B/2$ is used for $V_a$, this leads to $$R = (2/\pi)V_B/I_M \equiv (2/\pi)R_D \qquad (18)$$

where $R_D$ is a characteristic value for the diode and is equal to the breakdown voltage divided by the peak permissible current.

From Equations 16 and 17, it is seen that for ideal diodes the power output varies as $V_a^2$ and is Power to load $= (8/\pi^2)V_a^2/R \qquad (19)$ so that the power output can be modulated by modulating $V_a$.

10C.—The $dV/dt$ effect

The circuit of FIG. 10.6 will not oscillate satisfactorily unless certain conditions related to the $dV/dt$ effect are met.

Considering the instant $t_1$ in FIG. 10.7, it is noted that as the current drops to zero, the voltage tends to rise toward $V_M$. If the decrement factor A is not very small, then $V_M$ is much larger than $V_a$ and also much larger than $V_B$. For example, if the L, C, R circuit has a Q of 5, then from Equations 8 and 11 of Subsection 10B, $A=0.73$ and $V_M=6.4V_a$ so that the effective voltage across L and $D_2$ in series is $V_M+V_a=7.4V_a$.

The discharge circuit for $D_2$ may then be represented as in FIG. 10.8. The initial condition may be taken just as $D_1$ becomes nonconducting and as the voltage across $D_2$ starts to increase. Initially both $D_1$ and $D_2$ present capacitive impedances and if the frequency of the external circuit is low enough, the approximately linear increases in current through L will cause $D_2$ to trace its V—I characteristic. A possible instability can arise due to the capacity of $D_2$ providing a discharge path for a rapid turn-on of $D_1$. The theory of these effects are similar to those treated by Shockley and Gibbons in the reference given in Section 8. They may also be analyzed in terms of the impedances discussed in Subsection 5B. In that section it is seen from Equation 3 that in the negative resistance region $D_2$ to a first approximation may be represented as a parallel combination of a negative R and negative C, with $1/R$ somewhat less than $g_s(0)$ and RC value greater than $\tau_s$. Thus, the negative C is greater than $C_s$. Since $D_1$ has a capacity equal to $C_s$, the combination of $D_1$ and $D_2$ will be stable and will not build up current faster than permitted by L. This statement must be qualified by noting that at zero bias $C_s$ for $D_1$ is much larger than $C_s$ for $D_2$ near breakdown. However, even if $D_2$ starts to build up current initially using $D_1$ as a capacitative load, the process tends to slow down or stop when the capacitors charge relative sizes.

To achieve greater stability and less likelihood of a rapid turn-on of $D_2$ causing a premature turn-on of $D_1$, several other factors may be considered.

The effect of reverse bias and majority carrier extraction on $D_1$ will be discussed below.

Another circuit means is illustrated in FIG. 10.9. Here saturable reactors that present a high inductance for currents up to or somewhat beyond the holding current are represented. As the current in $D_2$ builds up at substantially constant rate, these inductors limit the rate of build-up of current in $D_2$ and hence the rate of voltage drop. Thus a sharp voltage wave on $D_1$ is prevented. Further filtering is accomplished by the RC combination.

It is evident that energy absorbed by circuit modifications such as those shown in FIG. 10.9 will be unimportant if the period of the output oscillation is very long compared to the times $\tau_s$ and $\tau_a$ associated with the negative resistance of the diodes.

10D.—Minority carrier extraction in the high performance circuit

Particular advantage of the majority carrier extraction principle of Section 9 may be taken in high frequency oscillator circuits of the form shown in FIG. 10.6. The mode of operation will first be illustrated in terms of a symmetrical four-layer diode in which the properties of the two component transistor structures are assumed to be identical. FIG. 10.10 illustrates the situation prevailing in such a structure for three conditions designated as follows:

($b1$)—electrostatic potential for a small reverse potential.
($b2$) and ($b3$)—corresponding hole and electron densities,
($c1$) ($c2$) and ($c3$)—situation prevailing when reverse voltage is suddenly increased to magnitude $V_K$,
($d1$) ($d2$) and ($d3$)—situation prevailing when an abrupt rise to forward bias of $2V_a$ follows situation ($c$).

The following explanation, which will in general deal with a diode of unit area so that currents and current densities will be equal, will clarify reverse potential will (in keeping with the assumption of symmetry) divide equally between the two reverse biased emitter junctions. ($b$) represents a situation in which minority carrier extraction and majority carrier extraction have occurred.

If the reverse voltage is abruptly increased to condition ($c$), space-charge widening will push the majority carriers back into the base layers. The amount of this push may be expressed as follows. Let $Q_e$ and $Q_e'$ represent the space charge per unit area in the two base layers. Then the capacity of the first emitter junction per unit area $$C_e = H\epsilon_0/W_e \qquad (1)$$

where $W_e$ is the width of the space-charge layer. An increase in voltage $\delta V_e$ exposes an increased chemical charge per unit area of $$\delta Q_e = C_e \delta V_e \qquad (2)$$

and an equal charge per unit area is pushed back towards the forward biased collector junction. A similar charge is pushed the other way. These injected carriers are represented by the dashed lines in ($c2$) and ($c3$). Some of these carriers reach the emitter junction and slide down to the emitter body.

The charge passed to increase the voltage from situation (b) to situation (c) is thus $\delta Q_e = C_e \delta V_e$ plus a second contribution smaller by factor equal to the ratio of injected carriers transmitted through the layers to $\delta Q_e$. This latter charge is delayed by the diffusion time through the base layer which is essentially the $\tau_a$ of Subsection 2E.

Actually a reverse current of minority carriers is drained from the base layers continuously as the current through the diode reverses from the forward to the reverse direction during the interval of time following an instant like $t_1$ of FIG. 10.7(a). The relationship of minority carrier charge to current may be understood for most purposes by a simplified model in which the lifetime is taken as independent of concentration and has a value $\tau$. If the variation of current per unit area in the inductance is assumed to vary as $$I = -I_M \sin \omega t = \text{Real } (jI_M e^{j\omega t}) \qquad (3)$$

so that it goes to zero at $t=0$, then the charge per unit area of non-equilibrium holes in the structure is $Q_P$ (these are distributed equally in the two bases, and injection into the emitter is neglected) where approximately $$\dot{Q}_p = I - Q_p/\tau$$

so that $$Q_p = \tau I_M [1 + (\omega \tau)^2]^{-1/2} \sin (\phi - \omega t) \qquad (5)$$

so that $Q_p$ becomes zero when $\omega t = \phi$ where $$\text{tan } \phi = \omega \tau \qquad (6)$$

Actually Equation 4 applies only so long as diffusion does not limit removal of minority carriers from the base layers. When diffusion does become a limiting factor, an appreciable reverse voltage across the emitter junction will appear. This occurs when the remaining holes can just furnish the current I. This corresponds to $$(Q_p/2)\nu_s = I \qquad (7)$$

where $(Q_p/2)$ is the minority carrier charge stored in each layer and $$\nu_s = 2D/W^2 \qquad (8)$$

is the saturation current corresponding to such a charge (see Equation 7 in Section 8). These relationships lead to $$\nu_s \tau I_M \sin (\phi - \omega \tau)/2(1 + \omega^2 \tau^2)^{1/2} = I_M \sin \omega \tau \qquad (9)$$

so that reverse voltage occurs when $$\frac{\sin (\phi - \omega t)}{\sin \omega t} = \frac{2 + 2(\omega \tau)^2}{\nu_s \tau} \qquad (10)$$

For fast switching in the class C type of operation considered, $\nu_s$ must be larger than $\omega$. Also, $\nu_s \tau$ cannot be small compared to unity in order that the $\alpha_0$ values be sufficiently large to give switching.

If $\nu_s$ is not large compared to $\tau$, the limitation of diffusion on base layer charging needs to be considered and approximation (9) requires revision.

A desirable and simple situation is $$\nu_s > 1/\tau > \omega \qquad (11)$$

so that $\omega \tau < 1$ and $$\phi \cong \omega \tau < 1 \qquad (12)$$

Replacing the series by their arguments in (10) then leads to $$t = \tau \div \left[ 1 + \frac{2[1 + (\omega \tau)^2]^{1/2}}{\nu_s \tau} \right] \qquad (13)$$

so that $t$ will be less than $\tau$. If $\omega \tau \ll 1$ and $\nu_s \tau \gg 1$, (13) becomes $$t = \tau - 2/\nu_s \qquad (14)$$

so that the limitation due to diffusion causes the voltage to appear about one diffusion time earlier than one lifetime after the current reverses.

10E.—*Majority carrier extraction*

After the reverse voltage appears, minority carrier extraction continues for a time approximately $1/\nu_s$ as the remaining minority carriers diffuse from the base layers. Subsequent majority carrier extraction proceeds as reverse bias builds up on the two emitter junctions.

It is instructive to compare the conductive currents during minority extraction with the following capacitative currents. For this purpose we introduce a quantity $Q_B(V_B)$ which is the charge per unit area of a junction to bring it to breakdown voltage. If the junction is an abrupt or step junction, heavily doped on the p-side, then the voltage on the other side is $$V_B = q n_n W^2 / 2 H \epsilon_0 = Q^2 / 2 q n_n K \qquad (1)$$

where $n_n$ is the net donor density, K is the dielectric constant which will be expressed in farads/cm. and is for silicon $$K = H \epsilon_0 = 11.7 \times 8.85 \times 10^{-12} \text{ farads/meter}$$
$$= 1.04 \times 10^{-12} \text{ farads/cm.} \qquad (2)$$

i.e., from face-to-face a centimeter cube of silicon has a capacity of 1.04 $\mu\mu f$.).

The value of Q at breakdown depends on the structure of the junction. For example, S. L. Miller in the Physical Review, vol. 105, pp. 1246–1249 (1958), shows that impurity densities in pn+ junctions of 100 volts and 10 volts breakdown are $5 \times 10^{15}$ and $1.8 \times 10^{17}$, respectively.

Since the voltage varies as $Q_B^2$ divided by charge density, and the values of $Q_B$ are in the ratio $$Q_B(100)/Q_B(10) = [100 \times 5 \times 10^{15}/10 \times 1.8 \times 10^{17}]^{1/2}$$
$$= [1/3.6]^{1/2} = 0.53 \qquad (3)$$

The actual values of $Q_B$ are $$Q_B(100) = [2 \times 1.6 \times 10^{-19} \times 5 \times 10^{15} \times 1.04 \times 10^{12} \times 100]^{1/2}$$
$$= 4.1 \times 10^{-7} \text{ coulombs/cm.}^2 \qquad (4)$$

$$Q_B(10) = 7.8 \times 10^{-7} \text{ coulombs/cm.}^2 \qquad (5)$$

These correspond to numbers of carriers per unit area of $2.55 \times 10^{12}$ and $4.9 \times 10^{12}/\text{cm.}^2$ and to peak electric fields of $$Q_B/K = 3.94 \text{ and } 7.50 \times 10^5 \text{ volts/cm.} \qquad (6)$$

and average fields of half this amount and space-charge widths of $$W = 2KV_B/Q_B = 5.1 \times 10^{-4} \text{ and } 0.27 \times 10^{-4} \text{ cm.} \qquad (7)$$

In terms of $Q_B$, the time required to bring a four-layer diode from zero bias to breakdown while the current is varying as $I_M \sin \omega t$ starting at $t = \tau$, is given by $$Q_B \cong I_M \omega [(t+\tau)^2 - \tau^2]/2 \qquad (8)$$

so that the total time lag $t+\tau$ in between $I=0$ and the time of reaching $Q_B$ is given by $$\omega(t+\tau) = [(Q_B/I_M)2\omega + (\omega \tau)^2]^{1/2} \qquad (9)$$

The time $Q_B/I_M$ is a characteristic time for a given diode. For a hundred-volt diode with a current capacity of $10^3$ amp./cm.$^2$, its value is $$\tau_{BM} = Q_B/I_M = 4.1 \times 10^{-10} \text{ sec.} \qquad (10)$$

This time is short compared to $\tau$ for silicon doped with gold at a saturation density of $10^{17}/\text{cm.}^3$ for which $\tau$ may be estimated to be about $3 \times 10^{-9}$ sec., from the papers of Bemski, Phys. Rev., vol. 111, p. 1515 (1958); and Collins, Carlson, and Gallagher, Phys. Rev., vol. 105, p. 1168 (1957).

If $\tau_{BM}$ is much less than $\tau$ and if $\omega \tau$ is of the order of unity, then the time $t$ required to reach $Q_B$ after voltage appears is obtained from Equation 9 and is $$\omega t \cong \tau_{BM}/\tau \qquad (11)$$

so that only a small fraction of a radian is lost if $\tau_{BM}$ is $< \tau$. If $\tau_{BM}$ is larger than $\tau$, Equation 11 may be quite inaccurate and Equation 9 should be used.

The value of $\nu_s$ may be estimated as follows. If we assume that the charge $Q_B$ punches about half way through the base layers, the widths under large bias will be about those estimated in Equation 7. The diffusion constants for holes and electrons are on the average about 20 cm.$^2$/sec. and 10 cm.$^2$/sec. for the two cases considered. This leads to $\nu_s$ values of $$\nu_s(100) = 2 \times 20/25 \times 10^{-8} = 1.6 \times 10^8 \text{ sec.}^{-1} \quad (12)$$

$$\nu_s(10) = 2 \times 10/6 \times 10^{-10} = 3 \times 10^{10} \text{ sec.}^{-1} \quad (13)$$

The 100 volt diode is marginal with $1/\nu_s = 6 \times 10^{-9}$ sec. if $\tau$ is $3 \times 10^{-9}$ sec. A 30 volt diode would be more conservative for $\tau = 3 \times 10^{-9}$ sec.

The voltage waves during the switching transient based on the foregoing reasoning are shown in FIG. 10.11. It is seen that $Q_p$ drops to zero a time $\tau$ after the current drops to zero. It is assumed $1/\nu_s$ is less than $\tau$. The time to rise to the voltage where the other diode switches is given by the approximation (11).

In connection with Equation 11 it should be noted that the current I must charge the capacitors of both diodes, although it does not charge either of them by the full amount $Q_B$. Furthermore, due to majority carrier extraction, the actual charge required to bring a diode from zero volts to breakdown may be as much as $2Q_B$, as discussed following Equation 2 of Subsection 10D. Thus, the actual situation differs from that given by $\tau_{BM}$ by factors that compensate to some degree.

After the second diode starts to turn on, the effective multiplication causes most of the injected current to accumulate in the base layers so the rate of fall is comparable to the $\tau_{BM}/2\omega\tau$ term with a possible initial delay of the order of $1/\nu_s$.

It is clear that majority carrier extraction is accomplished by the switching cycle as described above. Some important consideration relating to tolerances and design limits are given in Subsection 10G, which follows after the next Subsection 10F describing the switching cycle of FIG. 10.11.

10F.—The switching cycle

On the basis of the foregoing reasoning, the various features of FIG. 10.11 become evident. The sign conventions are illustrated in part (a). The time selected for study covers the time during which diode $D_1$ turns off and $D_2$ turns on.

The current I, through diode $D_1$, on a unit area basis, reverses at $t=0$ and flows by minority carrier extraction for a time $\tau$ as discussed in Equation 13 of Subsection 10D.

After time $\tau$, the current I is carried by displacement in diode $D_2$ which is already forward biased, and by displacement and majority carrier extraction by $D_1$ which is at zero bias at $t=\tau$. Initially $D_1$ has much the larger capacity and carries all the current I. When a charge approximately equal to $Q_B$ has passed, diode $D_2$ approaches breakdown and begins to carry all the current. At this instant, the current in $D_1$ is zero and the reverse voltage on it is a maximum.

$D_2$ then builds its current up rapidly and drops its voltage to zero. The situation in $D_1$ is then like that shown in FIG. 10.10, parts (c) and (d). A favorable case, which will be discussed below, corresponds to this reversal leaving both emitter junctions reverse biased so that turn-on of $D_1$ does not occur, due to the transient increase of voltage $V_{D1}$ across it through zero to $+2V_a$ as shown in part (f) of FIG. 10.11.

For this favorable case, the charge drawn through $D_1$ does not bring the center junction from zero bias to breakdown, hence the positive pulse of current in $I_1$ corresponds to a charge less than $Q_B$.

The energy consumed by diode $D_1$ during the switching phase is the integral of the power $I_1V_{D1}$ delivered to it. This power is negligible except during the time after $\tau$ when the voltage is appreciable. The power delivered thereafter extracts majority carriers at a voltage much smaller than $V_B$ in quantity less than $Q_B$, and thus requires an energy less than $V_BQ_B$. Reversal of the voltage to $+2V_a$ does not alter the stored energy markedly. Hence, the total energy delivered to diode $D_1$ is of the order of $V_BQ_B$. Similar reasoning shows that the energy furnished to diode $D_2$ is also of the order of $V_BQ_B$. If the total energy absorbed per switching operation is taken as $V_BQ_B$ of the two diodes, then the power consumed by the diodes due to non-ideal switching is approximately $$\text{Power lost} = V_BQ_B\omega/\pi \quad (1)$$

since switching occurs $\omega/\pi$ times per second.

The power delivered to the load will be reduced as $\omega\tau$ approaches unity. This is illustrated in FIG. 10.12, which shows $\omega\tau \cong 1$ and neglects $\tau_{BM}$ and $1/\nu_s$ compared to $\tau$. It is seen that the average power is $$\text{Power to load} = (1/\pi)V_aI_M\int_0^\pi \sin(\theta+\omega\tau)d\theta$$

$$= (2/\pi)V_aI_M \cos(\omega\tau) \quad (2)$$

This is smaller than the case considered in FIG. 10.7 by the power factor $\cos\omega\tau$.

The ratio of power lost to power delivered assuming the maximum value of $V_B/2$ for $V_a$ is $$\frac{\text{Power lost}}{\text{Power to load}} = \frac{V_BQ_B\omega/\pi}{V_BI_M(\cos\omega\tau)/\pi}$$

$$= \omega\tau_{BM}/\cos\omega\tau \quad (3)$$

Thus, if $\omega\tau$ is the order of unity and $\tau_{BM}$ is much less than $\tau$, a relatively small fraction of the energy is lost.

10G.—Tolerances and design limits

Two points remain to be discussed, both being concerned with the behavior of diode $D_1$ in FIG. 10.11: (1) the effect of the negative excursion as the diode is turned off, and the possibility that this will produce reverse breakdown prior to the turn-on of diode $D_1$, and (2) the possibility that the subsequent swing to $+2V_a$ for $V_{D1}$ will turn it on. There are several ways of obviating these difficulties.

For the case of the symmetrical diode of FIG. 10.10, the situation is relatively simple. FIGURE 10.13 shows two curves corresponding to the relationship of voltage across the diode to charge Q on the junctions. The curve (a) corresponds to voltage $V_C$ across the collector junction for normal forward operation, and curve (b) to reverse voltage equally divided across the two emitter junctions as in (b1) of FIG. 10.10. The sum of these two emitter junction voltages is $V_{2e}$. In all cases, drops across forward biased junctions are taken as negligible. The breakdown voltages are designated as $V_{BC}$ and $V_{Be}$. The charges on the junction capacities are, of course, equal to the chemical charge density of each sign per unit area in the space-charge dipole layer and are designated by $Q_C$ and $Q_e$.

In the switching cycle of FIG. 10.11, the conducting diode $D_1$ is reverse biased by an amount $V_K$. The voltage across $D_2$ when it fires is thus $V_S$ $$V_S = V_K + 2V_a \quad (1)$$

where $V_S$ may be larger or smaller than $V_{BC}$ if transient $dV/dt$ effects are important.

In terms of FIG. 10.13, the switching cycle proceeds as follows: When diode $D_1$ turns off, it becomes reverse biased to a voltage $V_K$ at which point the charge in the emitter junctions is $Q_K$. The majority carrier extraction current may cause the actual charge withdrawn to be of the order of $2Q_K$. This is then the situation at the peak reverse voltage.

Diode $D_2$ then turns on and the voltage drops until $D_1$ has a forward bias of $+2V_a$. The situation in $D_1$ is then as represented in part (d1) of FIG. 10.10. The reverse bias on the center junction is $V_C$ and the total voltage is $V_C-V_{B_\epsilon}$:

$$2V_a = V_C(Q_C) - V_{B_\epsilon}(Q_K - Q_C) \quad (2)$$

This equation states that the total voltage is that due to adding a charge $Q_C$ in the forward direction to the diode so that the charge on the center junction goes from 0 to $Q_C$, while the charge at each emitter junction drops from $Q_K$ to $Q_K$ to $Q_K - Q_C$. Diode $D_2$ then waits in this condition for a half cycle until it is kicked forward by an additional voltage $V_K$ to a new voltage of $2V_a + V_K$ at which voltage it fires.

The simplest firing condition is that $Q_K - Q_C$ just drops to zero at the instant $Q_C$ reaches $Q_{BC}$. Under these conditions, avalanche current at the collector junction flows just at the instant the emitter junction becomes forward biased. This leads to $$V_{BC} = V_C(Q_K) = V_C[Q_\epsilon(V_{BC} - 2V_a)] \quad (3)$$

This equation will be satisfied if $$Q_\epsilon(V_{BC} - 2V_a) = Q_{BC} \quad (4)$$

since $V_C(Q_{BC}) = V_{BC}$, so that $$V_K = V_\epsilon(Q_{BC}) \quad (5)$$

and $$2V_a = V_{BC} - V_\epsilon(Q_{BC}Q \quad (6)$$

This equation leads to a positive value of $2V_a$ if $V_K(Q_{BC})$ is less than $V_{BC}$. It is thus evident that a lower breakdown voltage for the emitter junctions means that $Q_{B_\epsilon}$ will be larger than $Q_{BC}$, in keeping with the results quoted in Equation 3 of Subsection 10E. Thus, if $V_{B_\epsilon}$ is less than $V_{BC}$, operation of the simple form in which $Q_\epsilon$ goes to zero just as $Q_C$ reaches $Q_{BC}$ when $V_K$ occurs.

This mode of operation answers the second of the two remaining questions referred to above, since in the waiting condition $2V_a$ is less than $V_{BC}$ and $Q_\epsilon$ is greater than zero. Thus, the emitter junctions are reverse biased and the $dV/dt$ effect on switching is suppressed.

It is also seen that since $Q_K$ is less than $Q_{B_\epsilon}$, the reverse kick of $V_K$ does not reach reverse breakdown and hence as $D_1$ is kicked reverse in FIG. 10.11, it does not limit the firing pulse on $D_2$.

The situation prevailing in $D_1$ after it is turned off and brought to forward bias of $2V_a$ will in general prevail substantially unchanged until the next switching cycle occurs. This follows from the fact that the reverse currents composed of thermally generated carriers are relatively small. In structures that are heavily doped compared to intrinsic densities, the rate of generation will be greatest in the space-charge regions, and these will occur at a rate of approximately $n_i/\tau$ where $\tau$ is the lifetime for minority carriers. In order to appreciably reduce $Q_C$ or $Q_\epsilon$ due to the thermal generation, a time of the order of $(n_n/n_i)\tau$ must elapse so that each element of volume produces enough carriers to restore it to neutrality. In silicon and germanium $n_i$ values are about $10^{10}$ and $3 \times 10^{13}$ whereas $n_n$ is about $10^{17}$. Thus, the discharge time will be many orders of magnitude larger than $\tau$, whereas the time between switching cycles will be only a few times $\tau$. Thus, the charges $Q_C$ and $Q_\epsilon$ will remain substantially unchanged during the interval.

The foregoing discussion has been based on a symmetrical four-layer diode. Similar but somewhat more involved reasoning applies to unsymmetrical diodes. For these, application of reverse voltage may cause one junction to reach breakdown before the other. This will be especially true if the transmission through the center layers is unsymmetrical. With one junction at breakdown, the other two junctions act like a three-layer avalanche diode. This will show a substantial negative resistance region if its $\alpha_0$ value is near unity. If the layers are made such that the maximum values of $\alpha_0$ are no larger than 0.7, then $M$ values of 1.4 are required, and $V_C/V_B$ values of more than 0.67 will occur and the $Q$ will be about 0.87 times the $Q_B$ of the junction. (Assuming that $n=3$ in the formula for $M$ and that $V$ varies $Q^2$.) Thus, if the emitter junctions have substantially lower breakdown voltages than the collector junction at the reverse holding voltage, majority carrier extraction will have proceeded to the extent that both junctions are biased to greater charges than $Q_{BC}$. Hence, the desired independence from $dV/dt$ effects will be obtained during the swing to $2V_a$ forward bias.

The assurance of reaching the reverse holding voltage for $D_1$ while not limiting the firing of $D_2$, can be achieved by circuit means shown in FIG. 10.14(a) which corresponds to part (a) of FIG. 10.11. Here an additional two-layer junction diode $D_1$ is included in the circuit. This diode may be taken to have the same area as the four-layer diode and to have a junction breakdown higher than $V_{BC}$ and a lifetime larger than $\tau$, possibly by a factor of 1.5 to 4.

On the positive swing of $V_D$ from $+V_a$ to $+V_a+V_K$, this two-layer diode passes reverse current. Its minority carriers are not fully extracted as easily as those in $D_1$, consequently voltage appears across $D_1$ first and $D_1$ is driven by the current to the reverse holding voltage, possibly passing through a reverse negative resistance region in the process. The current $I$ continues to flow to reverse the two-layer diode and as injected minority carrier extraction becomes sufficient, a reverse voltage appears across the two-layer diode $D_1'$ and the current acts to charge its junction capacitance and the voltage $V_D$ rises until $V_{BC}$ appears across $D_2$, the two-layer diode $D_2'$ associated with $D_2$ having forward bias.

After $D_2$ fires, forward bias tends to be restored across $D_1$ and $D_1'$. Because of the lower capacity of diode $D_1'$ compared to $D_1$, forward bias appears across it before the swing of $V_D$ to $-V_a$ is complete.

After $V_D$ has fallen substantially to $-V_a$, forward bias still remains across the emitter junctions and since $2V_a$ is less than $V_{BC}$ by $V_K$, the reverse voltage across $V_C$ will still be less than $V_{BC}$ across the center junction. Even if some avalanche current is drawn across the collector junction in this stage of the operation, it will lead to equal discharges of the two emitter junctions and thus not to the forward bias needed for turn-on provided $2V_a$ is significantly less than $V_{BC}$, say 80% of $V_{BC}$.

The foregoing example should suffice to illustrate how the $D_1'$ can also contribute to impulsive charging of diode $D_2$. Thus, when $I$, which is increasing in the negative sense of FIG. 10.11, exceeds the minority saturation current of $D_1'$, a rapid increase in voltage ensues for the same reasons discussed in connection with the conventional diode of FIG. 8.4. In effect, a current of $I_M \omega \tau'$, where $\tau'$ is the lifetime of diode $D_1'$, becomes suddenly available to charge diode $D_2$ and, as discussed in connection with Equation 10 of Subsection 10E, this can lead to very rapid impulsive charging.

The foregoing discussion is applicable to other oscillator circuits than that of FIG. 10.6. It should also suffice to give guidance as to low amplitude and frequency modulated power-oscillator circuits may be designed using four-layer diodes. Further consideration of the charge relationships in FIG. 10.13 can be used to determine the range of voltages $V_a$ that may be employed for stable operation.

10H.—Conclusions

Punch-through diodes of the form discussed in Subsections 1C and 1D can also be operated in accordance with the principles discussed in this section. In this case punch-through voltage plays the role of breakdown voltage. Since punch-through charges per unit area can be made smaller than charges for breakdown, power dissipation terms like those in Subsection 10F involving $V_B Q_B$ can be reduced. A particularly interesting case is the unsymmetrical diode with one heavily doped base layer and punch-through voltage well below breakdown in the other base layer. Reverse punch-through can be made to come at voltages lower than forward by having a graded base with higher concentration near the emitter. This is like having $V_{B_e}$ less than $V_{BC}$ in Subsection 10G.

Another interesting case has two weakly doped base layers with net charges substantially less than $Q_B$. For this case complete majority extraction can occur. The potentials for this case are shown in FIG. 10.16, part (c), the chemical charge density being shown in part (b). Complete majority extraction is represented for reverse potentials corresponding to curves (c1) and (c2). For these cases no majority carriers are present in the middle region. Due to the lack of symmetry of charge density in the base layers, it is seen that complete extraction will occur at a lower voltage than forward punch-through.

After complete extraction, punch-through must occur before any carrier current flows. This condition is supposed to occur before avalanche multiplication is important. When punch-through is reached, space-charge limited currents flow and a rapid build-up of current occurs. Under these circumstances, lateral stability would be difficult to achieve in a steady state condition, but impulsive charging can be used. The build-up of current will be very rapid in this case due to the small effective widths of the base layers.

The theory of minority carrier extraction of Subsection 10D will apply to punch-through cases. It should be noted that this mode of operation of a double punch-through diode does not involve the dependence of alpha upon current required for the D.-C. negative resistances of Section 1.

The design principles of the preceding subsections can be extended to three-layer diode circuits. For these, majority carrier extraction occurs in a different way as discussed in Section 9. The closed time depends upon the lifetime of minority carriers stored in the base layer. Thus, the time constants of the circuit are more critically related to those of the three-layer diode than they would be for a four-layer diode.

It should be noted that the diode of FIG. 9.4 can be operated without recourse to the dependence of alpha upon current. Thus after carrier extraction has occurred with the emitter reverse biased and $Q_e$ close to $Q_{B_e}$, the diode cannot inject carriers from the emitter into the base until forward breakdown occurs so that the $Q_e$ on the emitter is brought back to zero; this follows from the reasoning used with FIG. 10.13 because $Q_{BC}$ is less than $Q_{B_e}$. Thus, during the voltage rise to $V_{BC}$, it is not important that the alpha of the emitter-base combination be small, since it plays no role in the process. (In effect, alpha is zero since all the current across the emitter is displacement current.) The subsequent turn-on and drop to zero voltage should be followed by a period at low or reverse voltage long enough to allow the carriers generated by avalanche multiplication during the current build-up phase to be recombined, and majority carriers to be extracted prior to the next rising voltage wave. Nonlinearity of the recombination processes is not essential to this mode of operation.

FIGURE 10.15 illustrates how the push-pull combination of diodes may be used as an amplifier. The pulse generator P is used to switch the circuit from one polarity to the other by giving a pulse layer than $V_R$. A tuned load can replace the resistance R provided a D.-C. path to ground is provided through a current source adjusted to match the average current that flows in an unbalanced wave form. This arrangement can be used to amplitude modulate an oscillator.

SECTION 11.—SERIES AND PARALLEL OPERATION

An additional method of getting higher power from transistor diodes consists of operating several simultaneously.

FIGURE 11.1 illustrates a simple circuit with several diodes in series. It is evident from the considerations of Subsections 3B and 5B that no new difficulties will arise from this circuit. For a given current the voltage is simply the sum of the voltages of the three diodes.

There are certain basic advantages in operating diodes in series to obtain a given voltage level compared to making one higher voltage diode. The higher voltage diode must have a wider space-charge layer at the center junction. In general, this will require smaller concentration gradients and thus wider base layers and lower frequency response. Thus, the series arrangement will lead to higher frequency performance.

In this regard the transistor diode has an advantage over junction transistors, since the operation of transistors in series poses a serious problem of isolating the input signals across the base-emitter junction from the large amplitude A.-C. voltages that would arise in series operation.

Similar considerations for series operation evidently apply for pulse operation as well as small signal operation.

Parallel operation of transistor diodes poses more difficult problems than series operation. Two diodes in parallel have the same voltage and will, in general, be unstable for the reasons discussed in connection with Subsection 3D. These difficulties can be overcome by arranging to add impedance which will stabilize the diodes for situations in which the currents do not change equally. One such arrangement is shown in FIG. 11.2. In this case the diodes are stabilized for low frequencies by the resistors in series with them. At higher frequencies, these resistors are by-passed by the condensers. However, at high frequencies the two coils which have high negative mutual inductance present a high impedance for any difference in current between the diodes, and the resistance tends to damp out any oscillating energy that may arise from such a mode of oscillation. On the other hand, the inductances present a low impedance for equal current changes in the two diodes. Thus the negative resistance of two diodes in parallel will be realized for frequencies above the by-pass frequency for the RC circuits.

Circuits like FIG. 11.2 can also be put in parallel as represented in FIG. 11.3 where each dashed rectangle represents the dashed rectangle of FIG. 11.2. This procedure can evidently be indefinitely extended.

Another form of parallel operation is illustrated in FIG. 11.4. This is illustrated for the form of circuit discussed in FIG. 10.6. The relationship of the constants to those of FIG. 10.6 is $$L'=nL,\ nC'=C,\ R'=(L'/4C')^{1/2}$$
$$=(n/2)(L/C)^{1/2} \quad (1)$$

where, for the example shown, $n=3$. This combination makes the parallel L', C', R' circuit critically damped so that disturbances decay as functions of the form $$(at+b)\ \exp{-\omega t} \quad (2)$$

where $\omega$ has the value of $$\omega=(L'C')^{-1/2}=(LC)^{-1/2} \quad (3)$$

and $a$ and $b$ are adjustable constants.

Unless the Q of the LCR circuit is very small, the frequency will be close to $\omega$ and the value of R' will be $$R'\cong nL\omega/2=n/2\omega C \quad (4)$$

The circuit behavior can be understood by considering the case in which all of the upper diodes are regarded as permanent shorts, so that the voltage $V_0$ executes a complex damped oscillation about its final value $V_a$. The value of $V_0$ is evidently the average of $V_1$, $V_2$, $V_3$:

$$nV_0=\sum_i V_i \quad (5)$$

The general form of disturbance can be represented, according to well known theorems on linear systems, in terms of the sum of many individual expressions of the form exp $pt$. The allowed values of $p$ turn out to be very simple for the system of FIG. 11.4. They may be found most easily by setting $V_a=0$ so that all voltages decay finally to zero. The actual complex oscillation with shorted upper diodes is then obtained by adding $V_a$ to the $V_1$ and $V_o$ terms so obtained. The current through R is equal to the sum of the currents through the inductors and the capacitors, and this leads to $$V_R/R = -\Sigma V_i/pL' = -V_o/pL$$
$$= pC'\Sigma_i(V_i - V_R) = pC(V_o - V_R) \quad (6)$$

where $p$ is an operator. These equations lead to $$(p^2LC + pRC + 1)V_o = 0 \quad (7)$$

from which it follows that $V_o - V_a$ goes through a damped oscillation of precisely the same form as if all $R'$ were zero, so that the circuit would be reduced to that of FIG. 10.6.

The deviation of any individual voltage from the mean voltage $V_o$ also satisfies a simple equation as may be seen as follows: The net current from the point $V_1$ must be zero. Hence, $$\frac{V_1}{pL'} + \frac{V_1 - V_o}{R'} + pC'(V_1 - V_R) = 0 \quad (8)$$

If similar equations are written for $V_2$, $V_3$, etc., up to $V_n$ and the sum of $1/n$ of all $n$ equations is subtracted from Equation 8, the result is $$\frac{V_1 - V_o}{pL'} + \frac{V_1 - V_o}{R'} + pC'(V_1 - V_o) = 0 \quad (9)$$

Thus, the deviation of $V_1$ from the mean voltage $V_o$ decays with a value of $p$ given by the parallel $L'$, $R'$, $C'$ circuit $$p^2L'C' + pL'/R' + 1 = p^2LC + p2\sqrt{LC} + 1 = 0 \quad (10)$$

which has two equal roots with $$p = -(LC)^{-\frac{1}{2}} = -\omega \quad (11)$$

From this it follows that in a half cycle of the oscillation of $V_m$, which requires a time of approximately $\pi/\omega$, the disturbance of any $V_1$ from the mean value decays by approximately $$\exp[-\omega(\pi/\omega)] = \exp(-\pi) = 0.043 \quad (12)$$

This decay is so great that as the current through R goes through zero, any small difference in time of switching of one diode compared to another will not produce enough voltage variation among the $V_i$'s so as to cause an enhanced deviation on the next switching cycle. In other words, the parallel operation will be stable.

A variety of means may be employed to start the circuit with all diodes turned on. For example, a circuit like that of FIG. 10.6 may be employed. If a sharper wave front is required than can be obtained with a transistor, a four-layer diode may be used to replace the transistor, or several four-layer diodes may be used in parallel or parallel series to give high impedance inputs. Saturable reactors and forward biased diodes as shown and discussed in connection with FIGS. 8.4 and 10.9 may also be employed.

Still another means of utilizing a number of transistor diodes together in an oscillator or amplifier circuit is to use them sequentially on the same load. In the case of a resonant load, one diode can turn on and carry current for about a half-cycle and the next diode can turn on for the third half-cycle, and reverse bias the preceding diode to produce majority extraction, etc.

SECTION 12.—SOME MEANS OF PRODUCING STRUCTURES AND ADDITIONAL GENERAL COMMENTS

In this section we shall first treat methods of producing three-layer transistor diodes and then discuss four-layer transistor diodes.

*Three-layer structures*

FIGURE 12.1 illustrates a preferred embodiment of the principles disclosed. This represents a slice of silicon in which a thin, approximately circular window or web has been formed by processes disclosed in copending application Serial No. 769,193, filed October 23, 1958. The structure comprises a guard-ring region at which the breakdown is substantially lower than in the narrow region. This is illustrated for the case of an n-type base layer and the guard-ring region may be formed by diffusing the n-type layer from one side prior to the operations which are used for producing the thin septum. Subsequent to these operations, an n+ base layer is diffused over the entire surface, and then p++ layers are diffused to form an emitter on one side of the structure and a low-resistance ohmic contact on the other side. Metallic contacts and leads are then attached by the customary techniques. The device is represented as though it were attached to a large metallic body on the right side, which serves as a heat sink for removal of energy dissipated in the device. Heat sink provisions may be provided on both sides.

The structure of the p-layer should be such that avalanche fields are reached at the desired voltage. The theory of development of avalanche fields is well known and is discussed in many places, for example, in the three volumes on "Transistor Technology," prepared by Bell Telephone Laboratories and published by D. Van Nostrand and Company.

It may be desirable to introduce a region of low concentration gradient at the emitter junction so as to reduce the emitter-base capacity to an optimum value. This will also lead to a control of the width of the region in which recombination varies as the Boltzmann factor of half the voltage, as discussed, for example in Subsection 1D, occurs.

It is desirable to keep the characteristic times discussed in Section 3 as small as possible so as to obtain high-frequency response from such a device. One of the important times is $\tau_c - \tau_a$, discussed in particular in Section 2 and especially in Subsection 2E. This quantity depends upon the diffusion times through the base layer or, if the base layer contains a concentration gradient, the time including the enhancement of drift velocity due to built-in fields. This subject is discussed in the publications of Kroemer in connection with his work on the drift transistor and is well known in the semiconductor art.

In order to reduce the other important times, such as $\tau_s$ and $\tau_a$, it is desirable to pass a sufficiently large current through the structure so that the quantity $g_s$ discussed in Subsection 2D, gives an adequately small time constant when coupled with space-charge capacity across the collector junction. Also, it is desirable to maintain the admittance of the transition region of the emitter junction comparable to the admittance through the base layer. These considerations set several limitations upon the design, but they can be achieved by straightforward design considerations so that the characteristic time for the structure as a whole will be comparable to the diffusion time through the base layer itself. Thus, the limitations ordinarily encountered, due to the effect of base resistance and collector and emitter capacity, are not effective in reducing the response of the transistor diode. This conclusion is in keeping with the reasoning discussed in Section 4.

It is necessary that the lateral stability conditions apply to the working region of the structure of FIG. 12.1. This particular structure has some rib action for the base-layer region which extends outside of the thin working region.

Various means are available for reducing the lifetime for carriers in the structure of FIG. 12.1. For example, gold may be diffused into the structure. The recombination properties for gold in silicon have been investigated and the results published by G. Bemski, Phys. Rev., vol.

111, p. 1515, September 15, 1958. If gold is uniformly distributed throughout the silicon, it will contribute to the generation current in the space-charge region at the collector junction. It should be noted that this current will, in general, be unimportant compared to the current that is being injected and flowing through the device. The reason for this is that very large current densities will in general prevail for high-frequency operation, and this will result in carrier concentrations which have products of electron density times hole density, which are very much larger than the equilibrium values. The rate of recombination under nonequilibrium conditions is approximately proportional to the hole or electron density, if these are approximately equal. On the other hand, the rate of generation is proportional to the intrinsic carrier density. Thus, although the region of recombination for holes and electrons in the junction between emitter and base is far smaller than the space-charge region at the collectors, the rate of recombination there may be much greater—so much greater, in fact, that the space-charge generation is practically negligible in comparison.

Another means of producing substantially uniform distribution of recombination centers may be achieved by bombarding the entire structure with high-energy electrons with energies, for example, in excess of one million electron volts. This produces defects in the lattice which act as recombination centers. A review of the effect of radiation bombardment in silicon will be found in an article by G. K. Wertheim, Phys. Rev., vol. 111, p. 1500, September 15, 1958. This contains references to earlier electron bombardment work.

In principle, however, it is more desirable to concentrate the recombination chiefly to the region of the emitter-base junction. This can be accomplished by producing radiation damage at a shallow depth in the structure. This may be done, for example, by bombarding the structure with protons or alpha particles at sufficiently small bombardment energy that their penetration is only about as far as the emitter junction. A subsequent heat treatment at moderate temperature but substantially higher than the operating temperatures, can be used to remove the transient parts of the radiation damage so that stabilized radiation damage will persist.

Still another means of producing localized damage which results in recombination is lightly to sand-blast or otherwise abrade the surface in the neighborhood of the emitter junction. It is known that sand-blasted surfaces of germanium are effective in producing high recombination velocities, and the damage due to such processes extends to a small depth in the structure. By controlling the amount of abrasion which occurs, the depth of the locus for recombination can also be controlled.

An alternative means of producing a structure having a variable recombination is to make use of surface barrier techniques in place of the emitter layer. This affords an additional degree of flexibility in the production of structures for transistor diodes.

By controlling the locus of the recombination centers, guard-ring effects may be produced which will be beneficial in connection with lateral stability problems. FIGURE 12.2 illustrates a transistor diode undergoing electron bombardment. The wire lead at the top shields the center portion from bombardment and as a result the rim has more recombination than the center region. Under these conditions, a higher base-emitter voltage at the rim will be required than at the center in order to achieve a given value of $\alpha(0)$. Thus, the negative resistance of the base layer at the edge will tend to be lower than in the center. This can be used to offset a higher value of multiplication at the edge due to surface effects.

The principles disclosed in copending application Serial No. 637,244, filed January 30, 1957, and Serial No. 722,577, filed March 19, 1958, having to do with the development of guard-ring structures in diodes and rib structures for transistors can be applied to three-layer transistor diodes by direct extension of the techniques. This will permit simplification of the problem of lateral stability, provided each of the individual web regions in a rib structure are, themselves, internally stable.

Four-layer diodes

Many considerations discussed in connection with the three-layer diode of FIG. 12.1 apply also to a four-layer diode. There are, however, some additional features which may be discussed. In particular, diodes having punch-through from one side only or from both sides can be produced. These will operate in accordance with the principles taught in Subsections 1C and 1D, and in Section 4. In the case of the space-charge widening from one side only, it is evident that a structure like that of FIG. 12.1 can be utilized, with the sole change that the p++ layer adjacent to the heat sink may be made n++ instead. In this case, the lateral stability requirement can be met by providing adequate conductivity in the n-type base layer.

It should be remarked that from the point of view of high-power application there is a definite advantage to the punch-through type device as compared to the avalanche type. For a given voltage at the breakdown point, the stored energy in the dielectric displacement in the silicon is proportional to the square of the electric field integrated over the volume. This in turn is proportional to the voltage times the average electric field. Since maximum drift velocities in silicon are achieved at fields of the order of 20,000 to 50,000 volts whereas breakdown requires fields four or five times as high at least, it is evident that the stored energy just prior to breakdown for a given area and given voltage may be four or five times less, at least, for a punch-through device than for an avalanche device. This energy must be dissipated within the device by the internal discharging of this capacity due to multiplication action, either by generation by avalanche or by hook-collector action, as the case may be. It is thus evident that the hook-collector type of action will result in substantially less dissipation of energy on each discharge than in the case for an avalanche device.

In producing structures that are intended to operate at very high frequencies, it may be desirable to introduce several forms of recombination centers to produce adequately low lifetimes, or one form of center at concentrations above those possible according to thermal equilibrium solubilities. This latter objective can be achieved by bombarding the surface with ions of the recombination element followed by an annealing of the radiation damage. These processes together with a discussion of control of the depth of penetration are discussed in U.S. Patent 2,787,564, issued to W. Shockley. Alternatively, radiation damage may be produced by ions of a species which may easily be removed from the crystals, such as hydrogen, lithium, or rare gases. The radiation damage will increase temporarily the solubility of impurities on the surface above their equilibrium values.

It should also be noted that in highly doped structures, many recombination centers will give lifetimes which increase with increasing minority carrier densities and this effect can lead to values of alpha which increase with increasing current. For such cases, the influence, discussed in Subsection 1D, of recombination in the transition region is not essential. The reason for this variation is that cross-sections for hole capture increase as a center becomes more negatively charged, and are then much larger than electron capture cross-sections. Examples of these effects are found in Table III of an article by G. Bemski in the Proc. I.R.E., vol. 46, p. 990, June 1958. As a result, hole injection tends to flood these centers and increase lifetime. The statistics of these processes are treated by Sah and Shockley, Phys.

Rev., vol. 109, p. 1103, 1958. The conclusions apply to both heavily doped n-type and heavily doped p-type.

SECTION 13.—ILLUSTRATIVE DESIGN CALCULATIONS

The principles described in the preceding sections may be better understood in terms of a design example. For this purpose numerical values like those of Subsection 10E are used. In terms of the breakdown field $E_s$, the breakdown charge density $Q_B$, the dielectric constant $K = H\epsilon_0$, thermal voltage $v_\theta = kT/q = 0.025$ volt, and $D$ the diffusion constant for minority carriers in the base layer, i.e. holes, we define a set of characteristic quantities for a p-n-p silicon three-layer transistor diode of the type discussed in Section 2.

$$Q_B = H\epsilon_0 E_s = KE_s = 5 \times 10^{-7} \text{ coulomb/cm.}^2 \quad (1)$$

$$L_B = v_\theta/E_s = Kv_\theta/Q_B = 5 \times 10^{-8} \text{ cm.} \quad (2)$$

$$\tau_B = L_B^2/D = 2.5 \times 10^{-15}/D \text{ sec.} \quad (3)$$

$$I_B = Q_B/\tau_B = DQ_B^3/K^2 v_\theta^2 = 2 \times 10^8 D \text{ amp./cm.}^2 \quad (4)$$

$$C_B = K/L_B = Q_B/v_\theta = 20 \text{ } \mu\text{f./cm.}^2 \quad (5)$$

$$n_B = Q_B/qL_B = Q_B^2/qKv_\theta = 6 \times 10^{19} \text{ cm.}^{-3} \quad (6)$$

For the example chosen below, the carrier density in the base is of the order of $10^{19}$ and the mobility is about 100 cm.$^2$/sec. so that $D = \mu/v_\theta \cong 2.5$ cm.$^2$/sec.

In order to simplify the problem, we require that mobile carrier space-charge does not have an important influence in the space-charge region of width $W_s$ and voltage drop $V_s$. We introduce a quantity $f_I$ which is less than unity:

$$\text{Def. } f_I: \quad I_0 = f_I I_B \quad (7)$$

and consider the voltage drop which can prevail when current density $I_0$ accumulates a charge of $Q_B$ in the collector junction. The charge accumulated is $I_0$ times the transit time $W_s/v(\text{max})$ where $v(\text{max})$ is the maximum drift velocity and is about $10^7$ cm./sec. We thus obtain $$Q_B = I_0 W_s/v(\text{max}) = f_I I_B V_s/E_s v(\text{max}) \quad (8)$$

$$V_s = Q_B E_s v(\text{max})/f_I I_B$$
$$= (v_\theta/f_I)[v(\text{max})/E_s(D/v_\theta)] \quad (9)$$

$$v(\text{max})/E_s \mu = 10^7/5 \times 10^5 \times 200 \cong 10^{-1} \quad (10)$$

Thus the voltage $V_s$ is many times thermal voltage if $f_I$ is much less than unity. For $V_s = 5$ volts, for example, $f_I = 5 \times 10^{-4}$. The transit time is $10^{-12}$ sec. for this voltage.

We now consider a base layer having uniform doping with width $W$ and
$$N_d - N_a = n_n$$
and hole density at the emitter side of $p_n$. For a current $I_0$ and a ratio $f_b = p_n/n_n$ we readily find $$\text{Def. } f_W: \quad W = L_B/f_W \quad (11)$$

$$I_0 = f_I I_B = qp_n D/W = qp_n f_W D/L_B \quad (12)$$

$$p_n = (f_I/f_W)L_B I_B/qD = (f_I/f_W)n_B \quad (13)$$

$$\text{Def. } f_b: \quad n_n = p_n/f_b = (f_I/f_W f_b)n_B \quad (14)$$

The emitter base transition region is supposed to be of the minimum capacity type, disclosed in copending application December 26, 1958, now Patent No. 2,953,488. In this case the minimum capacitance $C(n_e)$ depends upon the equality density $n_e$ and the following relationships hold $$(p_n n_n)^{1/2} = n_e = (f_I/f_W f_b^{1/2})n_B \quad (15)$$

$$C(n_e) = (2Kqn_e/v_\theta)^{1/2}$$
$$= 2^{1/2}(f_I^{1/2}/f_W^{1/2} f_b^{1/4})C_B \quad (16)$$

$$W(n_e) = \pi L(n_e) = (\pi/2^{1/2})(f_W^{1/2} f_b^{1/4}/f_I^{1/2})L_B \quad (17)$$

We next consider the characteristic times $\tau_s$, $\tau_\epsilon$, and $\tau_a$ of Section 2. $\tau_\epsilon$ and $\tau_a$ depend upon both the transision region "T" and the base region "W." $\tau_s$ depends only on the collector junction. From Section 2 we have $$\tau_s = Q_B\alpha_0/n(\alpha_0-1)f_I I_B = f_s \tau_B/f_I \quad (18)$$

$$\alpha_0 = 1/4; \quad \alpha(0) = 1.6\alpha_0 = 2/5 \quad (19)$$

$$f_s = \alpha_0/n(\alpha_0 - 1) = 10^{-1} \quad (20)$$

The contributions of diffusion in the base layer to the other $\tau$'s are all of the order of magnitude $\tau_W$ where $$\tau_W \equiv W^2/D = L_B^2/f_W^2 D = \tau_B/f_W^2 \quad (21)$$

The equation for $\tau_\epsilon$ is seen to be $$g_\epsilon(0)(1+j\omega\tau_\epsilon) = g_T(0)(1+j\omega\tau_T) + g_W(0)(1+j\omega\tau_W/3) \quad (22)$$

where $g_T(0)$ and $g_W(0)$ are the zero frequency conductances. Evidently $j\omega\tau_T g_T(0)$ is $j\omega$ times the transition capacitance. For the alpha values of Equation 19, we have $$g_W(0) = I_0/4v_\theta \quad (23)$$

$$g_T(0) = (3/2)g_W(0) = (3/8)I_0/v_\theta \quad (24)$$

$$g_T \tau_T = C(n_e) \quad (25)$$

$$g_T = f_c C(n_e)/\tau_r \cong C(n_e)/4\tau_r \quad (26)$$

Equation 26 is a consequency of the fact that in $C(n_e)$ a fraction $f_c$ of the change charge is due to minority carries which recombine at a rate $1/\tau_r$ where $\tau_r$ is the average lifetime. The minimum capacitance junction has less than half its change in capacity due to minority carriers and thus $f_c$ is about one-fourth.

The three times $\tau_T$, $\tau_W$, and $\tau_s$ can now be expressed in terms of the $f$ quantities:

$$\tau_T = C(n_e)/g_T = (2^{1/2} 8/3)(f_W^{1/2} f_I^{1/2} f_b^{1/4})^{-1}\tau_B \quad (27)$$

$$\tau_W = f_W^{-2}\tau_B \quad (28)$$

$$\tau_s = f_s f_I^{-1}\tau_B \quad (29)$$

$$\tau_r = f_c \tau_T \cong \tau_T/4 \quad (30)$$

We shall assume that recombination centers are present only in the "T" region and neglect recombination in the base.

To obtain the highest frequency response consistent with base layer thickness, $\tau_T$ and $\tau_s$ should be less than or equal to $\tau_W$. Then the characteristic times for $Z(\omega)$ of Section 2 will be about $\tau_W$ and the cut-off frequency will be about $1/2\pi\tau_W$. According, we set $$\tau_s = \tau_T = \tau_W = \tau_B/f_W^2 \quad (31)$$

and find that in terms of $f_W$ we must have $$f_I = f_s f_W^2 \quad (32)$$

$$f_b = (2^{14}/3^4)f_s^{-2}f_W^2 \cong 2f_W^2 \quad (33)$$

As an example of the use of these expressions, we consider the structure of a 160 mc. transistor with $\omega = 10^{-9}$ sec. We set $\tau_W = 10^{-9}$ sec. so that $\tau_\epsilon$ and $\tau_a$ are less than $10^{-9}$ sec. Assuming $D = 2.5$ cm.$^2$/sec., we have $$\tau_W = 10^{-9} \text{ sec.} \quad (34)$$

$$\tau_B = 10^{-15} \text{ sec.} \quad (35)$$

$$f_W = 10^{-3}, \quad f_I = 10^{-7}, \quad f_b = 2 \times 10^{-6} \quad (36)$$

These values lead to $$p_n = (f_I/f_W)n_B = 10^{-4}n_B = 6 \times 10^{15} \text{ cm.}^{-3} \quad (37)$$

$$n_n = p_n/f_B = 3 \times 10^{21} \text{ cm.}^{-3} \quad (38)$$

$$W = 5 \times 10^{-5} \text{ cm.} = 0.5 \text{ micron} \quad (39)$$

The value of $n_n$ in (38) is high and improved performance can be obtained by letting $f_b$ become somewhat larger. This will reduce $\tau_T$ as $f_b^{-1/4}$ in Equation 27, and lead to improved performance. We let $f_b = 6 \times 10^{-5}$ so that $n_n = 10^{20}$ cm.$^{-3}$. This gives for sheet resistance in the base layer $$\sigma \text{ (sheet)} = qn_n\mu_n W \\ = 1.6 \times 10^{-19} \times 10^{20} \times 100 \times 5 \times 10^{-5} \\ = 8 \times 10^{-2} \text{ mho square} \quad (40)$$

In accordance with the results of Subsection 3E, Equation 17, the total current is half the sheet conductance, $$I \text{ (total)} = I_0 \text{ Area} = 4 \times 10^{-2} \text{ amps.} \quad (41)$$

The current density $I_0$ is $$I_0 = f_I I_B = 20D = 50 \text{ amp./cm.}^2 \quad (42)$$

so that the area and edge for a square area are $$\text{Area} = L^2 = 0.8 \times 10^{-3} \text{ cm.}^2 \quad (43)$$

$$L = 0.3 \text{ mm.} \quad (44)$$

The operating voltage may be chosen in keeping with Equation 9 and the problem of heat dissipation. Equation 9 permits voltages of $10^6 v_\theta = 25,000$ volts for which the transit time would be $5 \times 10^{-9}$ sec. For a practical voltage, such as 25 volts the transit time is negligible.

If the disk of the diode has a radius $a$ and is mounted on a heat sink, the temperature rise is $\Delta T$ $$\Delta T = V_s I \text{(total)} / 4K_T a$$

where $K_T$ is thermal conductivity and for copper has the value 4 watts/cm. °C. For a diameter of 0.3 mm. this gives $$\Delta T \cong 4V_s I \text{(total)}$$

Thus for 100 volts operating voltage and 4 watts dissipation the diode will have a temperature rise of about 16° C. The resistance R(neg) will be about $$0.6/g_s(0) = 0.6 f_s V_s / I \text{(total)} \\ = 6 \times 10^{-2} \times 10^2 / 4 \times 10^{-2} \\ = 150 \text{ ohms}$$

in keeping with Equation 18 and with Subsection 2D.

It is evident from this example that the three-layer transistor diode has high potential performance. Improvements in design of the sort discussed in Section 2 can be used to obtain more favorable structures. The natural quantities introduced in this section can be used as a basis for selecting optimum materials.

I claim:

1. A semiconductive device comprising successive layers with adjacent layers being of opposite conductivity types forming a plurality of p-n junctions, said device including spaced outer layers and at least one interior base layer, electrodes formed with at least the outer layers for applying a signal thereto, and means for charging said interior layer with majority carriers substantially uniformly over its entire area in a time which is comparable to the diffusion time of minority carriers through said layer.

2. A semiconductive device as in claim 1 which includes three successive layers forming two p-n junctions.

3. A semiconductive device as in claim 1 wherein said device includes four successive layers forming three p-n junctions, at least one of the interior layers being charged uniformly over its entire area in a time which is comparable to the diffusion time of minority carriers through said layer.

4. A semiconductive device comprising successive layers with adjacent layers being of opposite conductivity types forming a plurality of p-n junctions, said device including spaced outer layers and at least one interior base layer, electrodes formed with at least the outer layers whereby a signal can be applied thereto, and means for charging said interior layer with majority carriers substantially uniformly over its entire area in a time which is comparable to the diffusion time of minority carriers through said layer, and means for removing majority carriers substantially uniformly from said base layer.

5. A semiconductive device as in claim 4 which includes three successive layers forming two p-n junctions.

6. A semiconductive device as in claim 4 wherein said device includes four successive layers forming three p-n junctions, at least one of the interior layers being charged uniformly over its entire area in a time which is comparable to the diffusion time of minority carriers through said layer.

7. A semiconductive device comprising three successive layers with adjacent layers being of opposite conductivity type to form two p-n junctions, one of said junctions having a breakdown voltage for avalanche multiplication which occurs at a voltage less than that required to produce punch through and the other junction including means for providing an alpha which increases with current.

8. A semiconductive device as in claim 7 wherein the interior layer includes recombination centers serving to discharge the layer.

9. A semiconductive device as in claim 7 wherein said other junction includes recombination centers.

10. The method of operating a semiconductive device of the type which includes successive layers forming a plurality of p-n junctions with terminals connected to the outer layers comprising the step of applying a rising voltage wave across said terminals, the rate of rise of said voltage wave being such as to produce an increase in current due to avalanche in a time which is comparable to the lateral instability time whereby opposed functioning of one portion of the device to another is prevented.

11. A method as in claim 10 in which the device comprises a three layer device having outer regions of the same conductivity type and an inner layer of opposite conductivity type forming a p-n junction with each of the outer layers.

12. A method of operating a semiconductive device as in claim 10 wherein the device comprises a four layer device including four contiguous regions forming three p-n junctions.

13. The method of operating a semiconductive device of the type having four successive layers forming three junctions and including terminals connected to the outer layers comprising the step of applying a rapidly rising voltage wave across said terminals, said wave having a rate of rise such that a substantial charge by space charge limited emission flows to at least one of the interior layers in substantially less time than the diffusion time of minority carriers through said interior region whereby the device operates with lateral stability.

14. The method of operating a semiconductive device of the type having four successive layers forming three junctions and including terminals connected to the outer layers, said device having two stable states, a low impedance high current state and a high impedance low current state comprising the steps of transferring the device rapidly from the low impedance high current state to the high impedance low current stage by application of a voltage to the terminals which voltage reverse biases the outer junctions to extract minority carriers from the adjacent layers.

15. The method as in claim 14 with the additional step of bringing the voltage rapidly up to a value less than but comparable to the breakdown voltage of the center junction.

16. The method of operating a semiconductive device of the type having four successive layers forming three junctions and including terminals connected to the outer layers, said device having two stable states, a low impedance high current state and a high impedance low current state and adapted to be transferred from the low impedance state to the high impedance state in response to a voltage of predetermined magnitude comprising the step of applying a voltage to the terminals which serves to reverse bias the outer junctions, said voltage being of sufficient amplitude to extract minority and majority carriers from the adjacent layers, and subsequently applying a forward voltage which causes reverse bias of the center junction without producing forward bias on the outer junctions.

17. A method as in claim 16 wherein the reverse bias voltage is controlled to control the forward voltage at which the device is transferred from the high impedance to the low impedance state during the subsequent application of forward voltage.

18. The method of operating a semiconductive device having three successive layers forming two junctions, one of said junctions having a higher chemical charge density gradient than the other which comprises the step of reverse biasing said one junction at or near breakdown for a time greater than the lifetime of minority carriers in the neighborhood of the other junction whereby majority carrier extraction at the reverse biased junction is accomplished.

19. A semiconductive device comprising four successive layers forming three p-n junctions, the interior layers having a chemical charge density per unit area selected such that punch through can occur before avalanche multiplication can be achieved at any junction.

20. A semiconductive device comprising four successive layers forming three p-n junctions, the concentration of chemical charge density in the interior layers being concentrated near the outer junctions whereby punch through and complete carrier extraction for a reverse voltage occurs at a voltage less than that of the forward voltage required for punch through and turn on.

21. A semiconductive device comprising first and second spaced layers of semiconductive material, an interior base region forming a junction with each of said spaced layers, means for charging said interior base layer with majority carriers substantially uniformly over its entire area in a time comparable to the diffusion time of minority carriers through said region, said base region including recombination centers for removing the majority carriers therefrom.

22. A semiconductive device as in claim 21 wherein said first and second spaced layers are of the same conductivity type and said base region includes a single layer of opposite conductivity type.

23. A semiconductive device as in claim 21 wherein said first and second spaced layers are of opposite conductivity type and said interior base region includes at least two layers of opposite conductivity type forming a junction, the layers of said base region forming a junction with said first and second spaced layers.

24. A semiconductive device comprising first and second spaced layers of semiconductive material, terminals connected to said layers, an interior base region including at least one layer forming a junction with said spaced layers, means for applying a D.-C. biasing current between said terminals, said current serving to bias the device so that it exhibits negative differential resistance, said base region including a layer having a conductance per square which is greater than the D.-C. biasing current divided by forty times the thermal voltage under operating conditions.

25. A semiconductive device as in claim 24 wherein said first and second spaced layers are of opposite conductivity type and said interior base region includes at least two layers of opposite conductivity type forming a junction, the layers of said base region forming a junction with said first and second spaced layers.

26. A semiconductive device comprising first and second spaced layers of semiconductive material, terminals connected to said layers, an interior base region including at least one layer forming a junction with said spaced layers, said device including a working portion near the center of the device and a high conductivity rim surrounding said working region, means for applying a D.-C. biasing current between said terminals, said current serving to bias the device so that it exhibits negative differential resistance, the working portion of the base region of said device including a layer having a conductance per square which is greater than the D.C. biasing current applied across the device divided by eighty times the thermal voltage under operating conditions.

27. A semiconductive device as in claim 26 wherein said first and second spaced layers are of opposite conductivity type and said interior base region includes at least two layers of opposite conductivity type forming a junction, the layers of said base region forming a junction with said first and second spaced layers.

28. A semiconductive device comprising first and second spaced layers of semiconductive material, terminals connected to said layers, an interior base region including at least one layer forming junctions with said spaced layers, said base region having relatively thick rib portions and relatively thin web portions, means for applying a D.-C. biasing current between said terminals, said current serving to bias the device so that it exhibits negative differential resistance, each mesh of the web having a conductance per square greater than the D.-C. biasing current divided by eighty times the thermal voltage under operating conditions and the average conductance of the entire base region including the effect of the ribs being less than the total current divided by forty times the thermal voltage under operating conditions.

29. A semiconductive device of the type having four contiguous layers forming three junctions, a terminal connected to the outer layers, the interior layers forming a base region having a center junction, said base region having a predetermined thickness and chemical charge density whereby the space charge region at the center junction penetrates the base layer to a substantial degree at a voltage below the voltage necessary to produce breakdown at the center junction, at least one of the outer-interior layer pairs having an alpha that increases with current.

30. The method of operating a semiconductive device of the type which includes outer layers and an interior base region with terminals connected to said outer layers comprising the steps of applying an alternating current voltage across said terminals, said voltage including a rapidly rising portion whereby the base layer is uniformly charged and having a frequency in which one radian of phase of the fundamental alternating current wave is long compared to the characteristic time for recombination at zero bias.

31. A semiconductive device including first and second spaced layers of semiconductive material, an interior base region forming first and second junctions with each of said spaced layers, a localized region of recombination centers at the first of said junctions whereby the characteristic time for current transmission factor alpha is comparable to the diffusion time through the base region, said second junction including a predetermined junction transition capacity whereby the relaxation time for the space charge region is comparable to the diffusion time through the base region.

32. The method of operating a semiconductive device which includes four successive layers of opposite conductivity type forming three p-n junctions and terminals connected to the outer layers comprising the step of applying a bias current to bias the device in a range wherein the current transfer factors alpha are of the order of one-half and the relaxation times for the alphas and the center junction are comparable to the diffusion times through the interior layers.

33. A semiconductive device of the type having four contiguous layers forming three junctions, the interior layers forming a base region having a center junction, said center junction having a breakdown voltage for avalanche multiplication which occurs at a voltage greater than that required to produce punch through in said base region.

References Cited in the file of this patent

UNITED STATES PATENTS

| | | |
|---|---|---|
| 2,655,610 | Ebers | Oct. 13, 1953 |
| 2,735,049 | De Forest | Feb. 14, 1956 |
| 2,764,642 | Shockley | Sept. 25, 1956 |
| 2,790,034 | McAfee | Apr. 23, 1957 |
| 2,842,668 | Rutz | July 8, 1958 |
| 2,855,524 | Shockley | Oct. 7, 1958 |
| 2,869,084 | Shockley | Jan. 13, 1959 |
| 2,895,058 | Pankove | July 14, 1959 |

UNITED STATES PATENT OFFICE
CERTIFICATE OF CORRECTION

Patent No. 2,997,604                          August 22, 1961

William Shockley

It is hereby certified that error appears in the above numbered patent requiring correction and that the said Letters Patent should read as corrected below.

Column 2, lines 33 and 34, after "transit" insert -- time --; column 3, line 57, for "employ" read -- employs --; column 7, line 35, for "thta" read -- that --; column 13, line 40, for "$T_0$=" read -- $I_0$= --; column 15, line 9, after "Q" insert a closing parenthesis; line 24, after "follows" insert -- directly --; column 18, line 50, for "Subsection A" read -- Subsection IA --; column 29, line 36, for "ot" read -- to --; line 42, for "Equation E" read -- Equation (1) --; column 35, line 58, before "2" insert -- $\nabla$ --; column 40, line 48, for "$f_3$=-[ sinh (W-x)s/L] sinh Ws/L" read -- $f_3$=[ sinh (W-x)s/L]/sinh Ws/L --; column 42, lines 37 and 38, strike out "conductances and, thus, approximately equal to $I_0/v_0$ proximately" and insert instead -- conductance per square of the base layer must be approximately --.

Signed and sealed this 31st day of July 1962.

(SEAL)
Attest:
ERNEST W. SWIDER
Attesting Officer

DAVID L. LADD
Commissioner of Patents